US012695869B2

(12) United States Patent (10) Patent No.: US 12,695,869 B2
Ko et al. (45) Date of Patent: Jul. 28, 2026

(54) METHOD AND DEVICE FOR PROCESSING VIDEO SIGNAL

(71) Applicant: WILUS INSTITUTE OF STANDARDS AND TECHNOLOGY INC., Seongnam-si (KR)

(72) Inventors: Geonjung Ko, Seoul (KR); Dongcheol Kim, Suwon-Si (KR); Jaehong Jung, Seoul (KR); Juhyung Son, Uiwang-Si (KR); Jinsam Kwak, Uiwang-si (KR)

(73) Assignee: WILUS INSTITUTE OF STANDARDS AND TECHNOLOGY INC., Seongman-si (KR)

( * ) Notice: Subject to any disclaimer, the term of this patent is extended or adjusted under 35 U.S.C. 154(b) by 200 days.

(21) Appl. No.: 17/578,402

(22) Filed: Jan. 18, 2022

(65) Prior Publication Data

US 2022/0141465 A1 May 5, 2022

Related U.S. Application Data

(63) Continuation of application No. PCT/KR2020/009563, filed on Jul. 20, 2020.

(30) Foreign Application Priority Data

Jul. 19, 2019 (KR) ........................ 10-2019-0087951
Aug. 22, 2019 (KR) ........................ 10-2019-0102908
(Continued)

(51) Int. Cl.
*H04N 19/119* (2014.01)
*H04N 19/176* (2014.01)
(Continued)

(52) U.S. Cl.
CPC ......... *H04N 19/119* (2014.11); *H04N 19/176* (2014.11); *H04N 19/186* (2014.11); *H04N 19/70* (2014.11)

(58) Field of Classification Search
CPC .. H04N 19/122; H04N 19/119; H04N 19/176; H04N 19/186; H04N 19/70; H04N 19/136; H04N 19/60; H04N 19/96
See application file for complete search history.

(56) References Cited

U.S. PATENT DOCUMENTS

| | | | | |
|---|---|---|---|---|
| 2013/0107970 A1* | 5/2013 | Wang | ................... | H04N 19/186 375/240.18 |
| 2014/0079332 A1* | 3/2014 | Zheng | ................. | H04N 19/119 382/248 |

(Continued)

FOREIGN PATENT DOCUMENTS

| | | |
|---|---|---|
| CN | 102957907 A | 3/2013 |
| CN | 103959785 A | 7/2014 |

(Continued)

OTHER PUBLICATIONS

Notice of Reasons for Refusal for JP 2022-503871 by Japan Patent Office dated Mar. 13, 2023.

(Continued)

*Primary Examiner* — Shahan Ur Rahaman
(74) *Attorney, Agent, or Firm* — BROADVIEW IP LAW, PC

(57) ABSTRACT

This video signal decoding device includes a processor, and the processor is characterized by: determining a result value that indicates the direction for dividing the current transform block (TB) on the basis of preset conditions; dividing the current transform block into a plurality of transform blocks on the basis of the result value; and decoding a video signal by using the plurality of transform blocks, wherein the preset (Continued)

100 conditions include a condition pertaining to a color component of the current transform block.

19 Claims, 38 Drawing Sheets

(30)         Foreign Application Priority Data

| | | |
|---|---|---|
| Oct. 16, 2019 | (KR) | 10-2019-0128764 |
| Dec. 19, 2019 | (KR) | 10-2019-0171122 |

(51) Int. Cl.
  *H04N 19/186*        (2014.01)
  *H04N 19/70*        (2014.01)

(56)         References Cited

U.S. PATENT DOCUMENTS

| | | | | |
|---|---|---|---|---|
| 2014/0192904 A1* | 7/2014 | Rosewarne | | H04N 19/60 |
| | | | | 375/240.29 |
| 2015/0063460 A1 | 3/2015 | Gamei et al. | | |
| 2015/0249840 A1* | 9/2015 | Kim | | H04N 19/129 |
| | | | | 375/240.18 |
| 2019/0075328 A1 | 3/2019 | Huang et al. | | |
| 2019/0104322 A1 | 4/2019 | Tsukuba | | |
| 2020/0112734 A1* | 4/2020 | Zhao | | H04N 19/186 |
| 2020/0288131 A1* | 9/2020 | Zhao | | H04N 19/70 |
| 2020/0322633 A1 | 10/2020 | Tsukuba | | |
| 2020/0389667 A1 | 12/2020 | Zhao et al. | | |
| 2021/0144400 A1* | 5/2021 | Liu | | H04N 19/70 |
| 2022/0174321 A1* | 6/2022 | Li | | H04N 19/61 |

FOREIGN PATENT DOCUMENTS

| | | | |
|---|---|---|---|
| CN | 104247425 A | 12/2014 |
| CN | 109076242 A | 12/2018 |
| EP | 3454559 A1 | 3/2019 |
| JP | 7740764 B2 | 9/2025 |
| KR | 10-2018-0019510 A | 2/2018 |
| KR | 10-2019-0020161 A | 2/2019 |
| KR | 10-2019-0039790 A | 4/2019 |
| WO | 2013/108634 A1 | 7/2013 |
| WO | 2018/080122 A1 | 5/2018 |

OTHER PUBLICATIONS

Bross, Benjamin Et Al., and Versatile Video Coding (Draft 6), JVET-O2001 (version9), ITU, Jul. 16, 2019, and pp. 1, 17-19, 21, 22, and 60-63, 70, 89, 261. URL:https://jvet-experts.org/doc_end_user/documents/15_Gothenburg/wg11/JVET-O2001-v9.zip.
Xin Zhao et al., Non-CE6: Configurable max transform size in VVC, JVET-O0545, Joint Video Experts Team (JVET) of ITU-T SG 16 WP 3 and ISO/IEC JTC 1/SC 29/WG 11, 15th Meeting: Gothenburg, SE, Jun. 26, 2019.
Xin Zhao et al., Non-CE6: Configurable max transform size in VVC, JVET-O0545-v2, Joint Video Experts Team (JVET) of ITU-T SG 16 WP 3 and ISO/IEC JTC 1/SC 29/WG 11, 15th Meeting: Gothenburg, SE, Jul. 4, 2019.
Gordon Clare et al., CE8-4.1: Bdpcm and Transform skip for Chroma, JVET-P0059-v1, Joint Video Experts Team (JVET) of ITU-T SG 16 WP 3 and ISO/IEC JTC 1/SC 29/WG 11, 16th Meeting: Geneva, CH, Sep. 17, 2019.

Partial Supplementary European Search Report for EP20844951 by European Patent Office dated Aug. 11, 2022.
Benjamin Bross et al: "Versatile Video Coding (Draft 7)", 16. JVET Meeting; Oct. 1, 2019-Oct. 11, 2019; Geneva; (The Joint Video Exploration Team of ISO/IEC JTC1/SC29/WG11 and ITU-T SG.16), No. JVET-P2001-vE; JVET-P2001; m51515 Nov. 14, 2019 (Nov. 14, 2019), pp. 1-489, XP030224330, Retrieved from the Internet: URL: http://phenix.int-evry.fr/jvet/doc_end_user/documents/16_Geneva/wg11/JVET-P2001-v14.zip JVET-P2001-vE.docx [retrieved on Nov. 14, 2019] *abstract* * p. 77* *p. 176-p. 177*.
Ko (Wilusgroup) G et al: "Non-CE6: Decoding process of implicit TU partintioning", 128. MPEG Meeting; Oct. 7, 2019-Oct. 11, 2019; Geneva; (Motion Picture Expert Group or Iso/Iec JTC1/SC29/WG11), No. m50266 Sep. 25, 2019 (Sep. 25, 2019), XP030206285, Retrieved from the Internet: URL:http://phenix.int-evry.fr/mpeg/doc_end_uswer/documents/128_Geneva/wg11/m50266-JVET-P0301-v1-JVET-P0301.zip JVET-P0301.docx [retrieved on Sep. 25, 2019] *the whole document*.
Bross B et al: "Versatile Video Coding (Draft 5)", 14. JVET Meeting; Mar. 19, 2019-Mar. 27, 2019; Geneva; (The Joint Video Exploration Team of ISO/IEC JTC1/SC29/WG11 and ITU-T SG.16), No. JVET-N1001 Jul. 2, 2019 (Jul. 2, 2019), pp. 1-406, XP030220731, Retrieved from the Internet: URL:http://phenix.int-evry.fr/jvet/doc_end_user/documents/14_Geneva/wg11/JVET-N1001-v10.zip JVET-N1001-v10.docx [retrieved on Jul. 2, 2019] *abstract; tables 6-1* *pp. 3,16* *p. 62* *p. 142-p. 143*.
Office Action for EP 20844951.2 by European Patent Office dated Aug. 3, 2023.
Office Action for IN 202227003950 by Intellectual Property India dated Aug. 24, 2023.
Bross, Benjamin et al. (2019). "Versatile Video Coding (Draft 7)", Joint Video Experts Team (JVET) of ITU-T SG 16 WP 3 and ISO/IEC JTC 1/SC 29/WG 11. 1-489, XP030224330. JVET-P2001-vE. URL:http://phenix.int-evry.fr/jvet/doc_end_user/documents/16_Geneva/wg11/JVET-P2001-v14.zip.
Wenting Cai et al., On Supporting 64×64 Chroma Transform Unit, JVET-O0389, Joint Video Experts Team (JVET) of ITU-T SG 16 WP 3 and ISO/IEC JTC 1/SC 29/WG 11, 15th Meeting: Gothenburg, SE, Jul. 5, 2019, pp. 1-2.
Gordon Clare et al., CE8-related: BDPCM for chroma, JVET-O0166, Joint Video Experts Team (JVET) of ITU-T SG 16 WP 3 and ISO/IEC JTC 1/SC 29/WG 11, 15th Meeting: Gothenburg, SE, Jul. 5, 2019, pp. 1-2.
International Search Report & Written Opinion of the International Searching Authority dated Nov. 11, 2020.
Notice of Allowance for JP 2023-188012 by Japan Patent Office dated Oct. 7, 2024.
Hearing Notice for IN 202227003950 by Intellectual Property India dated Oct. 15, 2024.
Extended European Search Report for EP 24187561.6 by European Patent Office dated Sep. 13, 2024.
Extended European Search Report for EP20844951.2 by European Patent Office dated Nov. 11, 2022.
Office Action for CN 202080052141.1 by China National Intellectual Property Administration dated Nov. 28, 2024.
Office Action for KR 10-2022-7002239 by Korean Intellectual Property Office dated Dec. 23, 2025.
Office Action for JP 2025-141511 by Japan Patent Office dated Jun. 2, 2026.
Extended European Search Report for EP 25217513.8 by European Patent Office dated Mar. 2, 2026.

* cited by examiner

| mvd_coding( x0, y0, refList ) { | Descriptor |
|---|---|
| abs_mvd_greater0_flag[ 0 ] | ae(v) |
| abs_mvd_greater0_flag[ 1 ] | ae(v) |
| if( abs_mvd_greater0_flag[ 0 ] ) | |
|   abs_mvd_greater1_flag[ 0 ] | ae(v) |
| if( abs_mvd_greater0_flag[ 1 ] ) | |
|   abs_mvd_greater1_flag[ 1 ] | ae(v) |
| if( abs_mvd_greater0_flag[ 0 ] ) { | |
|   if( abs_mvd_greater1_flag[ 0 ] ) | |
|     abs_mvd_minus2[ 0 ] | ae(v) |
|   mvd_sign_flag[ 0 ] | ae(v) |
| } | |
| if( abs_mvd_greater0_flag[ 1 ] ) { | |
|   if( abs_mvd_greater1_flag[ 1 ] ) | |
|     abs_mvd_minus2[ 1 ] | ae(v) |
|   mvd_sign_flag[ 1 ] | ae(v) |
| } | |
| } | |

| transform_tree( x0, y0, tbWidth, tbHeight , treeType) { | Descriptor |
|---|---|
| InferTuCbfLuma = 1 | |
| if( IntraSubPartitionsSplitType = = NO_ISP_SPLIT && !cu_sbt_flag ) { | |
| if( tbWidth > MaxTbSizeY || tbHeight > MaxTbSizeY ) { | |
| trafoWidth = ( tbWidth > MaxTbSizeY ) ? (tbWidth / 2) : tbWidth | |
| trafoHeight = ( tbHeight > MaxTbSizeY ) ? (tbHeight / 2) : tbHeight | |
| transform_tree( x0, y0, trafoWidth, trafoHeight ) | |
| if( tbWidth > MaxTbSizeY ) | |
| transform_tree( x0 + trafoWidth, y0, trafoWidth, trafoHeight, treeType ) | |
| if( tbHeight > MaxTbSizeY ) | |
| transform_tree( x0, y0 + trafoHeight, trafoWidth, trafoHeight, treeType ) | |
| if( tbWidth > MaxTbSizeY && tbHeight > MaxTbSizeY ) | |
| transform_tree( x0 + trafoWidth, y0 + trafoHeight, trafoWidth, trafoHeight, treeType ) | |
| } else { | |
| transform_unit( x0, y0, tbWidth, tbHeight, treeType, 0 ) | |
| } | |
| } else if( cu_sbt_flag ) { | |
| if( !cu_sbt_horizontal_flag ) { | |
| trafoWidth = tbWidth * SbtNumFourthsTb0 / 4 | |
| transform_unit( x0, y0, trafoWidth, tbHeight, treeType , 0 ) | |
| transform_unit( x0 + trafoWidth, y0, tbWidth − trafoWidth , tbHeight, treeType , 1 ) | |
| } else { | |
| trafoHeight = tbHeight * SbtNumFourthsTb0 / 4 | |
| transform_unit( x0, y0, tbWidth, trafoHeight, treeType , 0 ) | |
| transform_unit( x0, y0 + trafoHeight, tbWidth, tbHeight − trafoHeight, treeType , 1 ) | |
| } | |
| } else if( IntraSubPartitionsSplitType = = ISP_HOR_SPLIT ) { | |
| trafoHeight = tbHeight / NumIntraSubPartitions | |
| for( partIdx = 0; partIdx < NumIntraSubPartitions; partIdx++ ) | |
| transform_unit( x0, y0 + trafoHeight * partIdx, tbWidth, trafoHeight, treeType, partIdx ) | |
| } else if( IntraSubPartitionsSplitType = = ISP_VER_SPLIT ) { | |
| trafoWidth = tbWidth / NumIntraSubPartitions | |
| for( partIdx = 0; partIdx < NumIntraSubPartitions; partIdx++ ) | |
| transform_unit( x0 + trafoWidth * partIdx, y0, trafoWidth, tbHeight, treeType, partIdx ) | |
| } | |
| } | |

*Fig. 11*

8.4 Decoding process for coding units coded in intra prediction mode

8.4.1 General decoding process for coding units coded in intra prediction mode

Inputs to this process are:

– a luma location ( xCb, yCb ) specifying the top-left sample of the current coding block relative to the top-left sample of the current picture, – a variable cbWidth specifying the width of the current coding block in luma samples, – a variable cbHeight specifying the height of the current coding block in luma samples, – a variable treeType specifying whether a single or a dual tree is used and if a dual tree is used, it specifies whether the current tree corresponds to the luma or chroma components.

Output of this process is a modified reconstructed picture before in-loop filtering.

The derivation process for quantization parameters as specified in clause 8.7.1 is invoked with the luma location ( xCb, yCb ), the width of the current coding block in luma samples cbWidth and the height of the current coding block in luma samples cbHeight, and the variable treeType as inputs.

When treeType is equal to SINGLE_TREE or treeType is equal to DUAL_TREE_LUMA, the decoding process for luma samples is specified as follows:

1. The variable MipSizeId[ x ][ y ] for x = xCb..xCb + cbWidth − 1 and y = yCb..yCb + cbHeight − 1 is derived as follows:

– If both cbWidth and cbHeight are equal to 4, MipSizeId[ x ][ y ] is set equal to 0.

– Otherwise, if both cbWidth and cbHeight are less than or equal to 8, MipSizeId[ x ][ y ] is set equal to 1.

– Otherwise, MipSizeId[ x ][ y ] is set equal to 2.

2. The luma intra prediction mode is derived as follows:

– If intra_mip_flag[ xCb ][ yCb ] is equal to 1, IntraPredModeY[ x ][ y ] with x = xCb..xCb + cbWidth − 1 and y = yCb..yCb + cbHeight − 1 is set to be equal to intra_mip_mode[ xCb ][ yCb ].

– Otherwise, the derivation process for the luma intra prediction mode as specified in clause 8.4.2 is invoked with the luma location ( xCb, yCb ), the width of the current coding block in luma samples cbWidth and the height of the current coding block in luma samples cbHeight as input.

3. The variable predModeIntra is set equal to IntraPredModeY[ xCb ][ yCb ].

4. The general decoding process for intra blocks as specified in clause 8.4.5.1 is invoked with the sample location ( xTb0, yTb0 ) set equal to the luma location ( xCb, yCb ), the variable nTbW set equal to cbWidth, the variable nTbH set equal to cbHeight, predModeIntra, treeType, and the variable cIdx set equal to 0 as inputs, and the output is a modified reconstructed picture before in-loop filtering.

When treeType is equal to SINGLE_TREE or treeType is equal to DUAL_TREE_CHROMA, and when ChromaArrayType is not equal to 0, the decoding process for chroma samples is specified as follows:

1. The derivation process for the chroma intra prediction mode as specified in clause 8.4.3 is invoked with the luma location ( xCb, yCb ), the width of the current coding block in luma samples cbWidth and the height of the current coding block in luma samples cbHeight as input.

2. The general decoding process for intra blocks as specified in clause 8.4.5.1 is invoked with the sample location ( xTb0, yTb0 ) set equal to the chroma location ( xCb / SubWidthC, yCb / SubHeightC ), the variable nTbW set equal to ( cbWidth / SubWidthC ), the variable nTbH set equal to ( cbHeight / SubHeightC ), the variable predModeIntra set equal to IntraPredModeC[ xCb ][ yCb ], treeType, and the variable cIdx set equal to 1, and the output is a modified reconstructed picture before in-loop filtering.

3. The general decoding process for intra blocks as specified in clause 8.4.5.1 is invoked with the sample location ( xTb0, yTb0 ) set equal to the chroma location ( xCb / SubWidthC, yCb / SubHeightC ), the variable nTbW set equal to ( cbWidth / SubWidthC ), the variable nTbH set equal to ( cbHeight / SubHeightC ), treeType, and the variable cIdx set equal to 2, and the output is a modified reconstructed picture before in-loop filtering.

8.4.5 Decoding process for intra blocks

8.4.5.1 General decoding process for intra blocks

Inputs to this process are:

– a sample location ( xTb0, yTb0 ) specifying the top-left sample of the current transform block relative to the top-left sample of the current picture, – a variable nTbW specifying the width of the current transform block, – a variable nTbH specifying the height of the current transform block, – a variable predModeIntra specifying the intra prediction mode, – a variable treeType specifying whether a single or a dual tree is used and if a dual tree is used, it specifies whether the current tree corresponds to the luma or chroma components, – a variable cIdx specifying the colour component of the current block.

Output of this process is a modified reconstructed picture before in-loop filtering.

The maximum transform block width maxTbWidth and height maxTbHeight are derived as follows:

$$maxTbWidth = ( cIdx == 0 ) ? MaxTbSizeY : MaxTbSizeY / SubWidthC \quad (8\text{-}41)$$

$$maxTbHeight = ( cIdx == 0 ) ? MaxTbSizeY : MaxTbSizeY / SubHeightC \quad (8\text{-}42)$$

The luma sample location is derived as follows:

$$( xTbY, yTbY ) = ( cIdx == 0 ) ? ( xTb0, yTb0 ) : ( xTb0 * SubWidthC, yTb0 * SubHeightC ) \quad (8\text{-}43)$$

Depending on maxTbSize, the following applies:

– If IntraSubPartitionsSplitType is equal to NO_ISP_SPLIT and nTbW or nTbH is greater than maxTbWidth or maxTbHeight, the following ordered steps apply.

1. The variables newTbW and newTbH are derived as follows:

$$newTbW = ( nTbW > maxTbWidth ) ? ( nTbW / 2 ) : nTbW \quad (8\text{-}44)$$

$$newTbH = ( nTbH > maxTbHeight ) ? ( nTbH / 2 ) : nTbH \quad (8\text{-}45)$$

2. The general decoding process for intra blocks as specified in this clause is invoked with the location ( xTb0, yTb0 ), the transform block width nTbW set equal to newTbW and the height nTbH set equal to newTbH, the intra prediction mode predModeIntra, treeType, and the variable cIdx as inputs, and the output is a modified reconstructed picture before in-loop filtering.

3. If nTbW is greater than maxTbWidth, the general decoding process for intra blocks as specified in this clause is invoked with the location ( xTb0, yTb0 ) set equal to ( xTb0, yTb0 + newTbW, yTb0 ), the transform block width nTbW set equal to newTbW and the height nTbH set equal to newTbH, the intra prediction mode predModeIntra, treeType, and the variable cIdx as inputs, and the output is a modified reconstructed picture before in-loop filtering.

4. If nTbH is greater than maxTbHeight, the general decoding process for intra blocks as specified in this clause is invoked with the location ( xTb0, yTb0 ) set equal to ( xTb0, yTb0 + newTbH ), the transform block width nTbW and the height nTbH set equal to newTbH, the intra prediction mode predModeIntra, treeType, and the variable cIdx as inputs, and the output is a modified reconstructed picture before in-loop filtering.

5. If nTbW is greater than maxTbWidth and nTbH is greater than maxTbHeight, the general decoding process for intra blocks as specified in this clause is invoked with the location ( xTb0, yTb0 ) set equal to ( xTb0 + newTbW, yTb0 + newTbH ), the transform block width nTbW set equal to newTbW and the height nTbH set equal to newTbH, the intra prediction mode predModeIntra, treeType, and the variable cIdx as inputs, and the output is a modified reconstructed picture before in-loop filtering.

– Otherwise, the following ordered steps apply:

*Fig. 12*

The residual samples of the current coding unit are derived as follows:

– The decoding process for the residual signal of coding blocks coded in inter prediction mode as specified in clause 8.5.8 is invoked with the location ( xTb0, yTb0 ) set equal to the luma location ( xCb, yCb ), the width nTbW set equal to the luma coding block width cbWidth, the height nTbH set equal to the luma coding block height cbHeight and the variable cIdx set equal to 0 as inputs, and the array resSamplesL as output.

– When ChromaArrayType is not equal to 0 the decoding process for the residual signal of coding blocks coded in inter prediction mode as specified in clause 8.5.8 is invoked with the location ( xTb0, yTb0 ) set equal to the chroma location ( xCb / SubWidthC, yCb / SubHeightC ), the width nTbW set equal to the chroma coding block width cbWidth / SubWidthC, the height nTbH set equal to the chroma coding block height cbHeight / SubHeightC and the variable cIdx set equal to 1 as inputs, and the array resSamplesCb as output.

– When ChromaArrayType is not equal to 0 the decoding process for the residual signal of coding blocks coded in inter prediction mode as specified in clause 8.5.8 is invoked with the location ( xTb0, yTb0 ) set equal to the chroma location ( xCb / SubWidthC, yCb / SubHeightC ), the width nTbW set equal to the chroma coding block width cbWidth / SubWidthC, the height nTbH set equal to the chroma coding block height cbHeight / SubHeightC and the variable cIdx set equal to 2 as inputs, and the array resSamplesCr as output.

S1301

8.5.8 Decoding process for the residual signal of coding blocks coded in inter prediction mode

Inputs to this process are:

– a sample location ( xTb0, yTb0 ) specifying the top-left sample of the current transform block relative to the top-left sample of the current picture, – a variable nTbW specifying the width of the current transform block, – a variable nTbH specifying the height of the current transform block, – a variable cIdx specifying the colour component of the current block.

Output of this process is an (nTbW)x(nTbH) array resSamples.

The maximum transform block width maxTbWidth and height maxTbHeight are derived as follows:

$$maxTbWidth = ( cIdx == 0 ) ? MaxTbSizeY : MaxTbSizeY / SubWidthC \quad (8\text{-}849)$$

$$maxTbHeight = ( cIdx == 0 ) ? MaxTbSizeY : MaxTbSizeY / SubHeightC \quad (8\text{-}850)$$

The luma sample location is derived as follows:

$$( xTbY, yTbY ) = ( cIdx == 0 ) ? ( xTb0, yTb0 ) : ( xTb0 * SubWidthC, yTb0 * SubHeightC ) \quad (8\text{-}851)$$

Depending on maxTbSize, the following applies:

– If nTbW is greater than maxTbWidth or nTbH is greater than maxTbHeight, the following ordered steps apply.

1. The variables newTbW and newTbH are derived as follows:

$$newTbW = ( nTbW > maxTbWidth ) ? ( nTbW / 2 ) : nTbW \quad (8\text{-}852)$$

$$newTbH = ( nTbH > maxTbHeight ) ? ( nTbH / 2 ) : nTbH \quad (8\text{-}853)$$

2. The decoding process for the residual signal of coding units coded in inter prediction mode as specified in this clause is invoked with the location ( xTb0, yTb0 ), the transform block width nTbW set equal to newTbW and the height nTbH set equal to newTbH, and the variable cIdx as inputs, and the output is a modified reconstructed picture before in-loop filtering 3. When nTbW is greater than maxTbWidth, the decoding process process for the residual signal of coding units coded in inter prediction mode as specified in this clause is invoked with the location ( xTb0, yTb0 ) set equal to ( xTb0 + newTbW, yTb0 ), the transform block width nTbW set equal to newTbW and the height nTbH set equal to newTbH, and the variable cIdx as inputs, and the output is a modified reconstructed picture.

4. When nTbH is greater than maxTbHeight, the decoding process process for the residual signal of coding units coded in inter prediction mode as specified in this clause is invoked with the location ( xTb0, yTb0 ) set equal to ( xTb0, yTb0 + newTbH ), the transform block width nTbW set equal to newTbW and the height nTbH set equal to newTbH, and the output is a modified reconstructed picture before in-loop filtering.

5. When nTbW is greater than maxTbWidth and nTbH is greater than maxTbHeight, the decoding process process for the residual signal of coding units coded in inter prediction mode as specified in this clause is invoked with the location ( xTb0, yTb0 ) set equal to ( xTb0 + newTbW, yTb0 + newTbH ), the transform block width nTbW set equal to newTbW and height nTbH set equal to newTbH, and the variable cIdx as inputs, and the output is a modified reconstructed picture before in-loop filtering.

– Otherwise, the scaling and transformation process as specified in clause 8.7.2 is invoked with the luma location ( xTbY, yTbY ), the variable cIdx, the transform width nTbW and the transform height nTbH as inputs, and the output is an (nTbW)x(nTbH) array resSamples.

*Fig. 13*

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In monochrome sampling there is only one sample array, which is nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling, depending on the value of separate_colour_plane_flag, the following applies:

- If separate_colour_plane_flag is equal to 0, each of the two chroma arrays has the same height and width as the luma array.

- Otherwise (separate_colour_plane_flag is equal to 1), the three colour planes are separately processed as monochrome sampled pictures.

*Fig. 14*

(a) Nominal vertical and horizontal locations of 4:2:0 luma and chroma samples in a picture (b) Nominal vertical and horizontal locations of 4:2:2 luma and chroma samples in a picture (c) Nominal vertical and horizontal locations of 4:4:4 luma and chroma samples in a picture

*Fig. 15* sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32.

When CtbSizeY is less than 64, the value of sps_max_luma_transform_size_64_flag shall be equal to 0.

The variables MinTbLog2SizeY, MaxTbLog2SizeY, MinTbSizeY, and MaxTbSizeY are derived as follows:

$$MinTbLog2SizeY = 2 \tag{7-24}$$

$$MaxTbLog2SizeY = sps\_max\_luma\_transform\_size\_64\_flag \ ? \ 6 \ : \ 5 \tag{7-25}$$

$$MinTbSizeY = 1 << MinTbLog2SizeY \tag{7-26}$$

$$MaxTbSizeY = 1 << MaxTbLog2SizeY \tag{7-27}$$

*Fig. 16*

| seq_parameter_set_rbsp( ) { | Descriptor |
|---|---|
| // ... | |
| if( ChromaArrayType != 0 ) | |
|   qtbtt_dual_tree_intra_flag | u(1) |
| log2_ctu_size_minus5 | ue(v) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
|   } | |
| if( sps_max_mtt_hierarchy_depth_inter_slices != 0 ) { | |
|   sps_log2_diff_max_bt_min_qt_inter_slice | ue(v) |
|   sps_log2_diff_max_tt_min_qt_inter_slice | ue(v) |
|   } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if ( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|     } | |
|   } | |
| sps_max_luma_transform_size_64_flag | u(1) |
| sps_weighted_pred_flag | u(1) |
| sps_weighted_bipred_flag | u(1) |
| sps_sao_enabled_flag | u(1) |
| sps_alf_enabled_flag | u(1) |
| sps_transform_skip_enabled_flag | u(1) |
| if( sps_transform_skip_enabled_flag ) | |
|   sps_bdpcm_enabled_flag | u(1) |
| sps_joint_cbcr_enabled_flag | u(1) |
| sps_sbt_enabled_flag | u(1) |
| if( sps_sbt_enabled_flag ) | |
|   sps_sbt_max_size_64_flag | u(1) |
| } | | sps_sbt_max_size_64_flag equal to 0 specifies that the maximum CU width and height for allowing subblock transform is 32 luma samples. sps_sbt_max_size_64_flag equal to 1 specifies that the maximum CU width and height for allowing subblock transform is 64 luma samples.

$$MaxSbtSize = Min( MaxTbSizeY, sps\_sbt\_max\_size\_64\_flag ? 64 : 32 )$$ (7-31)

*Fig. 17*

| transform_tree( x0, y0, tbWidth, tbHeight , treeType) { | Descriptor |
|---|---|
| InferTuCbfLuma = 1 | |
| if( IntraSubPartitionsSplitType = = NO_ISP_SPLIT && !cu_sbt_flag ) { | (1) |
| if( tbWidth > MaxTbSizeY \|\| tbHeight > MaxTbSizeY ) { | (2) |
| verSplitFirst = ( tbWidth > MaxTbSizeY && tbWidth > tbHeight ) ? 1 : 0 | (3) |
| trafoWidth = verSplitFirst ? (tbWidth / 2) : tbWidth | (4) |
| trafoHeight = !verSplitFirst ? (tbHeight / 2) : tbHeight | (5) |
| transform_tree( x0, y0, trafoWidth, trafoHeight ) | (6) |
| if( verSplitFirst ) | (7) |
| transform_tree( x0 + trafoWidth, y0, trafoWidth, trafoHeight, treeType ) | (8) |
| else | (9) |
| transform_tree( x0, y0 + trafoHeight, trafoWidth, trafoHeight, treeType ) | (10) |
| } else { | |
| transform_unit( x0, y0, tbWidth, tbHeight, treeType, 0 ) | |
| } | |
| } else if( cu_sbt_flag ) { | |
| if( !cu_sbt_horizontal_flag ) { | |
| trafoWidth = tbWidth * SbtNumFourthsTb0 / 4 | |
| transform_unit( x0, y0, trafoWidth, tbHeight, treeType , 0 ) | |
| transform_unit( x0 + trafoWidth, y0, tbWidth − trafoWidth , tbHeight, treeType , 1 ) | |
| } else { | |
| trafoHeight = tbHeight * SbtNumFourthsTb0 / 4 | |
| transform_unit( x0, y0, tbWidth, trafoHeight, treeType , 0 ) | |
| transform_unit( x0, y0 + trafoHeight, tbWidth, tbHeight − trafoHeight, treeType , 1 ) | |
| } | |
| } else if( IntraSubPartitionsSplitType = = ISP_HOR_SPLIT ) { | |
| trafoHeight = tbHeight / NumIntraSubPartitions | |
| for( partIdx = 0; partIdx < NumIntraSubPartitions; partIdx++ ) | |
| transform_unit( x0, y0 + trafoHeight * partIdx, tbWidth, trafoHeight, treeType, partIdx ) | |
| } else if( IntraSubPartitionsSplitType = = ISP_VER_SPLIT ) { | |
| trafoWidth = tbWidth / NumIntraSubPartitions | |
| for( partIdx = 0; partIdx < NumIntraSubPartitions; partIdx++ ) | |
| transform_unit( x0 + trafoWidth * partIdx, y0, trafoWidth, tbHeight, treeType, partIdx ) | |
| } | |
| } | |

*Fig. 18*

8.4.5 Decoding process for intra blocks

8.4.5.1 General decoding process for intra blocks

Inputs to this process are:
- a sample location ( xTb0, yTb0 ) specifying the top-left sample of the current transform block relative to the top-left sample of the current picture,
- a variable nTbW specifying the width of the current transform block,
- a variable nTbH specifying the height of the current transform block,
- a variable predModeIntra specifying the intra prediction mode,
- a variable treeType specifying whether a single or a dual tree is used and if a dual tree is used, it specifies whether the current tree corresponds to the luma or chroma components,
- a variable cIdx specifying the colour component of the current block.

Output of this process is a modified reconstructed picture before in-loop filtering.

The maximum transform block width maxTbWidth and height maxTbHeight are derived as follows:

$$\text{maxTbWidth} = (\text{cIdx} == 0) ? \text{MaxTbSizeY} : \text{MaxTbSizeY} / \text{SubWidthC} \tag{8-41}$$

$$\text{maxTbHeight} = (\text{cIdx} == 0) ? \text{MaxTbSizeY} : \text{MaxTbSizeY} / \text{SubHeightC} \tag{8-42}$$

The luma sample location is derived as follows:

$$(\text{xTbY}, \text{yTbY}) = (\text{cIdx} == 0) ? (\text{xTb0}, \text{yTb0}) : (\text{xTb0} * \text{SubWidthC}, \text{yTb0} * \text{SubHeightC}) \tag{8-43}$$

Depending on maxTbSize, the following applies:

- If IntraSubPartitionsSplitType is equal to NO_ISP_SPLIT and nTbW is greater than maxTbWidth or nTbH is greater than maxTbHeight, the following ordered steps apply.

1.  The variables verSplitFirst, newTbW and newTbH are derived as follows:

$$\text{verSplitFirst} = (\text{nTbW} > \text{maxTbWidth} \&\& \text{nTbW} > \text{nTbH}) ? 1 : 0$$

$$\text{newTbW} = \text{verSplitFirst} ? (\text{nTbW} / 2) : \text{nTbW} \tag{8-44}$$

$$\text{newTbH} = !\text{verSplitFirst} ? (\text{nTbH} / 2) : \text{nTbH} \tag{8-45}$$

2.  The general decoding process for intra blocks as specified in this clause is invoked with the location ( xTb0, yTb0 ), the transform block width nTbW set equal to newTbW and the height nTbH set equal to newTbH, the intra prediction mode predModeIntra, treeType, and the variable cIdx as inputs, and the output is a modified reconstructed picture before in-loop filtering.

3.  If verSplitFirst is equal to 1, the general decoding process for intra blocks as specified in this clause is invoked with the location ( xTb0, yTb0 ) set equal to ( xTb0 + newTbW, yTb0 ), the transform block width nTbW set equal to newTbW and the height nTbH set equal to newTbH, the intra prediction mode predModeIntra, treeType, and the variable cIdx as inputs, and the output is a modified reconstructed picture before in-loop filtering.

4.  Otherwise (If verSplitFirst is equal to 0), the general decoding process for intra blocks as specified in this clause is invoked with the location ( xTb0, yTb0 ) set equal to ( xTb0, yTb0 + newTbH ), the transform block width nTbW set equal to newTbW and the height nTbH set equal to newTbH, the intra prediction mode predModeIntra, treeType, and the variable cIdx as inputs, and the output is a modified reconstructed picture before in-loop filtering.

- Otherwise, the following ordered steps apply:

8.4.5 Decoding process for intra blocks

8.4.5.1 General decoding process for intra blocks

Inputs to this process are:
-   a sample location ( xTb0, yTb0 ) specifying the top-left sample of the current transform block relative to the top-left sample of the current picture,
-   a variable nTbW specifying the width of the current transform block,
-   a variable nTbH specifying the height of the current transform block,
-   a variable predModeIntra specifying the intra prediction mode,
-   a variable treeType specifying whether a single or a dual tree is used and if a dual tree is used, it specifies whether the current tree corresponds to the luma or chroma components,
-   a variable cIdx specifying the colour component of the current block.

Output of this process is a modified reconstructed picture before in-loop filtering.

The maximum transform block width maxTbWidth and height maxTbHeight are derived as follows:

$$\text{maxTbWidth} = (\text{cIdx} == 0) ? \text{MaxTbSizeY} : \text{MaxTbSizeY} / \text{SubWidthC} \tag{8-41}$$

$$\text{maxTbHeight} = (\text{cIdx} == 0) ? \text{MaxTbSizeY} : \text{MaxTbSizeY} / \text{SubHeightC} \tag{8-42}$$

The luma sample location is derived as follows:

$$(\text{xTbY, yTbY}) = (\text{cIdx} == 0) ? (\text{xTb0, yTb0}) : (\text{xTb0 * SubWidthC, yTb0 * SubHeightC}) \tag{8-43}$$

Depending on maxTbSize, the following applies:

-   If IntraSubPartitionsSplitType is equal to NO_ISP_SPLIT and nTbW is greater than maxTbWidth or nTbH is greater than maxTbHeight, the following ordered steps apply.

1.  The variables verSplitFirst, newTbW and newTbH are derived as follows:

verSplitFirst = ( nTbW > maxTbWidth && (cIdx == 0 ? nTbW : nTbW*SubWidthC) > (cIdx == 0 ? nTbH : nTbH*SubHeightC ) ) ? 1 : 0 newTbW = verSplitFirst ? ( nTbW / 2 ) : nTbW (8-44)

newTbH = !verSplitFirst ? ( nTbH / 2 ) : nTbH (8-45)

2.  The general decoding process for intra blocks as specified in this clause is invoked with the location ( xTb0, yTb0 ), the transform block width nTbW set equal to newTbW and the height nTbH set equal to newTbH, the intra prediction mode predModeIntra, treeType, and the variable cIdx as inputs, and the output is a modified reconstructed picture before in-loop filtering.

3.  If verSplitFirst is equal to 1, the general decoding process for intra blocks as specified in this clause is invoked with the location ( xTb0, yTb0 ) set equal to ( xTb0 + newTbW, yTb0 ), the transform block width nTbW set equal to newTbW and the height nTbH set equal to newTbH, the intra prediction mode predModeIntra, treeType, and the variable cIdx as inputs, and the output is a modified reconstructed picture before in-loop filtering.

4.  Otherwise (If verSplitFirst is equal to 0), the general decoding process for intra blocks as specified in this clause is invoked with the location ( xTb0, yTb0 ) set equal to ( xTb0, yTb0 + newTbH ), the transform block width nTbW set equal to newTbW and the height nTbH set equal to newTbH, the intra prediction mode predModeIntra, treeType, and the variable cIdx as inputs, and the output is a modified reconstructed picture before in-loop filtering.

-   Otherwise, the following ordered steps apply:

| seq_parameter_set_rbsp( ) { | Descriptor |
|---|---|
| *// ...* | |
| if( ChromaArrayType != 0 ) | |
|   qtbtt_dual_tree_intra_flag | u(1) |
| log2_ctu_size_minus5 | ue(v) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
|   } | |
| if( sps_max_mtt_hierarchy_depth_inter_slices != 0 ) { | |
|   sps_log2_diff_max_bt_min_qt_inter_slice | ue(v) |
|   sps_log2_diff_max_tt_min_qt_inter_slice | ue(v) |
|   } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if ( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|     } | |
|   } | |
| if( CtbSizeY > 64 ) | |
|   sps_max_luma_transform_size_64_flag | u(1) |
| sps_weighted_pred_flag | u(1) |
| sps_weighted_bipred_flag | u(1) |
| sps_sao_enabled_flag | u(1) |
| sps_alf_enabled_flag | u(1) |
| sps_transform_skip_enabled_flag | u(1) |
| if( sps_transform_skip_enabled_flag ) | |
|   sps_bdpcm_enabled_flag | u(1) |
| sps_joint_cbcr_enabled_flag | u(1) |
| sps_sbt_enabled_flag | u(1) |
| if( sps_sbt_enabled_flag ) | |
|   sps_sbt_max_size_64_flag | u(1) |
| } | |

*Fig. 23*

| seq_parameter_set_rbsp( ) { | Descriptor |
|---|---|
| // ... | |
| if( ChromaArrayType != 0 ) | |
|   qtbtt_dual_tree_intra_flag | u(1) |
| log2_ctu_size_minus5 | ue(v) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
|   } | |
| if( sps_max_mtt_hierarchy_depth_inter_slices != 0 ) { | |
|   sps_log2_diff_max_bt_min_qt_inter_slice | ue(v) |
|   sps_log2_diff_max_tt_min_qt_inter_slice | ue(v) |
|   } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if ( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|     } | |
|   } | |
| sps_max_luma_transform_size_64_flag | u(1) |
| sps_weighted_pred_flag | u(1) |
| sps_weighted_bipred_flag | u(1) |
| sps_sao_enabled_flag | u(1) |
| sps_alf_enabled_flag | u(1) |
| sps_transform_skip_enabled_flag | u(1) |
| if( sps_transform_skip_enabled_flag ) | |
|   sps_bdpcm_enabled_flag | u(1) |
| sps_joint_cbcr_enabled_flag | u(1) |
| sps_sbt_enabled_flag | u(1) |
| if( sps_sbt_enabled_flag && sps_max_luma_transform_size_64_flag ) | |
|   sps_sbt_max_size_64_flag | u(1) |
| } | | sps_sbt_max_size_64_flag equal to 0 specifies that the maximum CU width and height for allowing subblock transform is 32 luma samples. sps_sbt_max_size_64_flag equal to 1 specifies that the maximum CU width and height for allowing subblock transform is 64 luma samples.

If sps_sbt_max_size_64_flag is not present, it is inferred to be equal to sps_max_luma_transform_size_64_flag.

$$\text{MaxSbtSize} = \text{sps\_sbt\_max\_size\_64\_flag} ? 64 : 32 \quad (7\text{-}31)$$

*Fig. 24*

| transform_tree( x0, y0, tbWidth, tbHeight , treeType) { | Descriptor |
|---|---|
|   InferTuCbfLuma = 1 | |
|   if( IntraSubPartitionsSplitType == NO_ISP_SPLIT && !cu_sbt_flag ) { | |
|     if( tbWidth > MaxTbSizeY || tbHeight > MaxTbSizeY ) { | |
|       if( treeType != DUAL_TREE_CHROMA ) | |
|         verSplitFirst = ( tbWidth > MaxTbSizeY && tbWidth > tbHeight ) ? 1 : 0 | (1) |
|       else | |
|         verSplitFirst = ( tbWidth > MaxTbSizeY && tbWidth/SubWidthC > tbHeight/SubHeightC ) ? 1 : 0 | (2) |
|       trafoWidth = verSplitFirst ? (tbWidth / 2) : tbWidth | |
|       trafoHeight = !verSplitFirst ? (tbHeight / 2) : tbHeight | |
|       transform_tree( x0, y0, trafoWidth, trafoHeight ) | |
|       if( verSplitFirst ) | |
|         transform_tree( x0 + trafoWidth, y0, trafoWidth, trafoHeight, treeType ) | |
|       else | |
|         transform_tree( x0, y0 + trafoHeight, trafoWidth, trafoHeight, treeType ) | |
|     } else { | |
|       transform_unit( x0, y0, tbWidth, tbHeight, treeType, 0 ) | |
|     } | |
|   } else if( cu_sbt_flag ) { | |
|     if( !cu_sbt_horizontal_flag ) { | |
|       trafoWidth = tbWidth * SbtNumFourthsTb0 / 4 | |
|       transform_unit( x0, y0, trafoWidth, tbHeight, treeType , 0 ) | |
|       transform_unit( x0 + trafoWidth, y0, tbWidth − trafoWidth , tbHeight, treeType , 1 ) | |
|     } else { | |
|       trafoHeight = tbHeight * SbtNumFourthsTb0 / 4 | |
|       transform_unit( x0, y0, tbWidth, trafoHeight, treeType , 0 ) | |
|       transform_unit( x0, y0 + trafoHeight, tbWidth, tbHeight − trafoHeight, treeType , 1 ) | |
|     } | |
|   } else if( IntraSubPartitionsSplitType == ISP_HOR_SPLIT ) { | |
|     trafoHeight = tbHeight / NumIntraSubPartitions | |
|     for( partIdx = 0; partIdx < NumIntraSubPartitions; partIdx++ ) | |
|       transform_unit( x0, y0 + trafoHeight * partIdx, tbWidth, trafoHeight, treeType, partIdx ) | |
|   } else if( IntraSubPartitionsSplitType == ISP_VER_SPLIT ) { | |
|     trafoWidth = tbWidth / NumIntraSubPartitions | |
|     for( partIdx = 0; partIdx < NumIntraSubPartitions; partIdx++ ) | |
|       transform_unit( x0 + trafoWidth * partIdx, y0, trafoWidth, tbHeight, treeType, partIdx ) | |
|   } | |
| } | |

*Fig. 25*

8.4.5 Decoding process for intra blocks

8.4.5.1 General decoding process for intra blocks

Inputs to this process are:
- a sample location ( xTb0, yTb0 ) specifying the top-left sample of the current transform block relative to the top-left sample of the current picture,
- a variable nTbW specifying the width of the current transform block,
- a variable nTbH specifying the height of the current transform block,
- a variable predModeIntra specifying the intra prediction mode,
- a variable treeType specifying whether a single or a dual tree is used and if a dual tree is used, it specifies whether the current tree corresponds to the luma or chroma components,
- a variable cIdx specifying the colour component of the current block.

Output of this process is a modified reconstructed picture before in-loop filtering.

The maximum transform block width maxTbWidth and height maxTbHeight are derived as follows:

$$\text{maxTbWidth} = (\text{cIdx} == 0)\,?\,\text{MaxTbSizeY} : \text{MaxTbSizeY} / \text{SubWidthC} \qquad (8\text{-}41)$$

$$\text{maxTbHeight} = (\text{cIdx} == 0)\,?\,\text{MaxTbSizeY} : \text{MaxTbSizeY} / \text{SubHeightC} \qquad (8\text{-}42)$$

The luma sample location is derived as follows:

$$(\,\text{xTbY, yTbY}\,) = (\text{cIdx} == 0)\,?\,(\,\text{xTb0, yTb0}\,) : (\,\text{xTb0} * \text{SubWidthC, yTb0} * \text{SubHeightC}\,) \qquad (8\text{-}43)$$

Depending on maxTbSize, the following applies:
- If IntraSubPartitionsSplitType is equal to NO_ISP_SPLIT and nTbW is greater than maxTbWidth or nTbH is greater than maxTbHeight, the following ordered steps apply.

1. The variables verSplitFirst, newTbW and newTbH are derived as follows:

$$\text{verSplitFirst} = (\,\text{nTbW} > \text{maxTbWidth \&\& (cIdx} == 0\,\|\,\text{treeType} == \text{DUAL\_TREE\_CHROMA ? nTbW} :$$
       $$\text{nTbW*SubWidthC}) > (\text{cIdx} == 0\,\|\,\text{treeType} == \text{DUAL\_TREE\_CHROMA? nTbH} : \text{nTbH*SubHeightC}\,)\,)\,?\,1 : 0$$

$$\text{newTbW} = \text{verSplitFirst ?}\,(\,\text{nTbW} / 2\,) : \text{nTbW} \;(8\text{-}44)$$

$$\text{newTbH} = !\text{verSplitFirst ?}\,(\,\text{nTbH} / 2\,) : \text{nTbH} \;(8\text{-}45)$$

2. The general decoding process for intra blocks as specified in this clause is invoked with the location ( xTb0, yTb0 ), the transform block width nTbW set equal to newTbW and the height nTbH set equal to newTbH, the intra prediction mode predModeIntra, treeType, and the variable cIdx as inputs, and the output is a modified reconstructed picture before in-loop filtering.

3. If verSplitFirst is equal to 1, the general decoding process for intra blocks as specified in this clause is invoked with the location ( xTb0, yTb0 ) set equal to ( xTb0 + newTbW, yTb0 ), the transform block width nTbW set equal to newTbW and the height nTbH set equal to newTbH, the intra prediction mode predModeIntra, treeType, and the variable cIdx as inputs, and the output is a modified reconstructed picture before in-loop filtering.

4. Otherwise (If verSplitFirst is equal to 0), the general decoding process for intra blocks as specified in this clause is invoked with the location ( xTb0, yTb0 ) set equal to ( xTb0, yTb0 + newTbH ), the transform block width nTbW set equal to newTbW and the height nTbH set equal to newTbH, the intra prediction mode predModeIntra, treeType, and the variable cIdx as inputs, and the output is a modified reconstructed picture before in-loop filtering.

- Otherwise, the following ordered steps apply:

Prediction mode derivation

If BdpcmFlag[ xCb ][ yCb ] is equal to 1, IntraPredModeY[ xCb ][ yCb ] is set equal to BdpcmDir[ xCb ][ yCb ] ? INTRA_ANGULAR50 : INTRA_ANGULAR18.

(a)

Residual signal derivation

−  When BdpcmFlag[ xTbY ][ yYbY ] is equal to 1, dz[ x ][ y ] is modified as follows:

−  If BdpcmDir[ xTbY ][ yYbY ] is equal to 0 and x is greater than 0, the following applies:

$$dz[ x ][ y ] = Clip3( CoeffMin, CoeffMax, dz[ x - 1 ][ y ] + dz[ x ][ y ]) \qquad (8\text{-}961)$$

−  Otherwise, if BdpcmDir[ xTbY ][ yYbY ] is equal to 1 and y is greater than 0, the following applies:

$$dz[ x ][ y ] = Clip3( CoeffMin, CoeffMax, dz[ x ][ y - 1 ] + dz[ x ][ y ]) \qquad (8\text{-}962)$$

−  The value dnc[ x ][ y ] is derived as follows:

$$dnc[ x ][ y ] = ( dz[ x ][ y ] * ls[ x ][ y ] + bdOffset ) >> bdShift \qquad (8\text{-}963)$$

−  The scaled transform coefficient d[ x ][ y ] is derived as follows:

$$d[ x ][ y ] = Clip3( CoeffMin, CoeffMax, dnc[ x ][ y ] ) \qquad (8\text{-}964)$$

| coding_unit( x0, y0, cbWidth, cbHeight, cqtDepth, treeType, modeType ) { | Descriptor |
|---|---|
|   chType = treeType == DUAL_TREE_CHROMA ? 1 : 0 | |
|   if( slice_type != I \|\| sps_ibc_enabled_flag \|\| sps_palette_enabled_flag) { | |
|     if( treeType != DUAL_TREE_CHROMA &&<br>     !( ( ( cbWidth == 4 && cbHeight == 4 ) \|\| modeType == MODE_TYPE_INTRA )<br>     && !sps_ibc_enabled_flag ) ) | |
|       cu_skip_flag[ x0 ][ y0 ] | ae(v) |
|     if( cu_skip_flag[ x0 ][ y0 ] == 0 && slice_type != I<br>     && !( cbWidth == 4 && cbHeight == 4 ) && modeType == MODE_TYPE_ALL ) | |
|       pred_mode_flag | ae(v) |
|     if( ( ( slice_type == I && cu_skip_flag[ x0 ][ y0 ] == 0 ) \|\|<br>     ( slice_type != I && ( CuPredMode[ chType ][ x0 ][ y0 ] != MODE_INTRA \|\|<br>      ( cbWidth == 4 && cbHeight == 4 && cu_skip_flag[ x0 ][ y0 ] == 0 ) ) ) ) &&<br>     cbWidth <= 64 && cbHeight <= 64 && modeType != MODE_TYPE_INTER &&<br>     sps_ibc_enabled_flag && treeType != DUAL_TREE_CHROMA ) | |
|       pred_mode_ibc_flag | ae(v) |
|     if( ( ( ( slice_type == I \|\| ( cbWidth == 4 && cbHeight == 4 ) \|\| sps_ibc_enabled_flag ) &&<br>     CuPredMode[ x0 ][ y0 ] == MODE_INTRA ) \|\|<br>     ( slice_type != I && !( cbWidth == 4 && cbHeight == 4 ) && !sps_ibc_enabled_flag<br>     && CuPredMode[ x0 ][ y0 ] != MODE_INTRA ) ) && sps_palette_enabled_flag &&<br>     cbWidth <= 64 && cbHeight <= 64 && && cu_skip_flag[ x0 ][ y0 ] == 0 &&<br>     modeType != MODE_INTER ) | |
|       pred_mode_plt_flag | ae(v) |
|   } | |
|   if( CuPredMode[ chType ][ x0 ][ y0 ] == MODE_INTRA \|\|<br>  CuPredMode[ chType ][ x0 ][ y0 ] == MODE_PLT ) { | |
|     if( treeType == SINGLE_TREE \|\| treeType == DUAL_TREE_LUMA ) { | |
|       if( pred_mode_plt_flag ) { | |
|         if( treeType == DUAL_TREE_LUMA ) | |
|           palette_coding( x0, y0, cbWidth, cbHeight, 0, 1 ) | |
|         else /* SINGLE_TREE */ | |
|           palette_coding( x0, y0, cbWidth, cbHeight, 0, 3 ) | |
|       } else { | |
|         if( sps_bdpcm_enabled_flag &&<br>          cbWidth <= MaxTsSize && cbHeight <= MaxTsSize ) | |
|           intra_bdpcm_flag | ae(v) |
|         if( intra_bdpcm_flag ) | |
|           intra_bdpcm_dir_flag | ae(v) |
|         else { | |
|     // ... | |
|   } | |

*Fig. 28*

| | |
|---|---|
| if( sps_bdpcm_enabled_flag &&<br>  ( cbWidth <= MaxTsSize && cbHeight <= MaxTsSize ) \|\|<br>  ( MaxTbSizeY == 32 && MaxTsSize == 32 ) ) | |
| intra_bdpcm_flag | ae(v) |
| if( intra_bdpcm_flag ) | |
| intra_bdpcm_dir_flag | ae(v) |

(a)

| | |
|---|---|
| if( sps_bdpcm_enabled_flag &&<br>  ( cbWidth <= MaxTsSize && cbHeight <= MaxTsSize ) \|\|<br>  ( MaxTbSizeY == MaxTsSize ) ) | |
| intra_bdpcm_flag | ae(v) |
| if( intra_bdpcm_flag ) | |
| intra_bdpcm_dir_flag | ae(v) |

| merge_data( x0, y0, cbWidth, cbHeight, chType ) { | Descriptor |
|---|---|
|   if ( CuPredMode[ chType ][ x0 ][ y0 ] == MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] == 1 ) { | |
|       if( MaxNumSubblockMergeCand > 1 ) | |
|         merge_subblock_idx[ x0 ][ y0 ] | ae(v) |
|     } else { | |
|       if( ( cbWidth * cbHeight ) >= 64 && ((sps_ciip_enabled_flag && | |
|         cu_skip_flag[ x0 ][ y0 ] == 0 && cbWidth < 128 && cbHeight < 128)|| | |
|         ( sps_triangle_enabled_flag && MaxNumTriangleMergeCand > 1 && | |
|         slice_type == B ) ) ) | |
|         regular_merge_flag[ x0 ][ y0 ] | ae(v) |
|       if ( regular_merge_flag[ x0 ][ y0 ] == 1 ){ | |
|         if( sps_mmvd_enabled_flag ) | |
|           mmvd_merge_flag[ x0 ][ y0 ] | ae(v) |
|         if( mmvd_merge_flag[ x0 ][ y0 ] == 1 ) { | |
|           if( MaxNumMergeCand > 1 ) | |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else { | |
|           if( MaxNumMergeCand > 1 ) | |
|             merge_idx[ x0 ][ y0 ] | ae(v) |
|         } | |
|       } else { | |
|         if( sps_ciip_enabled_flag && sps_triangle_enabled_flag && | |
|           MaxNumTriangleMergeCand > 1 && slice_type == B && | |
|           cu_skip_flag[ x0 ][ y0 ] == 0 && | |
|           ( cbWidth * cbHeight ) >= 64 && cbWidth < 128 && cbHeight < 128 ) { | |
|         ciip_flag[ x0 ][ y0 ] | ae(v) |
|         if( ciip_flag[ x0 ][ y0 ] && MaxNumMergeCand > 1 ) | |
|           merge_idx[ x0 ][ y0 ] | ae(v) |
|         if( !ciip_flag[ x0 ][ y0 ] && MaxNumTriangleMergeCand > 1 ) { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } | |
|       } | |
|     } | |
|   } | |
| } | |

*Fig. 31*

| merge_data( x0, y0, cbWidth, cbHeight, chType ) { | Descriptor |
|---|---|
|   if ( CuPredMode[ chType ][ x0 ][ y0 ] == MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] == 1 ) { | |
|       if( MaxNumSubblockMergeCand > 1 ) | |
|         merge_subblock_idx[ x0 ][ y0 ] | ae(v) |
|     } else { | |
|       if( ( cbWidth * cbHeight ) >= 64 && ( ( sps_ciip_enabled_flag && | |
|         cu_skip_flag[ x0 ][ y0 ] == 0 && cbWidth <= MaxTbSizeY && cbHeight <= MaxTbSizeY ) \|\| | |
|         ( sps_triangle_enabled_flag && MaxNumTriangleMergeCand > 1 && | |
|         slice_type == B ) ) ) | |
|         regular_merge_flag[ x0 ][ y0 ] | ae(v) |
|       if ( regular_merge_flag[ x0 ][ y0 ] == 1 ){ | |
|         if( sps_mmvd_enabled_flag ) | |
|           mmvd_merge_flag[ x0 ][ y0 ] | ae(v) |
|         if( mmvd_merge_flag[ x0 ][ y0 ] == 1 ) { | |
|           if( MaxNumMergeCand > 1 ) | |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else { | |
|           if( MaxNumMergeCand > 1 ) | |
|             merge_idx[ x0 ][ y0 ] | ae(v) |
|         } | |
|       } else { | |
|         if( sps_ciip_enabled_flag && sps_triangle_enabled_flag && | |
|           MaxNumTriangleMergeCand > 1 && slice_type == B && | |
|           cu_skip_flag[ x0 ][ y0 ] == 0 && | |
|           ( cbWidth * cbHeight ) >= 64 && cbWidth <= MaxTbSizeY && cbHeight <= MaxTbSizeY ) { | |
|         ciip_flag[ x0 ][ y0 ] | ae(v) |
|         if( ciip_flag[ x0 ][ y0 ] && MaxNumMergeCand > 1 ) | |
|           merge_idx[ x0 ][ y0 ] | ae(v) |
|         if( !ciip_flag[ x0 ][ y0 ] && MaxNumTriangleMergeCand > 1 ) { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } | |
|       } | |
|     } | |
|   } | |
| } | |

*Fig. 32*

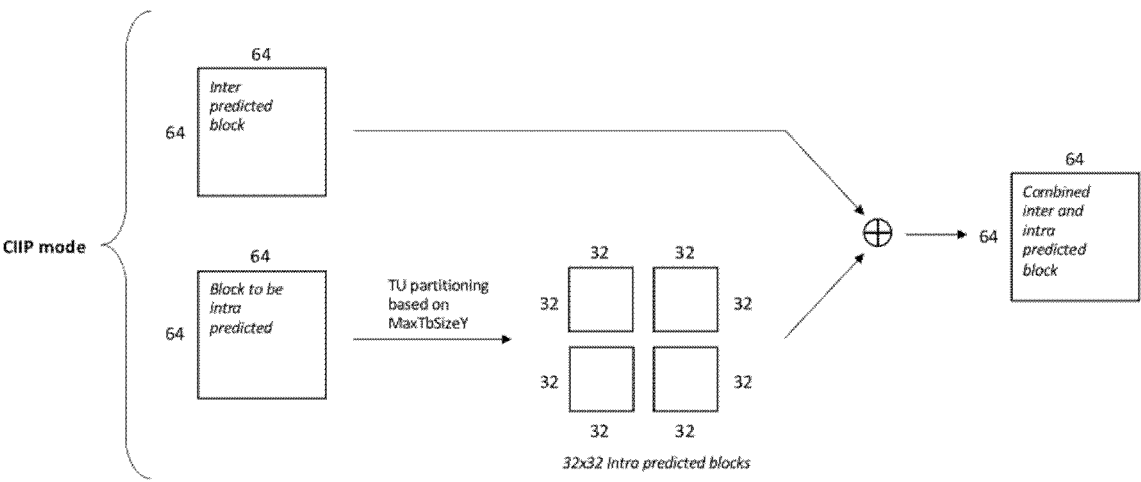

*Fig. 33*

| | |
|---|---|
| if( ( treeType = = SINGLE_TREE \|\| treeType = = DUAL_TREE_CHROMA ) && ChromaArrayType != 0 ) { | |
| if( pred_mode_plt_flag && treeType = = DUAL_TREE_CHROMA ) | |
| palette_coding( x0, y0, cbWidth / SubWidthC, cbHeight / SubHeightC, 1, 2 ) | |
| else { | |
| if( !cu_act_enabled_flag ) { | |
| if( cbWidth <= MaxTsSize && cbHeight <= MaxTsSize && sps_bdpcm_chroma_enabled_flag ) { | (1) |
| intra_bdpcm_chroma_flag | ae(v) |
| if( intra_bdpcm_chroma_flag ) | |
| intra_bdpcm_chroma_dir_flag | ae(v) |
| } else { | |
| if( CclmEnabled ) | |
| cclm_mode_flag | ae(v) |
| if( cclm_mode_flag ) | |
| cclm_mode_idx | ae(v) |
| else | |
| intra_chroma_pred_mode | ae(v) |
| } | |
| } | |
| } | |
| } | |

*Fig. 34*

| | |
|---|---|
| if( ( treeType == SINGLE_TREE \|\| treeType == DUAL_TREE_CHROMA ) && ChromaArrayType != 0 ) { | |
|    if( pred_mode_plt_flag && treeType == DUAL_TREE_CHROMA ) | |
|      palette_coding( x0, y0, cbWidth / SubWidthC, cbHeight / SubHeightC, 1, 2 ) | |
|    else { | |
|      if( !cu_act_enabled_flag ) { | |
|        if( cbWidth <= MaxTsSize && cbHeight <= MaxTsSize && sps_bdpcm_chroma_enabled_flag ) { | (1) |
|          intra_bdpcm_chroma_flag | ae(v) |
|        } | |
|        if( intra_bdpcm_chroma_flag ) { | |
|          intra_bdpcm_chroma_dir_flag | ae(v) |
|        } else { | |
|          if( CclmEnabled ) | (2) |
|            cclm_mode_flag | ae(v) |
|          if( cclm_mode_flag ) | |
|            cclm_mode_idx | ae(v) |
|          else | |
|            intra_chroma_pred_mode | ae(v) |
|        } | |
|      } | |
|    } | |
| } | |

*Fig. 35*

| | |
|---|---|
| sps_transform_skip_enabled_flag | u(1) |
| if( sps_transform_skip_enabled_flag ) | |
|    sps_bdpcm_enabled_flag | u(1) |
| if ( sps_bdpcm_enabled_flag ) | |
|    sps_bdpcm_chroma_enabled_flag | u(1) |

*Fig. 36*

| | |
|---|---|
| sps_transform_skip_enabled_flag | u(1) |
| if( sps_transform_skip_enabled_flag ) | |
|    sps_bdpcm_enabled_flag | u(1) |
| if ( sps_bdpcm_enabled_flag && chroma_format_idc == 3 ) | |
|    sps_bdpcm_chroma_enabled_flag | u(1) |

*Fig. 37*

| | |
|---|---|
| if( ( treeType == SINGLE_TREE \|\| treeType == DUAL_TREE_CHROMA ) && ChromaArrayType != 0 ) { | |
| if( pred_mode_plt_flag  && treeType == DUAL_TREE_CHROMA ) | |
| palette_coding( x0, y0, cbWidth / SubWidthC, cbHeight / SubHeightC, 1, 2 ) | |
| else { | |
| if( !cu_act_enabled_flag ) { | |
| if( cbWidth <= MaxTsSize && cbHeight <= MaxTsSize && sps_bdpcm_enabled_flag ) { | (1) |
| intra_bdpcm_chroma_flag | ae(v) |
| } | |
| if( intra_bdpcm_chroma_flag ) { | |
| intra_bdpcm_chroma_dir_flag | ae(v) |
| } else { | |
| if( CclmEnabled ) | (2) |
| cclm_mode_flag | ae(v) |
| if( cclm_mode_flag ) | |
| cclm_mode_idx | ae(v) |
| else | |
| intra_chroma_pred_mode | ae(v) |
| } | |
| } | |
| } | |
| } | |

Fig. 38

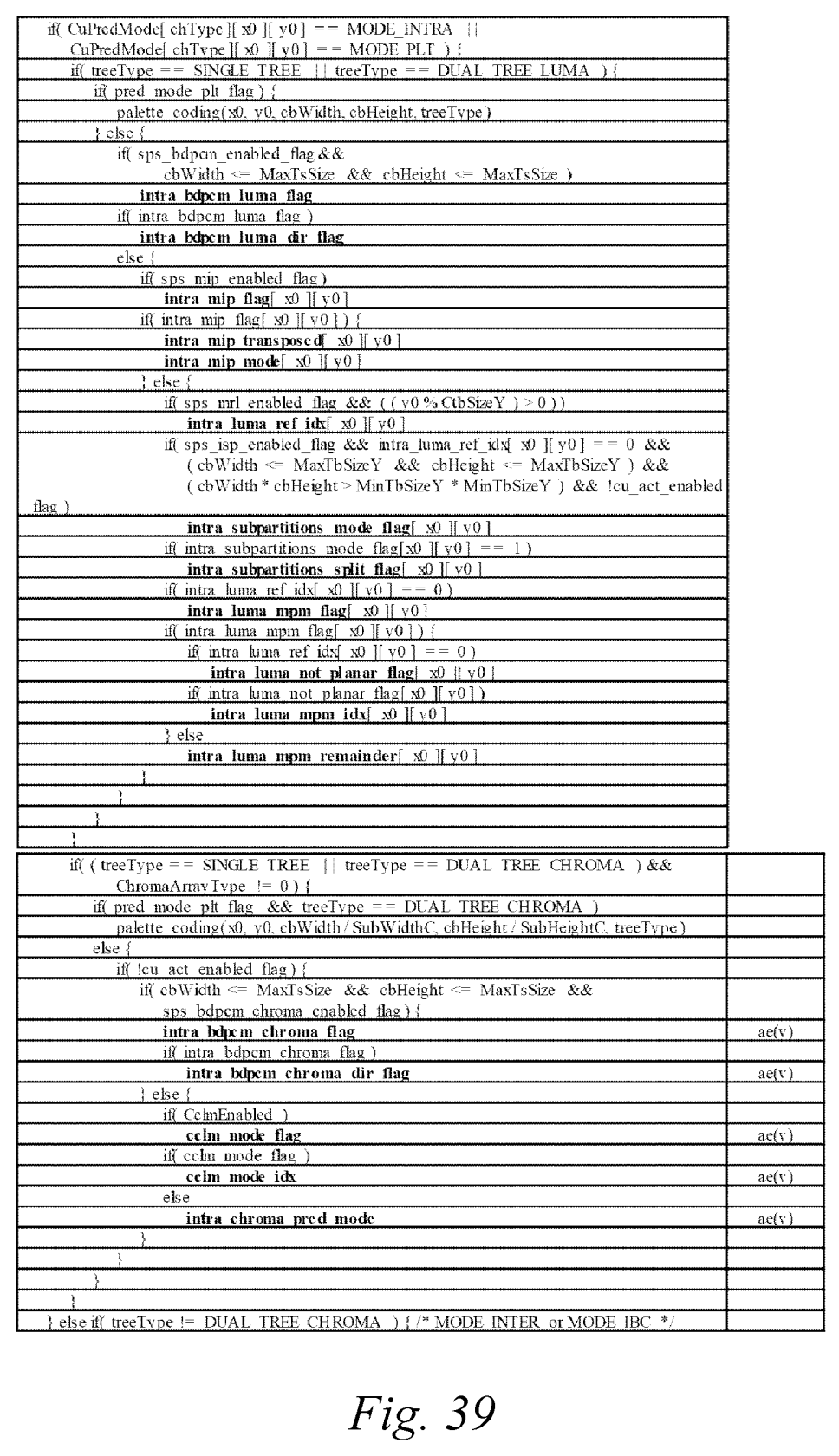

```
if( CuPredMode[ chType ][ x0 ][ y0 ] == MODE_INTRA ||
     CuPredMode[ chType ][ x0 ][ y0 ] == MODE_PLT ) {
   if( treeType == SINGLE_TREE || treeType == DUAL_TREE_LUMA ) {
      if( pred_mode_plt_flag ) {
         palette_coding(x0, y0, cbWidth, cbHeight, treeType )
      } else {
         if( sps_bdpcm_enabled_flag &&
               cbWidth <= MaxTsSize && cbHeight <= MaxTsSize )
            intra_bdpcm_luma_flag
         if( intra_bdpcm_luma_flag )
            intra_bdpcm_luma_dir_flag
         else {
            if( sps_mip_enabled_flag )
               intra_mip_flag[ x0 ][ y0 ]
            if( intra_mip_flag[ x0 ][ y0 ] ) {
               intra_mip_transposed[ x0 ][ y0 ]
               intra_mip_mode[ x0 ][ y0 ]
            } else {
               if( sps_mrl_enabled_flag && ( ( y0 % CtbSizeY ) > 0 ) )
                  intra_luma_ref_idx[ x0 ][ y0 ]
               if( sps_isp_enabled_flag && intra_luma_ref_idx[ x0 ][ y0 ] == 0 &&
                     ( cbWidth <= MaxTbSizeY && cbHeight <= MaxTbSizeY ) &&
                     ( cbWidth * cbHeight > MinTbSizeY * MinTbSizeY ) && !cu_act_enabled
flag )
                  intra_subpartitions_mode_flag[ x0 ][ y0 ]
               if( intra_subpartitions_mode_flag[x0 ][ y0 ] == 1 )
                  intra_subpartitions_split_flag[ x0 ][ y0 ]
               if( intra_luma_ref_idx[ x0 ][ y0 ] == 0 )
                  intra_luma_mpm_flag[ x0 ][ y0 ]
               if( intra_luma_mpm_flag[ x0 ][ y0 ] ) {
                  if( intra_luma_ref_idx[ x0 ][ y0 ] == 0 )
                     intra_luma_not_planar_flag[ x0 ][ y0 ]
                  if( intra_luma_not_planar_flag[ x0 ][ y0 ] )
                     intra_luma_mpm_idx[ x0 ][ y0 ]
               } else
                  intra_luma_mpm_remainder[ x0 ][ y0 ]
            }
         }
      }
   }
```

| | |
|---|---|
| `if( ( treeType == SINGLE_TREE || treeType == DUAL_TREE_CHROMA ) &&` | |
| `      ChromaArrayType != 0 ) {` | |
| `   if( pred_mode_plt_flag && treeType == DUAL_TREE_CHROMA )` | |
| `      palette_coding(x0, y0, cbWidth / SubWidthC, cbHeight / SubHeightC, treeType )` | |
| `   else {` | |
| `      if( !cu_act_enabled_flag ) {` | |
| `         if( cbWidth <= MaxTsSize && cbHeight <= MaxTsSize &&` | |
| `               sps_bdpcm_chroma_enabled_flag ) {` | |
| `            intra_bdpcm_chroma_flag` | ae(v) |
| `            if( intra_bdpcm_chroma_flag )` | |
| `               intra_bdpcm_chroma_dir_flag` | ae(v) |
| `         } else {` | |
| `            if( CclmEnabled )` | |
| `               cclm_mode_flag` | ae(v) |
| `            if( cclm_mode_flag )` | |
| `               cclm_mode_idx` | ae(v) |
| `            else` | |
| `               intra_chroma_pred_mode` | ae(v) |
| `         }` | |
| `      }` | |
| `   }` | |
| `}` | |
| `} else if( treeType != DUAL_TREE_CHROMA ) { /* MODE_INTER or MODE_IBC */` | |

*Fig. 39*

| | |
|---|---|
| if( CuPredMode[ chType ][ x0 ][ y0 ] == MODE_INTRA  \|\| | |
|     CuPredMode[ chType ][ x0 ][ y0 ] == MODE_PLT ) { | |
|     if( treeType == SINGLE_TREE  \|\| treeType == DUAL_TREE_LUMA ) { | |
|       if( pred_mode_plt_flag ) { | |
|         palette_coding( x0, y0, cbWidth, cbHeight, treeType ) | |
|       } else { | |
|         if( sps_bdpcm_enabled_flag && | |
|            cbWidth <= MaxTsSize && cbHeight <= MaxTsSize ) | |
|            intra_bdpcm_luma_flag | ae(v) |
|         if( intra_bdpcm_luma_flag ) | |
|            intra_bdpcm_luma_dir_flag | ae(v) |
|       } | |
|     } | |
|     if( ( treeType == SINGLE_TREE  \|\| treeType == DUAL_TREE_CHROMA ) && | |
|       ChromaArrayType != 0 ) { | |
|       if( ( !pred_mode_plt_flag \|\| treeType != DUAL_TREE_CHROMA ) && !cu_act_enabled_ | |
| flag ) { | |
|         if( cbWidth <= MaxTsSize && cbHeight <= MaxTsSize && | |
|            sps_bdpcm_chroma_enabled_flag ) { | |
|            intra_bdpcm_chroma_flag | ae(v) |
|            if( intra_bdpcm_chroma_flag ) | |
|            intra_bdpcm_chroma_dir_flag | ae(v) |
|         } | |
|       } | |
|     } | |
|     if( treeType == SINGLE_TREE  \|\| treeType == DUAL_TREE_LUMA ) { | |
|       if( !pred_mode_plt_flag && !intra_bdpcm_luma_flag ) { | |
|         if( sps_mip_enabled_flag ) | |
|            intra_mip_flag[ x0 ][ y0 ] | ae(v) |
|         if( intra_mip_flag[ x0 ][ y0 ] ) { | |
|            intra_mip_transposed[ x0 ][ y0 ] | ae(v) |
|            intra_mip_mode[ x0 ][ y0 ] | ae(v) |
|         } else { | |
|            if( sps_mrl_enabled_flag && ( ( y0 % CtbSizeY ) > 0 ) ) | |
|            intra_luma_ref_idx[ x0 ][ y0 ] | ae(v) |
|            if( sps_isp_enabled_flag && intra_luma_ref_idx[ x0 ][ y0 ] == 0 && | |
|              ( cbWidth <= MaxTbSizeY && cbHeight <= MaxTbSizeY ) && | |
|              ( cbWidth * cbHeight > MinTbSizeY * MinTbSizeY ) && !cu_act_enabled | |
| flag ) | |
|            intra_subpartitions_mode_flag[ x0 ][ y0 ] | ae(v) |
|            if( intra_subpartitions_mode_flag[ x0 ][ y0 ] == 1 ) | |
|            intra_subpartitions_split_flag[ x0 ][ y0 ] | ae(v) |
|            if( intra_luma_ref_idx[ x0 ][ y0 ] == 0 ) | |
|            intra_luma_mpm_flag[ x0 ][ y0 ] | ae(v) |
|            if( intra_luma_mpm_flag[ x0 ][ y0 ] ) { | |
|              if( intra_luma_ref_idx[ x0 ][ y0 ] == 0 ) | |
|              intra_luma_not_planar_flag[ x0 ][ y0 ] | ae(v) |
|              if( intra_luma_not_planar_flag[ x0 ][ y0 ] ) | |
|              intra_luma_mpm_idx[ x0 ][ y0 ] | ae(v) |
|            } else | |
|              intra_luma_mpm_remainder[ x0 ][ y0 ] | ae(v) |
|            } | |
|           } | |
|         } | |
|       } | |
|     } | |
|     if( ( treeType == SINGLE_TREE  \|\| treeType == DUAL_TREE_CHROMA ) && | |
|       ChromaArrayType != 0 ) { | |
|       if( pred_mode_plt_flag && treeType == DUAL_TREE_CHROMA ) | |
|         palette_coding( x0, y0, cbWidth / SubWidthC, cbHeight / SubHeightC, treeType ) | |
|       else { | |
|         if( !cu_act_enabled_flag ) { | |
|            { | |
|            if( CclmEnabled ) | |
|            cclm_mode_flag | ae(v) |
|            if( cclm_mode_flag ) | |
|            cclm_mode_idx | ae(v) |
|            else | |
|            intra_chroma_pred_mode | ae(v) |
|            } | |
|         } | |
|       } | |
|     } | |
| } else if( treeType != DUAL_TREE_CHROMA ) { /* MODE_INTER or MODE_IBC */ | |

*Fig. 40*

| seq_parameter_set_rbsp( ) { | Descriptor |
|---|---|
|   sps_decoding_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   sps_seq_parameter_set_id | u(4) |
|   chroma_format_idc | u(2) |
|   if( chroma_format_idc == 3 ) | |
|     separate_colour_plane_flag | u(1) |
|   ref_pic_resampling_enabled_flag | u(1) |
|   pic_width_max_in_luma_samples | ue(v) |
|   pic_height_max_in_luma_samples | ue(v) |
|   sps_log2_ctu_size_minus5 | u(2) |
|   subpics_present_flag | u(1) |
|   if( subpics_present_flag ) { | |
|     sps_num_subpics_minus1 | u(8) |
|     for( i = 0; i <= sps_num_subpics_minus1; i++ ) { | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|     } | |
|   } | |
|   sps_subpic_id_present_flag | u(1) |
|   if( sps_subpics_id_present_flag ) { | |
|     sps_subpic_id_signalling_present_flag | u(1) |
|     if( sps_subpics_id_signalling_present_flag ) { | |
|       sps_subpic_id_len_minus1 | ue(v) |
|       for( i = 0; i <= sps_num_subpics_minus1; i++ ) | |
|         sps_subpic_id[ i ] | u(v) |
|     } | |
|   } | |

*Fig. 41* pic_width_max_in_luma_samples specifies the maximum width, in units of luma samples, of each decoded picture referring to the SPS. pic_width_max_in_luma_samples shall not be equal to 0 and shall be an integer multiple of Max( 8, MinCbSizeY ).

pic_height_max_in_luma_samples specifies the maximum height, in units of luma samples, of each decoded picture referring to the SPS. pic_height_max_in_luma_samples shall not be equal to 0 and shall be an integer multiple of Max( 8, MinCbSizeY ).

subpic_ctu_top_left_x[ i ] specifies horizontal position of top left CTU of i-th subpicture in unit of CtbSizeY. The length of the syntax element is Ceil( Log2( pic_width_max_in_luma_samples / CtbSizeY ) ) bits. When not present, the value of subpic_ctu_top_left_x[ i ] is inferred to be equal to 0.

subpic_ctu_top_left_y[ i ] specifies vertical position of top left CTU of i-th subpicture in unit of CtbSizeY. The length of the syntax element is Ceil( Log2( pic_height_max_in_luma_samples / CtbSizeY ) ) bits. When not present, the value of subpic_ctu_top_left_y[ i ] is inferred to be equal to 0.

subpic_width_minus1[ i ] plus 1 specifies the width of the i-th subpicture in units of CtbSizeY. The length of the syntax element is Ceil( Log2( pic_width_max_in_luma_samples / CtbSizeY ) ) bits. When not present, the value of subpic_width_minus1[ i ] is inferred to be equal to Ceil( pic_width_max_in_luma_samples / CtbSizeY ) − 1.

subpic_height_minus1[ i ] plus 1 specifies the height of the i-th subpicture in units of CtbSizeY. The length of the syntax element is Ceil( Log2( pic_height_max_in_luma_samples / CtbSizeY ) ) bits. When not present, the value of subpic_height_minus1[ i ] is inferred to be equal to Ceil( pic_height_max_in_luma_samples / CtbSizeY ) − 1.

*Fig. 42*

| | |
|---|---|
| + | Addition |
| − | Subtraction (as a two-argument operator) or negation (as a unary prefix operator) |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7 / 4 and −7 / −4 are truncated to 1 and −7 / 4 and 7 / −4 are truncated to −1. |
| ÷ | Used to denote division in mathematical equations where no truncation or rounding is intended. |
| $\frac{x}{y}$ | Used to denote division in mathematical equations where no truncation or rounding is intended. |
| $\sum_{i=x}^{y} f(i)$ | The summation of f( i ) with i taking all integer values from x up to and including y. |
| x % y | Modulus. Remainder of x divided by y, defined only for integers x and y with x >= 0 and y > 0. |

*Fig. 43*

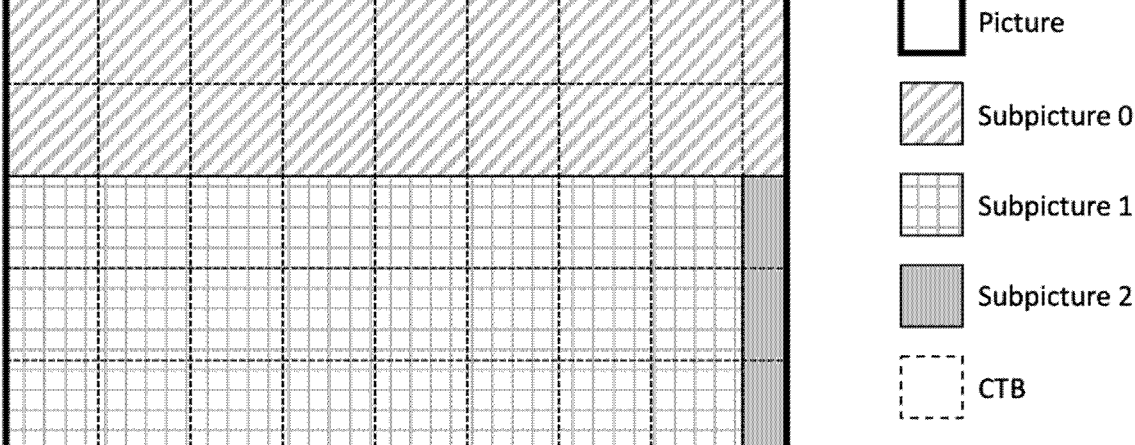

*Fig. 44* subpic_ctu_top_left_x[ i ] specifies horizontal position of top left CTU of i-th subpicture in unit of CtbSizeY. The length of the syntax element is Ceil( Log2( pic_width_max_in_luma_samples ÷ CtbSizeY ) ) bits. When not present, the value of subpic_ctu_top_left_x[ i ] is inferred to be equal to 0.

subpic_ctu_top_left_y[ i ] specifies vertical position of top left CTU of i-th subpicture in unit of CtbSizeY. The length of the syntax element is Ceil( Log2( pic_height_max_in_luma_samples ÷ CtbSizeY ) ) bits. When not present, the value of subpic_ctu_top_left_y[ i ] is inferred to be equal to 0.

subpic_width_minus1[ i ] plus 1 specifies the width of the i-th subpicture in units of CtbSizeY. The length of the syntax element is Ceil( Log2( pic_width_max_in_luma_samples ÷ CtbSizeY ) ) bits. When not present, the value of subpic_width_minus1[ i ] is inferred to be equal to Ceil( pic_width_max_in_luma_samples ÷ CtbSizeY ) − 1.

subpic_height_minus1[ i ] plus 1 specifies the height of the i-th subpicture in units of CtbSizeY. The length of the syntax element is Ceil( Log2( pic_height_max_in_luma_samples ÷ CtbSizeY ) ) bits. When not present, the value of subpic_height_minus1[ i ] is inferred to be equal to Ceil( pic_height_max_in_luma_samples ÷ CtbSizeY ) − 1.

METHOD AND DEVICE FOR PROCESSING VIDEO SIGNAL

CROSS-REFERENCE TO RELATED APPLICATIONS

This application is a continuation of pending PCT International Application No. PCT/KR2020/009563, which was filed on Jul. 20, 2020, and which claims priority under 35 U.S.C 119(a) to Korean Patent Application No. 10-2019-0087951 filed with the Korean Intellectual Property Office on Jul. 19, 2019, Korean Patent Application No. 10-2019-0102908 filed with the Korean Intellectual Property Office on Aug. 22, 2019, Korean Patent Application No. 10-2019-0128764 filed with the Korean Intellectual Property Office on Oct. 16, 2019, and Korean Patent Application No. 10-2019-0171122 filed with the Korean Intellectual Property Office on Dec. 19, 2019. The disclosures of the above patent applications are incorporated herein by reference in their entirety.

TECHNICAL FIELD

The present disclosure relates to a video signal processing method and device and, more specifically, to a video signal processing method and device by which a video signal is encoded or decoded.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF THE INVENTION

Technical Problem

An object of the present invention is to increase coding efficiency of the video signal.

An object of the present invention is to increase the coding efficiency of the video signal through partitioning of a transform unit (block).

An object of the present invention is to efficiently receive a prediction mode selected by an encoder in an intra prediction method.

Technical Solution

This specification provides a method for processing a video signal using a secondary transform.

Specifically, a video signal decoding device includes a processor, in which the processor determines a result value that indicates a partitioning direction of a current transform block (TB) on the basis of preset conditions, splits the current transform block into a plurality of transform blocks on the basis of the result value, and decodes a video signal by using the plurality of transform blocks, and the preset conditions include a condition related to a color component of the current transform block.

In addition, in this specification, the preset conditions additionally include a condition related to a result of comparing a width of the current transform block and a maximum transform block width, and the maximum transform block width is determined on the basis of a chroma format related to the current transform block, a color component of the current transform block, and a maximum transform size.

In addition, in this specification, the preset conditions additionally includes a condition related to a result of comparing a first width value that is a value obtained by multiplying the width of the current transform block by a first value, and a first height value that is a value obtained by multiplying a height of the current transform block by a second value, the first value and the second value are values related to the width of the current transform block and the height of the current transform block, respectively, and the first value and the second value are respectively set to 1 if the color component of the current transform block is luma, and are respectively determined on the basis of the chroma format related to the current transform block if the color component of the current transform block is chroma.

In addition, in this specification, when the width of the current transform block is greater than the maximum transform block width and the first width value is greater than the first height value, the result value is determined to be 1, which is a value indicating that the partitioning direction is a vertical direction, a width of each of the plurality of transform blocks is a value obtained by dividing the width of the transform block by 2, and a height of each of the plurality of transform blocks is the same as the height of the transform block.

In addition, in this specification, when the width of the current transform block is less than or equal to the maximum transform block width, or the first width value is less than or equal to the first height value, the result value is determined to be 0, which is a value indicating that the partitioning direction is a horizontal direction, a width of each of the plurality of transform blocks is the same as the width of the transform block, and a height of each of the plurality of transform blocks is a value obtained by dividing the height of the transform block by 2.

In addition, in this specification, the maximum transform size is determined on the basis of a size of a coding tree block (CTB) having a luma component included in a coding tree unit (CTU) related to the current transform block.

In addition, in this specification, when the size of the coding tree block is 32, the maximum transform size is 32.

In addition, in the present specification, if the color component of the current transform block is chroma, the processor parses a syntax element indicating whether or not a prediction method of a coding block related to the current transform block is block-based delta pulse code modulation (BDPCM), additionally parses a syntax element related to the prediction method of the coding block when the prediction method of the coding block is not BDPCM as a result of the parsing, and determines the prediction method of the coding block on the basis of the parsing result, and the syntax element related to the prediction method of the coding block is a syntax element indicating at least one of a cross component linear model (CCLM), a planar mode, a DC mode, a vertical mode, a horizontal mode, a diagonal mode, and a DM mode.

In addition, a video signal encoding device includes a processor, in which the processor determines a result value that indicates a partitioning direction of a current transform block (TB) on the basis of preset conditions, splits the current transform block into a plurality of transform blocks on the basis of the result value, and generates a bitstream including information on the plurality of transform blocks, and the preset conditions include a condition related to a color component of the current transform block.

In addition, in this specification, the preset conditions additionally include a condition related to a result of comparing a width of the current transform block and a maximum transform block width, and the maximum transform block width is determined on the basis of a chroma format related to the current transform block, a color component of the current transform block, and a maximum transform size.

In addition, in this specification, the preset conditions additionally includes a condition related to a result of comparing a first width value that is a value obtained by multiplying the width of the current transform block by a first value, and a first height value that is a value obtained by multiplying a height of the current transform block by a second value, the first value and the second value are values related to the width of the current transform block and the height of the current transform block, respectively, and the first value and the second value are respectively set to 1 if the color component of the current transform block is luma, and are respectively determined on the basis of the chroma format related to the current transform block if the color component of the current transform block is chroma.

In addition, in this specification, when the width of the current transform block is greater than the maximum transform block width, and the first width value is greater than the first height value, the result value is determined to be 1, which is a value indicating that the partitioning direction is a vertical direction, a width of each of the plurality of transform blocks is a value obtained by dividing the width of the transform block by 2, and a height of each of the plurality of transform blocks is the same as the height of the transform block.

In addition, in this specification, when the width of the current transform block is less than or equal to the maximum transform block width, or the first width value is less than or equal to the first height value, the result value is determined to be 0, which is a value indicating that the partitioning direction is a horizontal direction, a width of each of the plurality of transform blocks is the same as the width of the transform block, and a height of each of the plurality of transform blocks is a value obtained by dividing the height of the transform block by 2.

In addition, in this specification, the maximum transform size is determined on the basis of a size of a coding tree block (CTB) having a luma component included in a coding tree unit (CTU) related to the current transform block.

In addition, in this specification, when the size of the coding tree block is 32, the maximum transform size is 32.

In addition, in the present specification, if the color component of the current transform block is chroma, the processor parses a syntax element indicating whether or not a prediction method of a coding block related to the current transform block is block-based delta pulse code modulation (BDPCM), additionally parses a syntax element related to the prediction method of the coding block when the prediction method of the coding block is not BDPCM as a result of the parsing, and determines the prediction method of the coding block on the basis of the parsing result, and the syntax element related to the prediction method of the coding block is a syntax element indicating at least one of a cross component linear model (CCLM), a planar mode, a DC mode, a vertical mode, a horizontal mode, a diagonal mode, and a DM mode.

In addition, a non-transitory computer-readable medium for storing a bitstream, the bitstream is encoded by an encoding method, the encoding method including the steps of determining a result value that indicates a partitioning direction of a current transform block (TB) on the basis of preset conditions, partitioning the current transform block into a plurality of transform blocks on the basis of the result value, and encoding a bitstream including information on the plurality of transform blocks, in which the preset conditions include a condition related to a color component of the current transform block.

In addition, in this specification, the preset conditions additionally include a condition related to a result of comparing a width of the current transform block and a maximum transform block width, and the maximum transform block width is determined on the basis of a chroma format related to the current transform block, a color component of the current transform block, and a maximum transform size.

In addition, in this specification, the preset conditions additionally includes a condition related to a result of comparing a first width value that is a value obtained by multiplying the width of the current transform block by a first value, and a first height value that is a value obtained by multiplying a height of the current transform block by a second value, the first value and the second value are values related to the width of the current transform block and the height of the current transform block, respectively, and the first value and the second value are respectively set to 1 if the color component of the current transform block is luma, and are respectively determined on the basis of the chroma format related to the current transform block if the color component of the current transform block is chroma.

In addition, in this specification, the maximum transform size is determined on the basis of a size of a coding tree block (CTB) having a luma component included in a coding tree unit (CTU) related to the current transform block.

Advantageous Effects

An embodiment of the present invention provides a method for processing a video signal using partitioning of a transform unit and an apparatus therefor.

An embodiment of the present invention provides a method for processing a video signal for efficiently receiving a prediction mode selected by an encoder in an intra prediction method and an apparatus therefor.

5

Figures 8, 9:
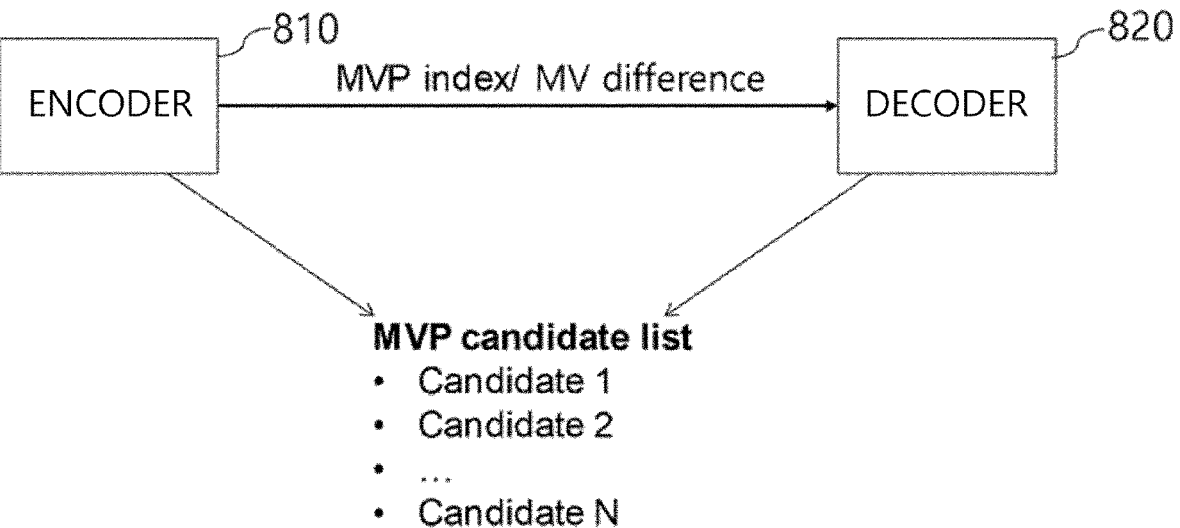

FIG. 8 is a diagram illustrating a method of signaling a motion vector of a current block according to an embodiment of the present invention.

FIG. 9 is a diagram illustrating a method of signaling a motion vector difference value of the current block according to an embodiment of the present invention.

Figure 10:
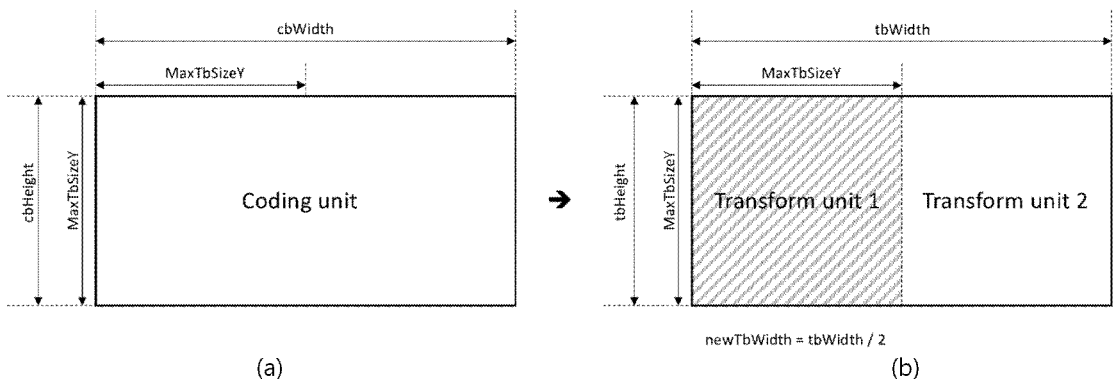

FIG. 10 is a diagram illustrating a coding unit and a transform unit according to an embodiment of the present invention.

FIG. 11 is a diagram illustrating transform tree syntax according to an embodiment of the present invention.

FIG. 12 is a diagram illustrating a decoding process in an intra block according to an embodiment of the present invention.

FIG. 13 is a diagram illustrating a decoding process of a residual signal according to an embodiment of the present invention.

FIG. 14 is a diagram illustrating a relationship between color components according to an embodiment of the present invention.

FIG. 15 is a diagram illustrating a relationship between color components according to an embodiment of the present invention.

FIG. 16 is a diagram illustrating a maximum transform size according to an embodiment of the present invention.

FIG. 17 is a diagram illustrating syntax at a higher level according to an embodiment of the present invention.

FIG. 18 is a diagram illustrating transform tree syntax according to an embodiment of the present invention.

Figure 19:
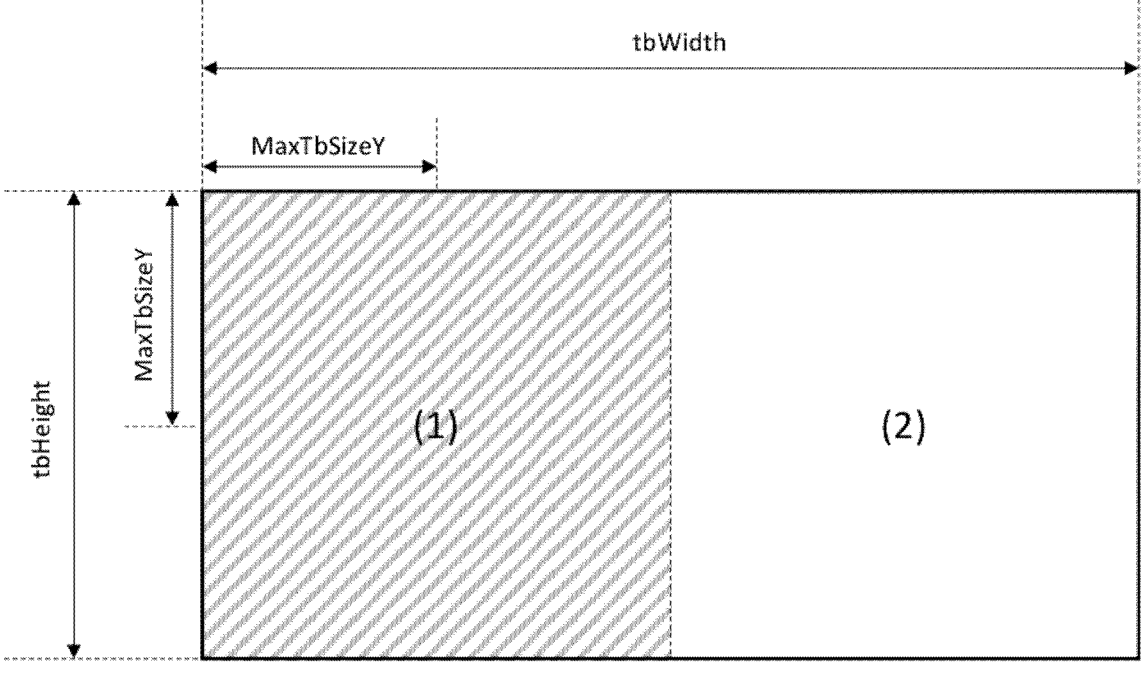

FIG. 19 is a diagram illustrating TU partitioning according to an embodiment of the present invention.

Figure 20:
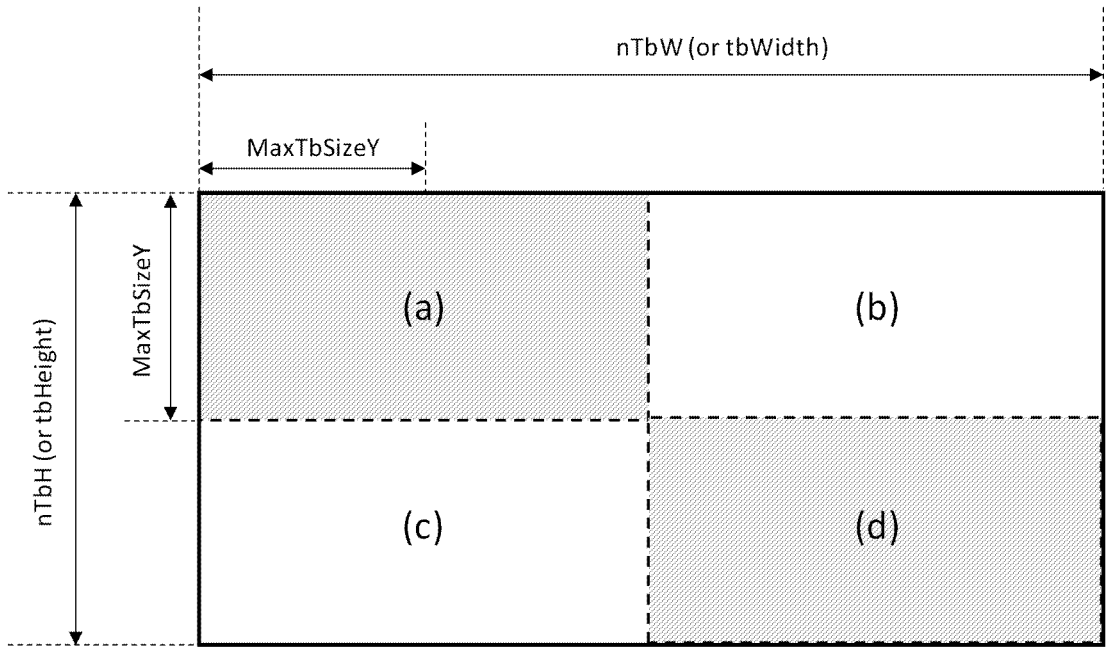

FIG. 20 is a diagram illustrating TU partitioning according to an embodiment of the present invention.

FIG. 21 is a diagram illustrating a decoding process according to an embodiment of the present invention.

FIG. 22 is a diagram illustrating a decoding process according to an embodiment of the present invention.

FIG. 23 is a diagram illustrating higher level syntax according to an embodiment of the present invention.

FIG. 24 is a diagram illustrating higher level syntax according to an embodiment of the present invention.

FIG. 25 is a diagram illustrating transform tree syntax according to an embodiment of the present invention.

FIG. 26 is a diagram illustrating a decoding process according to an embodiment of the present invention.

FIG. 27 is a diagram illustrating a method of performing BDPCM according to an embodiment of the present invention.

FIG. 28 is a diagram illustrating syntax related to BDPCM according to an embodiment of the present invention.

FIG. 29 is a diagram illustrating a BDPCM usable condition according to an embodiment of the present invention.

Figure 30:
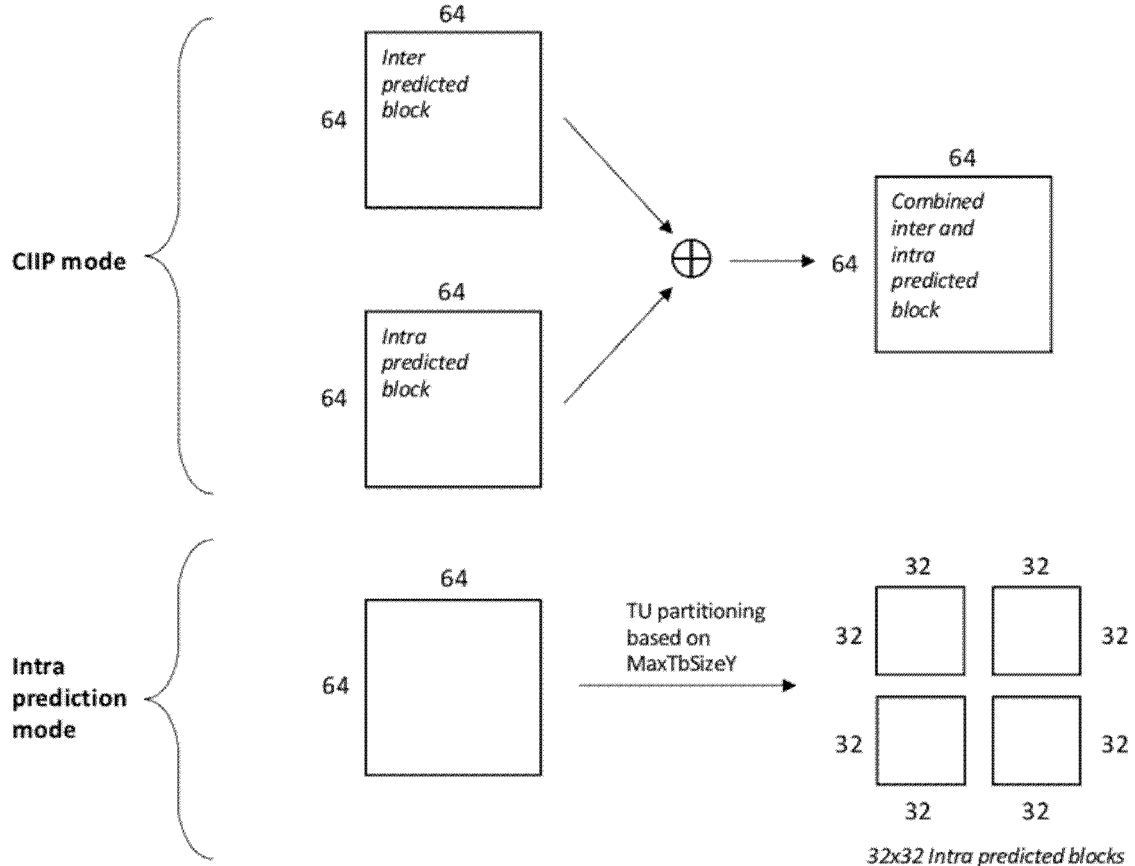

FIG. 30 is a diagram illustrating CIIP and intra prediction according to an embodiment of the present invention.

FIG. 31 is a diagram illustrating merge data syntax according to an embodiment of the present invention.

FIG. 32 is a diagram illustrating merge data syntax according to an embodiment of the present invention.

FIG. 33 is a diagram illustrating a method of performing a CIIP mode according to an embodiment of the present invention.

FIG. 34 is a diagram illustrating a chroma BDPCM syntax structure according to an embodiment of the present invention.

FIG. 35 is a diagram illustrating a chroma BDPCM syntax structure according to an embodiment of the present invention.

FIG. 36 is a diagram illustrating higher level syntax related to BDPCM according to an embodiment of the present invention.

FIG. 37 is a diagram illustrating syntax elements signaled at a higher level regarding BDPCM according to an embodiment of the present invention.

FIG. 38 is a diagram illustrating syntax related to chroma BDPCM according to an embodiment of the present invention.

FIG. 39 is a diagram illustrating syntax related to intra prediction according to an embodiment of the present invention.

FIG. 40 is a diagram illustrating syntax related to intra prediction according to an embodiment of the present invention.

FIG. 41 is a diagram illustrating sequence parameter set syntax according to an embodiment of the present invention.

FIG. 42 is a diagram illustrating syntax elements related to a subpicture according to an embodiment of the present invention.

FIG. 43 is a diagram illustrating operators according to an embodiment of the present invention.

FIG. 44 is a diagram illustrating a picture and subpictures according to an embodiment of the present invention.

FIG. 45 is a diagram illustrating syntax elements related to the subpictures according to an embodiment of the present invention.

Figure 46:
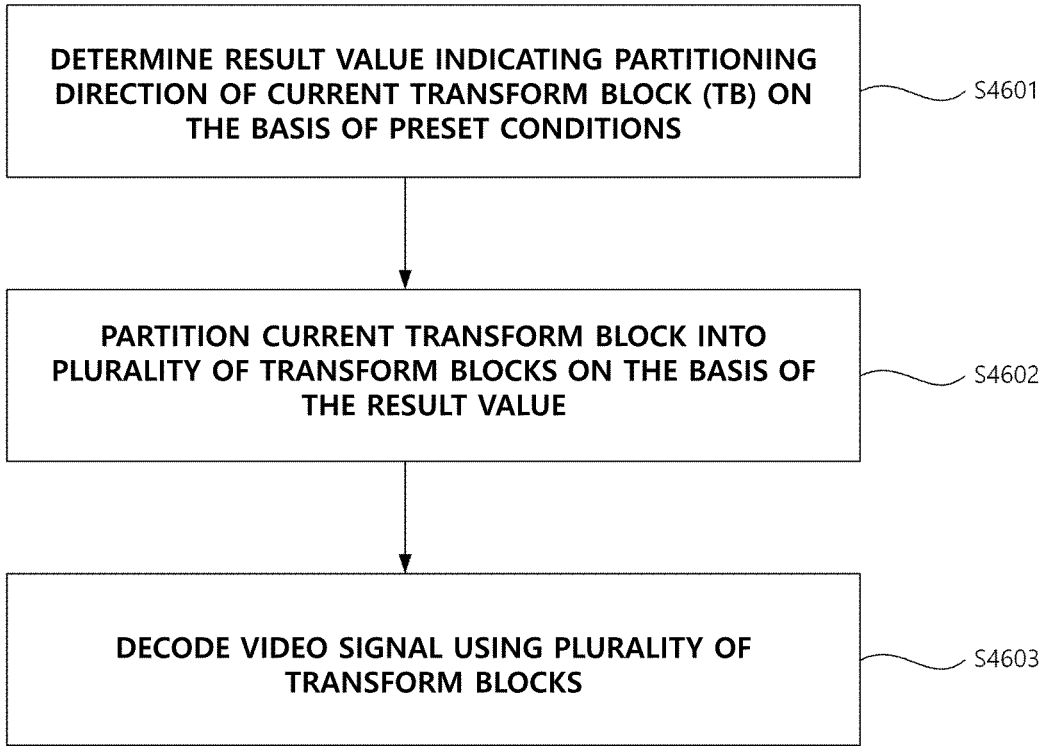

FIG. 46 is a diagram illustrating a method of partitioning a transform block according to an embodiment of the present invention.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
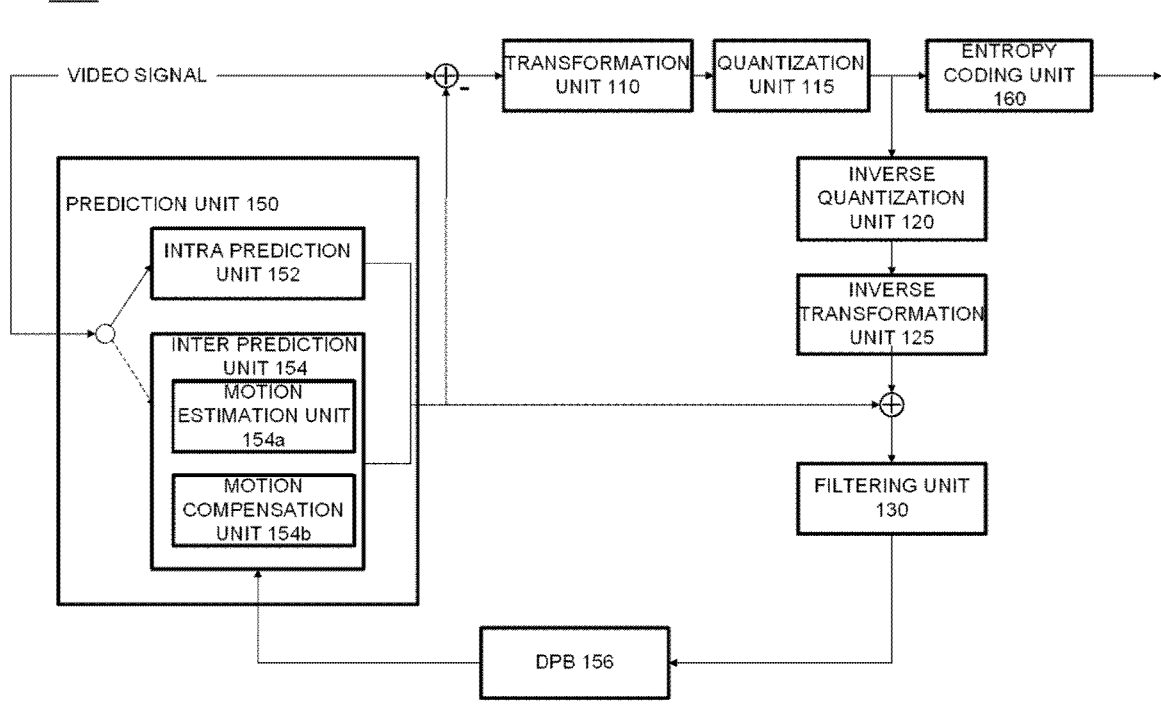
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to improve coding efficiency, a picture signal is not coded as it is, but a method of predicting a picture via the prediction unit 150 by using a region that has been already coded, and adding, to the predicted picture, a residual value between an original picture and the predicted picture, thereby obtaining a reconstructed picture. The intra prediction unit 152 performs intra prediction within a current picture, and the inter prediction unit 154 predicts the current picture by using a reference picture stored in the decoding picture buffer 156. The intra prediction unit 152 performs intra prediction from reconstructed regions in the current picture, and transfers intra coding information to the entropy coding unit 160. The inter prediction unit 154 may include a motion estimation unit 154a and a motion compensation unit 154b. The motion estimation unit 154a obtains a motion vector value of the current region by referring to a specific reconstructed region. The motion estimation unit 154a transfers location information (reference frame, motion vector, etc.) of the reference region to the entropy coding unit 160 so as to enable the location information to be included in a bitstream. The motion compensation unit 154b performs inter motion compensation by using the motion vector value transferred from the motion estimation unit 154a.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The intra encoding information may include information on a reference sample. The inter prediction unit 154 may include the motion estimation unit 154a and the motion compensation unit 154b. The motion estimation unit 154a obtains a motion vector value of the current region by referring to a specific region of the reconstructed reference picture. The motion estimation unit 154a transfers a motion information set (reference picture index, motion vector information, etc.) for the reference region to the entropy coding unit 160. The motion compensation unit 154b performs motion compensation by using the motion vector value transferred from the motion estimation unit 154a. The inter prediction unit 154 transfers inter encoding information including motion information on the reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding the video signal bitstream can be transmitted through a raw byte sequence payload (RBSP) of a higher level set such as a picture parameter set (PPS), a sequence parameter set (SPS), and a video parameter set (VPS).

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
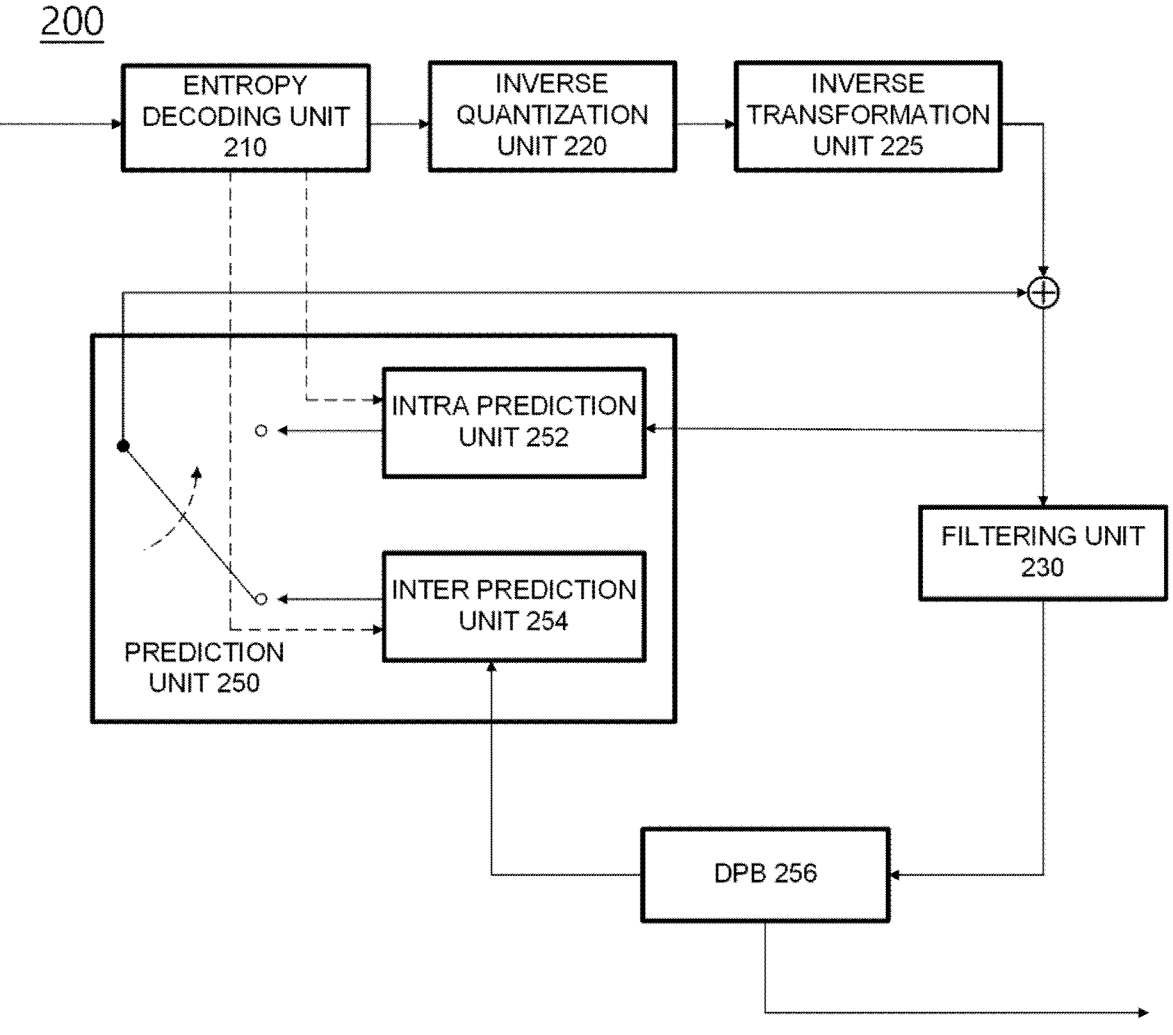
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 restores a residual value by using the inverse-quantized transform coefficient. The video signal processing device 200 restores an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that can perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may reconstruct the current region by referring to a specific region including reconstructed samples in the current picture. The intra BC prediction unit obtains intra BC encoding information for the current region from the entropy decoding unit 210. The intra BC prediction unit obtains a block vector value of the current region indicating the specific region in the current picture. The intra BC prediction unit may perform intra BC prediction by using the obtained block vector value. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
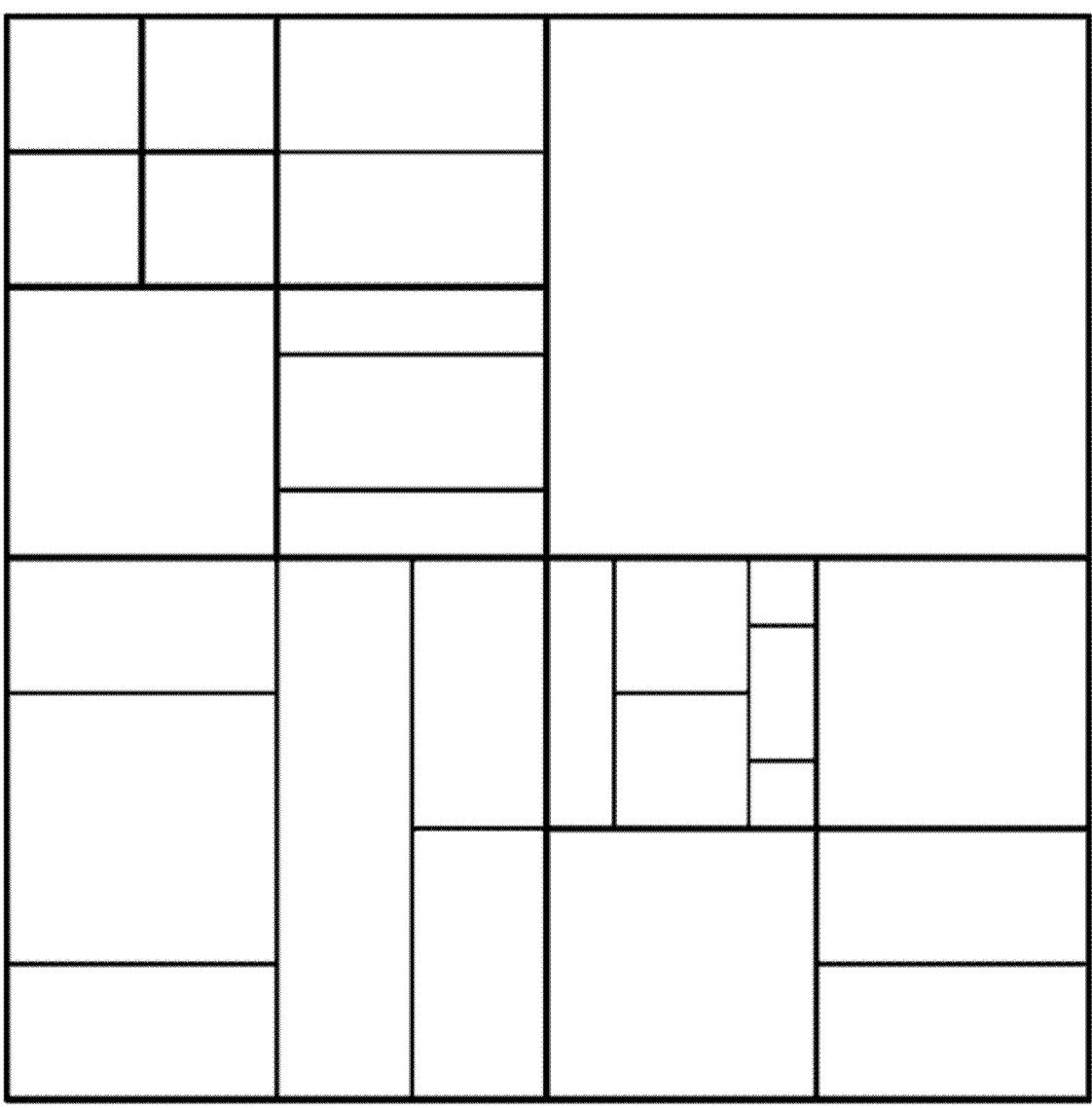
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

A leaf node of the multi-type tree can be a coding unit. When the coding unit is not greater than the maximum transform length, the coding unit can be used as a unit of prediction and/or transform without further splitting. As an embodiment, when the width or height of the current coding unit is greater than the maximum transform length, the current coding unit can be split into a plurality of transform units without explicit signaling regarding splitting. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
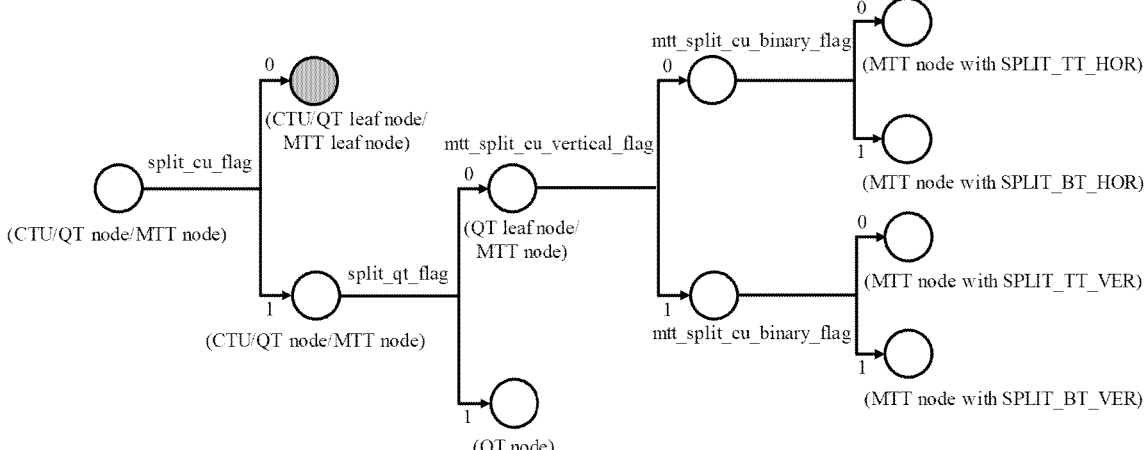
FIG. 4 shows an embodiment of a method for signaling a division of a quad tree and a multi-type tree.

FIG. 4 illustrates an embodiment of a method of signaling splitting of the quad tree and multi-type tree. Preset flags can be used to signal the splitting of the quad tree and multi-type tree described above. Referring to FIG. 4, at least one of a flag 'split_cu_flag' indicating whether or not to split a node, a flag 'split_qt_flag' indicating whether or not to split a quad tree node, a flag 'mtt_split_cu_vertical_flag' indicating a splitting direction of the multi-type tree node, or a flag 'mtt_split_cu_binary_flag' indicating a splitting shape of the multi-type tree node can be used.

According to an embodiment of the present invention, 'split_cu_flag', which is a flag indicating whether or not to split the current node, can be signaled first. When the value of 'split_cu_flag' is 0, it indicates that the current node is not split, and the current node becomes a coding unit. When the current node is the coating tree unit, the coding tree unit includes one unsplit coding unit. When the current node is a quad tree node 'QT node', the current node is a leaf node 'QT leaf node' of the quad tree and becomes the coding unit. When the current node is a multi-type tree node 'MTT node', the current node is a leaf node 'MTT leaf node' of the multi-type tree and becomes the coding unit.

When the value of 'split_cu_flag' is 1, the current node can be split into nodes of the quad tree or multi-type tree according to the value of 'split_qt_flag'. A coding tree unit is a root node of the quad tree, and can be split into a quad tree structure first. In the quad tree structure, 'split_qt_flag' is signaled for each node 'QT node'. When the value of 'split_qt_flag' is 1, the corresponding node is split into 4 square nodes, and when the value of 'qt_split_flag' is 0, the corresponding node becomes the 'QT leaf node' of the quad tree, and the corresponding node is split into multi-type nodes. According to an embodiment of the present invention, quad tree splitting can be limited according to the type of the current node. Quad tree splitting can be allowed when the current node is the coding tree unit (root node of the quad tree) or the quad tree node, and quad tree splitting may not be allowed when the current node is the multi-type tree node. Each quad tree leaf node 'QT leaf node' can be further split into a multi-type tree structure. As described above, when 'split_qt_flag' is 0, the current node can be split into multi-type nodes. In order to indicate the splitting direction and the splitting shape, 'mtt_split_cu_vertical_flag' and 'mtt_split_cu_binary_flag' can be signaled. When the value of 'mtt_split_cu_vertical_flag' is 1, vertical splitting of the node 'WITT node' is indicated, and when the value of 'mtt_split_cu_vertical_flag' is 0, horizontal splitting of the node 'WITT node' is indicated. In addition, when the value of 'mtt_split_cu_binary_flag' is 1, the node 'WITT node' is split into two rectangular nodes, and when the value of 'mtt_split_cu_binary_flag' is 0, the node 'WITT node' is split into three rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
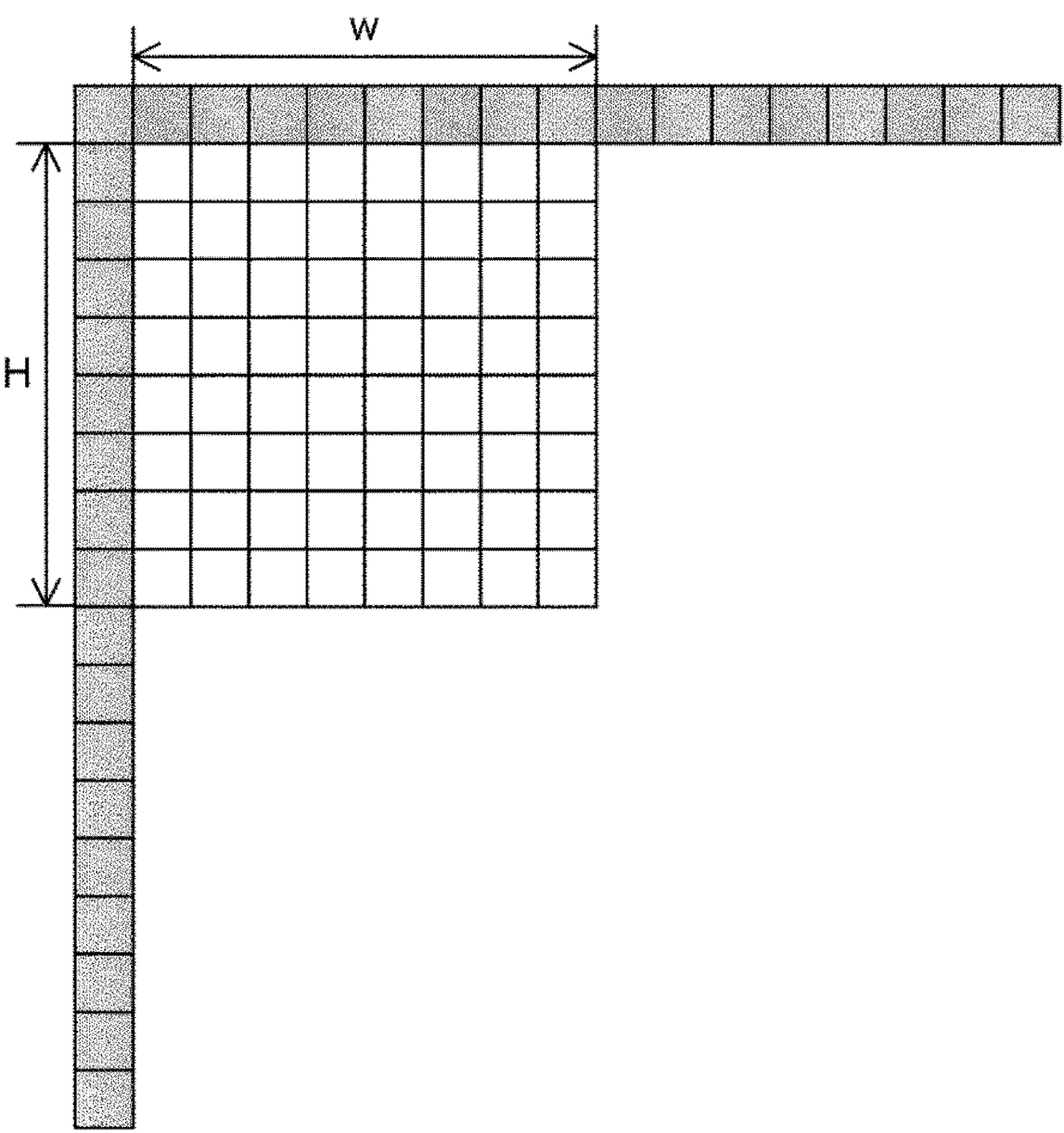
FIGS. 5 and 6 illustrate an intra-prediction method in more detail according to an embodiment of the present disclosure.
Figure 6:
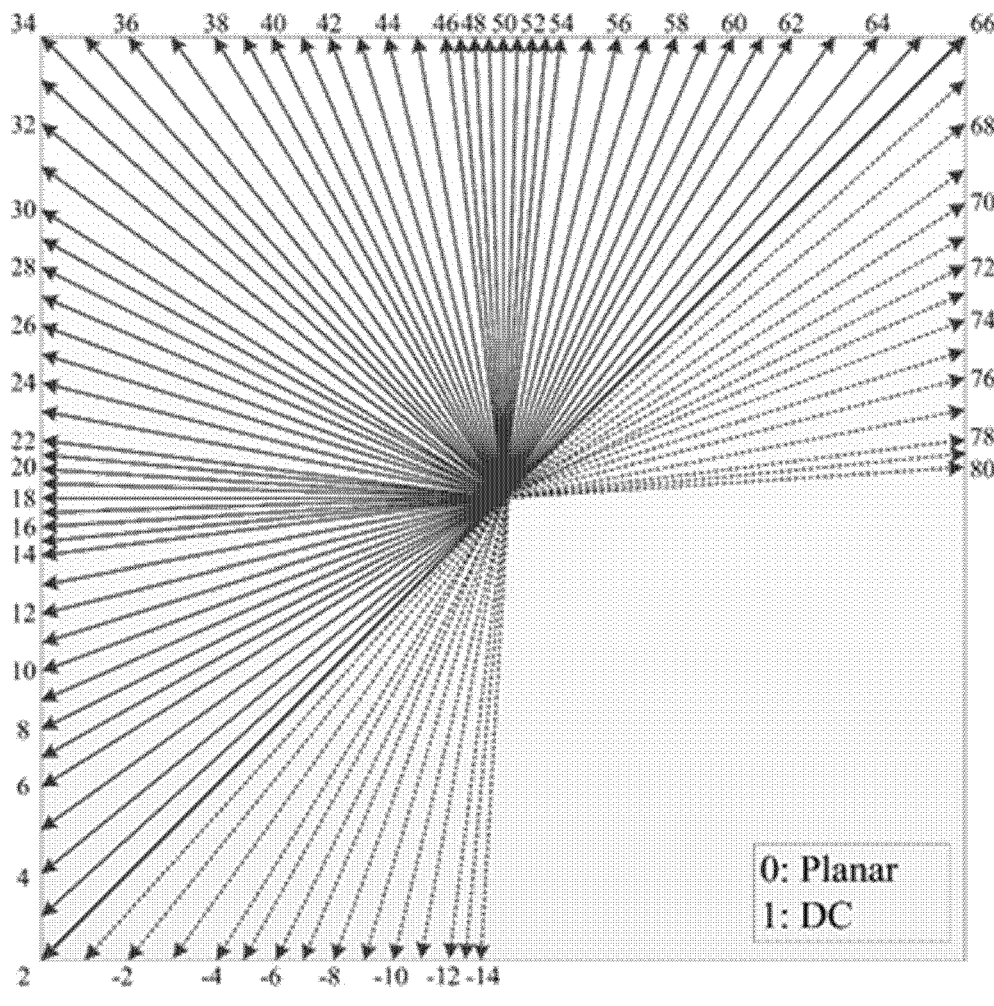

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2 W+2H+1 neighboring samples located on the left and/or upper side of the current block.

When at least some samples to be used as reference samples have not yet been restored, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, the preset angle range can be set differently depending on a shape of the current block. For example, if the current block is a rectangular block, a wide angle mode indicating an angle exceeding 45 degrees or less than −135 degrees in a clockwise direction can be additionally used. When the current block is a horizontal block, an angle mode can indicate an angle within an angle range (i.e., a second angle range) between (45+offset1) degrees and (−135+offset1) degrees in a clockwise direction. In this case, angle modes 67 to 76 outside the first angle range can be additionally used. In addition, if the current block is a vertical block, the angle mode can indicate an angle within an angle range (i.e., a third angle range) between (45−offset2) degrees and (−135−offset2) degrees in a clockwise direction. In this case, angle modes −10 to −1 outside the first angle range can be additionally used. According to an embodiment of the present disclosure, values of offset1 and offset2 can be determined differently depending on a ratio between the width and height of the rectangular block. In addition, offset1 and offset2 can be positive numbers.

According to a further embodiment of the present invention, a plurality of angle modes configuring the intra prediction mode set can include a basic angle mode and an extended angle mode. In this case, the extended angle mode can be determined based on the basic angle mode.

According to an embodiment, the basic angle mode is a mode corresponding to an angle used in intra prediction of the existing high efficiency video coding (HEVC) standard, and the extended angle mode can be a mode corresponding to an angle newly added in intra prediction of the next generation video codec standard. More specifically, the basic angle mode can be an angle mode corresponding to any one of the intra prediction modes {2, 4, 6, . . . , 66}, and the extended angle mode can be an angle mode corresponding to any one of the intra prediction modes {3, 5, 7, . . . , 65}. That is, the extended angle mode can be an angle mode between basic angle modes within the first angle range. Accordingly, the angle indicated by the extended angle mode can be determined on the basis of the angle indicated by the basic angle mode.

According to another embodiment, the basic angle mode can be a mode corresponding to an angle within a preset first angle range, and the extended angle mode can be a wide angle mode outside the first angle range. That is, the basic angle mode can be an angle mode corresponding to any one of the intra prediction modes {2, 3, 4, . . . , 66}, and the extended angle mode can be an angle mode corresponding to any one of the intra prediction modes {−10, −9, . . . , −1} and {67, 68, . . . , 76}. The angle indicated by the extended angle mode can be determined as an angle on a side opposite to the angle indicated by the corresponding basic angle mode. Accordingly, the angle indicated by the extended angle mode can be determined on the basis of the angle indicated by the basic angle mode. Meanwhile, the number of extended angle modes is not limited thereto, and additional extended angles can be defined according to the size and/or shape of the current block. For example, the extended angle mode can be defined as an angle mode corresponding to any one of the intra prediction modes {−14, −13, . . . , −1} and {67, 68, . . . , 80}. Meanwhile, the total number of intra prediction modes included in the intra prediction mode set can vary depending on the configuration of the basic angle mode and extended angle mode described above.

In the embodiments described above, the spacing between the extended angle modes can be set on the basis of the spacing between the corresponding basic angle modes. For example, the spacing between the extended angle modes {3, 5, 7, . . . , 65} can be determined on the basis of the spacing between the corresponding basic angle modes {2, 4, 6, . . . , 66}. In addition, the spacing between the extended angle modes {−10, −9, . . . , −1} can be determined on the basis of the spacing between corresponding basic angle modes {56, 57, . . . , 65} on the opposite side, and the spacing between the extended angle modes {67, 68, . . . , 76} can be determined on the basis of the spacing between the corresponding basic angle modes {3, 4, . . . , 12} on the opposite side. The angular spacing between the extended angle modes can be set to be the same as the angular spacing between the corresponding basic angle modes. In addition, the number of extended angle modes in the intra prediction mode set can be set to be less than or equal to the number of basic angle modes.

According to an embodiment of the present invention, the extended angle mode can be signaled based on the basic angle mode. For example, the wide angle mode (i.e., the extended angle mode) can replace at least one angle mode (i.e., the basic angle mode) within the first angle range. The basic angle mode to be replaced can be a corresponding angle mode on a side opposite to the wide angle mode. That is, the basic angle mode to be replaced is an angle mode that corresponds to an angle in an opposite direction to the angle indicated by the wide angle mode or that corresponds to an angle that differs by a preset offset index from the angle in the opposite direction. According to an embodiment of the present invention, the preset offset index is 1. The intra prediction mode index corresponding to the basic angle mode to be replaced can be remapped to the wide angle mode to signal the corresponding wide angle mode. For example, the wide angle modes {−10, −9, . . . , −1} can be signaled by the intra prediction mode indices {57, 58, . . . , 66}, respectively, and the wide angle modes {67, 68, . . . , 76} can be signaled by the intra prediction mode indices {2, 3, . . . , 11}, respectively. In this way, the intra prediction mode index for the basic angle mode signals the extended angle mode, and thus the same set of intra prediction mode indices can be used for signaling the intra prediction mode even if the configuration of the angle modes used for intra prediction of each block are different from each other. Accordingly, signaling overhead due to a change in the intra prediction mode configuration can be minimized.

Meanwhile, whether or not to use the extended angle mode can be determined on the basis of at least one of the shape and size of the current block. According to an embodiment, when the size of the current block is greater than a preset size, the extended angle mode can be used for intra prediction of the current block, otherwise, only the basic angle mode can be used for intra prediction of the current block. According to another embodiment, when the current block is a block other than a square, the extended angle mode can be used for intra prediction of the current block, and when the current block is a square block, only the basic angle mode can be used for intra prediction of the current block.

Hereinafter, an inter prediction method according to an embodiment of the present invention will be described with reference to FIG. 7. The inter prediction method described herein may include a general inter prediction method optimized for translation motion and an affine model-based inter prediction method. Also, the motion vector may include at least one of a general motion vector for motion compensation according to the general inter prediction method and a control point motion vector for affine motion compensation.

Figure 7:
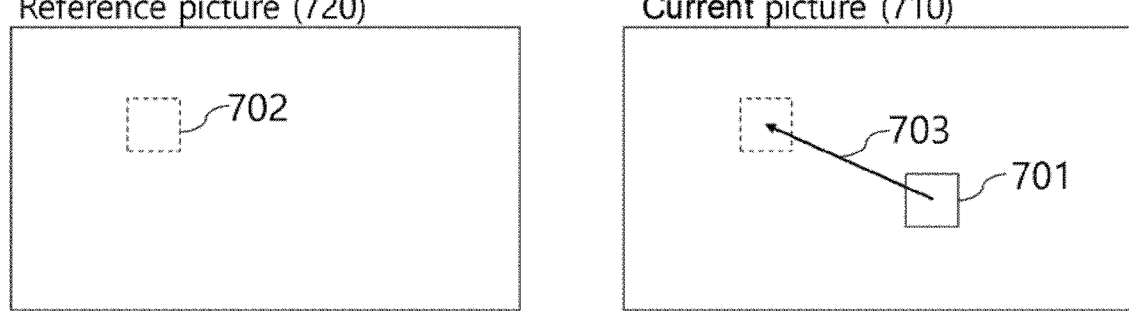
FIG. 7 is a diagram illustrating an inter prediction method according to an embodiment of the present invention.

FIG. 7 is a diagram illustrating an inter prediction method according to an embodiment of the present invention. As described above, the decoder may predict a current block with reference to reconstructed samples of another decoded picture. Referring to FIG. 7, the decoder obtains a reference block 702 in a reference picture 720 on the basis of a motion information set of a current block 701. In this case, the motion information set may include a reference picture index and a motion vector 703. The reference picture index indicates the reference picture 720 including the reference block for inter prediction of the current block in the reference picture list. According to an embodiment, the reference picture list may include at least one of the L0 picture list and L1 picture list described above. The motion vector 703 represents an offset between a coordinate value of the current block 701 in the current picture 710 and a coordinate value of the reference block 702 in the reference picture 720. The decoder obtains a predictor of the current block 701 on the basis of sample values of the reference block 702, and reconstructs the current block 701 using the predictor.

Specifically, the encoder may obtain the reference block described above by searching for a block similar to the current block in pictures having an earlier reconstruction order. For example, the encoder may search for a reference block for which a sum of a difference between the current block and the sample value is the minimum within a preset search area. In this case, in order to measure similarity between samples of the current block and the reference block, at least one of sum of absolute difference (SAD) and sum of hadamard transformed difference (SATD) may be used. Here, the SAD may be a value obtained by adding all absolute values of the respective differences between the sample values included in the two blocks. In addition, the SATD may be a value obtained by adding all absolute values of Hadamard transform coefficients obtained by performing Hadamard transform on the differences between sample values included in the two blocks.

Meanwhile, the current block may be predicted using one or more reference areas. As described above, the current block may be inter-predicted through the bi-prediction method using two or more reference regions. According to an embodiment, the decoder may obtain two reference blocks on the basis of two sets of motion information of the current block. In addition, the decoder may obtain a first predictor and a second predictor of the current block on the basis of the obtained sample values of each of the two reference blocks. In addition, the decoder may reconstruct the current block using the first predictor and the second predictor. For example, the decoder may reconstruct the current block on the basis of an average on a per sample basis of the first predictor and the second predictor.

As described above, for motion compensation of the current block, one or more sets of motion information may be signaled. In this case, the similarity between the motion information sets for motion compensation of each of the plurality of blocks may be used. For example, the motion information set used for prediction of the current block may be derived from the motion information set used for prediction of any one of other previously reconstructed samples. In this way, the encoder and decoder may reduce signaling overhead. Hereinafter, various embodiments in which the motion information set of the current block is signaled will be described.

FIG. 8 is a diagram illustrating a method of signaling the motion vector of the current block according to an embodiment of the present invention. According to an embodiment of the present invention, the motion vector of the current block may be derived from a motion vector predictor (MVP) of the current block. According to an embodiment, the motion vector predictor referenced to derive the motion vector of the current block may be obtained using the motion vector predictor (MVP) candidate list. The MVP candidate list may include a preset number of MVP candidates (Candidate 1, Candidate 2, . . . , Candidate N).

According to an embodiment, the MVP candidate list may include at least one of a spatial candidate and a temporal candidate. The spatial candidate may be a motion information set used for prediction of neighboring blocks within a certain range from the current block in the current picture. The spatial candidate may be constructed on the basis of available neighboring blocks among neighboring blocks of the current block. In addition, the temporal candidate may be a motion information set used for prediction of blocks in a picture different from the current picture. For example, the temporal candidate may be constructed on the basis of a specific block corresponding to the position of the current block in a specific reference picture. In this case, the position of the specific block represents the position of the top-left sample of the specific block in the reference picture. According to an additional embodiment, the MVP candidate list may include a zero motion vector. According to an additional embodiment, a rounding process may be performed on MVP candidates included in the MVP candidate list of the current block. In this case, resolution of a motion vector difference value of the current block, which will be described later, may be used. For example, each of the MVP candidates of the current block may be rounded on the basis of the resolution of the motion vector difference value of the current block.

In the present disclosure, the MVP candidate list may include an advanced temporal motion vector prediction (ATMVP) list, a merge candidate list for merge inter prediction, a control point motion vector candidate list for affine motion compensation, a subblock-based temporal motion vector prediction (STMVP) list, and a combination thereof.

According to an embodiment, an encoder 810 and a decoder 820 may construct the MVP candidate list for motion compensation of the current block. For example, among samples reconstructed before the current block, candidates corresponding to samples that are likely to have been predicted on the basis of the same or similar motion information set to the motion information set of the current block may exist. The encoder 810 and the decoder 820 may construct the MVP candidate list of the current block on the basis of the plurality of candidate blocks. In this case, encoder 810 and the decoder 820 may construct the MVP candidate list according to a predefined rule between the encoder 810 and the decoder 820. That is, the MVP candidate lists respectively constructed in the encoder 810 and the decoder 820 may be identical to each other.

In addition, the predefined rule may vary depending on the prediction mode of the current block. For example, when the prediction mode of the current block is the affine model-based affine prediction mode, the encoder and the decoder may construct the MVP candidate list of the current block using a first method based on the affine model. The first method may be a method of obtaining a control point motion vector candidate list. On the other hand, when the prediction mode of the current block is a general inter prediction mode not based on the affine model, the encoder and the decoder may construct the MVP candidate list of the current block using a second method not based on the affine model. In this case, the first method and the second method may be different methods.

The decoder 820 may derive the motion vector of the current block on the basis of any one of at least one MVP candidate included in the MVP candidate list of the current block. For example, the encoder 810 may signal an MVP index indicating a motion vector predictor to be referenced to derive the motion vector of the current block. The decoder 820 may obtain the motion vector predictor of the current block on the basis of the signaled MVP index. The decoder 820 may derive the motion vector of the current block using the motion vector predictor. According to an embodiment, the decoder 820 may use the motion vector predictor obtained from the MVP candidate list as the motion vector of the current block without a separate motion vector difference value. The decoder 820 may reconstruct the current block on the basis of the motion vector of the current block. The inter prediction mode in which the motion vector predictor obtained from the MVP candidate list is used as the motion vector of the current block without the separate motion vector difference value may be referred to as a merge mode.

According to another embodiment, the decoder 820 may obtain a separate motion vector difference for the motion vector of the current block. The decoder 820 may obtain the motion vector of the current block by adding the motion vector predictor obtained from the MVP candidate list and the motion vector difference value of the current block. In this case, the encoder 810 may signal a motion vector (MV) difference value MV difference indicating the difference between the motion vector of the current block and the motion vector predictor. A method of signaling the motion vector difference value will be described in detail with reference to FIG. 9. The decoder 820 may obtain the motion vector of the current block on the basis of the motion vector difference value MV difference. The decoder 820 may reconstruct the current block on the basis of the motion vector of the current block.

Additionally, a reference picture index for motion compensation of the current block may be signaled. In the prediction of mode of the current block, the encoder 810 may signal the reference picture index indicating a reference picture including the reference block. The decoder 820 may obtain the POC of the reference picture to be referenced for reconstruction of the current block on the basis of the signaled reference picture index. In this case, the POC of the reference picture may be different from the POC of the reference picture corresponding to the MVP referenced to derive the motion vector of the current block. In this case, the decoder 820 may perform motion vector scaling. That is, the decoder 820 may obtain MVP' by scaling the MVP. In this case, the motion vector scaling may be performed on the basis of the POC of the current picture, the POC of the signaled reference picture of the current block, and the POC of the reference picture corresponding to the MVP. In addition, the decoder 820 may use the MVP' as the motion vector predictor of the current block.

As described above, the motion vector of the current block may be obtained by summing the motion vector predictor of the current block and the motion vector difference value. In this case, the motion vector difference value may be signaled from the encoder. The encoder may encode the motion vector difference value to generate and signal information representing the motion vector difference value. Hereinafter, a method of signaling the motion vector difference value according to an embodiment of the present invention will be described.

FIG. 9 is a diagram illustrating a method of signaling the motion vector difference value of the current block according to an embodiment of the present invention. According to an embodiment, information indicating the motion vector difference value may include at least one of absolute value information of the motion vector difference value and sign information of the motion vector difference value. The absolute value and sign of the motion vector difference value may be encoded separately.

According to an embodiment, the absolute value of the motion vector difference value may not be signaled as the value itself. The encoder may reduce the magnitude of the value to be signaled, by using at least one flag indicating a characteristic of the absolute value of the motion vector difference value. The decoder may derive the absolute value of the motion vector difference value from the signaled value by using at least one flag.

For example, the at least one flag may include a first flag indicating whether the absolute value of the motion vector difference value is greater than N. In this case, N may be an integer. When the magnitude of the absolute value of the motion vector difference value is greater than N, a value of (absolute value of the motion vector difference value−N) may be signaled together with an activated first flag. In this case, the activated flag may indicate a case in which the magnitude of the absolute value of the motion vector difference value is greater than N. The decoder may obtain the absolute value of the motion vector difference value on the basis of the activated first flag and the signaled value.

Referring to FIG. 9, a second flag abs_mvd_greater0_flag indicating whether the absolute value of the motion vector difference value is greater than '0' may be signaled. When the second flag abs_mvd_greater0_flag[ ] indicates that the absolute value of the motion vector difference value is not greater than '0', the absolute value of the motion vector difference value may be '0'. In addition, when the second flag abs_mvd_greater0_flag indicates that the absolute value of the motion vector difference value is greater than '0', the decoder may obtain the absolute value of the motion vector difference value using other information about the motion vector difference value.

According to an embodiment, a third flag abs_mvd_greater1_flag indicating whether the absolute value of the motion vector difference value is greater than '1' may be signaled. When the third flag abs_mvd_greater1_flag indicates that the absolute value of the motion vector difference value is not greater than '1', the decoder may determine that the absolute value of the motion vector difference value is '1'.

In contrast, when the third flag abs_mvd_greater1_flag indicates that the absolute value of the motion vector difference value is greater than '1', the decoder may obtain the absolute value of the motion vector difference value using another information about the motion vector difference value. For example, a value of abs_mvd_minus2 (absolute value of motion vector difference value−2) may be signaled. This is because, when the absolute value of the motion vector difference value is greater than '1', the absolute value of the motion vector difference value may be a value of 2 or more.

As described above, the absolute value of the motion vector difference value of the current block may be deformed into at least one flag. For example, the deformed absolute value of the motion vector difference value may represent (absolute value of motion vector difference value−N) according to the magnitude of the motion vector difference value. According to an embodiment, the deformed absolute value of the motion vector difference value may be signaled through at least one bit. In this case, the number of bits signaled to indicate the transformed absolute value of the motion vector difference value may be variable. The encoder may encode the deformed absolute value of the motion vector difference value using a variable length binarization method. For example, the encoder may use at least one of truncated unary binarization, unary binarization, truncated rice, or exp-Golomb binarization as the variable length binarization method.

In addition, the sign of the motion vector difference value may be signaled through a sign flag mvd_sign_flag. Meanwhile, the sign of the motion vector difference value may be implicitly signaled by sign-bit-hiding.

Meanwhile, the motion vector difference value of the current block described above may be signaled in units of specific resolution. In this disclosure, the resolution of the motion vector difference value may indicate a unit in which the motion vector difference value is signaled. That is, in the present disclosure, resolutions other than the resolution of the picture may represent precision or granularity at which the motion vector difference value is signaled. The resolution of the motion vector difference value may be expressed in units of samples or pixels. For example, the resolution of the motion vector difference value may be expressed using units of samples, such as quarter, half, one, two, or four sample units. In addition, as the resolution of the motion vector difference value of the current block is smaller, the precision of the motion vector difference value of the current block may increase.

According to an embodiment of the present invention, the motion vector difference value may be signaled on the basis of various resolutions. According to an embodiment, the absolute value or the deformed absolute value of the motion vector difference value may be signaled as a value in units of integer samples. Alternatively, the absolute value of the motion vector difference value may be signaled as a value in units of ½-subpels. That is, the resolution of the motion vector difference value may be set differently depending on the situation. The encoder and decoder according to an embodiment of the present invention may efficiently signal the motion vector difference value of the current block by appropriately utilizing various resolutions for the motion vector difference value.

According to an embodiment, the resolution of the motion vector difference value may be set to a different value for each unit of at least one of a block, a coding unit, a slice, or a tile. For example, first resolution of the motion vector difference value of the first block may be a unit of ¼ sample. In this case, '64', which is a value obtained by dividing the absolute value '16' of the motion vector difference value by the first resolution, may be signaled. In addition, second resolution of the motion vector difference value of the second block may be an integer sample unit. In this case, '16', which is a value obtained by dividing the absolute value '16' of the second motion vector difference value by the second resolution, may be signaled. As such, even when the absolute values of the motion vector difference values are the same, different values may be signaled according to resolutions. In this case, when the value obtained by dividing the absolute value of the motion vector difference value by the resolution includes decimal places, a rounding function may be applied to the corresponding value.

The encoder may signal information indicating the motion vector difference value on the basis of the resolution of the motion vector difference value. The decoder may obtain a modified motion vector difference value from the signaled motion vector difference value. The decoder may modify the motion vector difference value on the basis of the resolution of the resolution difference value. The relationship between a signaled motion vector difference value valuePerResolution of the current block and a modified motion vector difference value valueDetermined is expressed by Equation 1 below. Hereinafter, in the present disclosure, unless otherwise specified, the motion vector difference value indicates the modified motion vector difference value valueDetermined. In addition, the signaled motion vector difference value represents a value before being modified by resolution.

$$valueDetermined=resolution*valuePerResolution \quad \text{[Equation 1]}$$

In Equation 1, resolution represents the resolution of the motion vector difference value of the current block. That is, the decoder may obtain the modified motion vector difference value by multiplying the signaled motion vector difference value of the current block by resolution. Next, the decoder may obtain the motion vector of the current block on the basis of the modified motion vector difference value. In addition, the decoder may reconstruct the current block on the basis of the motion vector of the current block.

When a relatively small value is used as the resolution of the motion vector difference value of the current block (i.e., when precision is high), it may be advantageous to more precisely represent the motion vector difference value of the current block. However, in this case, since the signaled value itself becomes large, the signaling overhead for the motion vector difference value of the current block may increase. In contrast, when a relatively large value is used as the resolution of the motion vector difference value of the current block (i.e., when the precision is low), the signaling overhead for the motion vector difference value may be reduced by reducing the magnitude of the signaled value. That is, when the resolution of the motion vector difference value is large, the motion vector difference value of the current block may be signaled through a smaller number of bits than when the resolution of the motion vector difference value of the current block is small. However, in this case, it may be difficult to precisely represent the motion vector difference value of the current block.

Therefore, the encoder and the decoder may select an advantageous resolution for signaling the motion vector difference value depending on the situation from among a plurality of resolutions. For example, the encoder may signal the selected resolution on the basis of the situation. In addition, the decoder may obtain the motion vector difference value of the current block on the basis of the signaled resolution. Hereinafter, a method of signaling the resolution of the motion vector difference value of the current block according to an embodiment of the present invention will be described. According to an embodiment of the present invention, the resolution of the motion vector difference value of the current block may be any one of a plurality of available resolutions included in a resolution set. Here, the plurality of available resolutions may indicate resolutions usable in specific situations. In addition, the type and number of available resolutions included in the resolution set may vary depending on the situation.

FIG. 10 is a diagram illustrating a coding unit and a transform unit according to an embodiment of the present invention.

FIG. 10(a) is a diagram illustrating the coding unit according to an embodiment of the present invention, and FIG. 10(b) is a diagram illustrating the transform unit according to an embodiment of the present invention.

According to an embodiment of the present invention, a block unit on which transform is performed may exist. For example, the block unit on which transform is performed may be less than or equal to a coding unit (CU), or may be less than or equal to a block unit on which prediction is performed. In addition, the size of the block unit on which transform is performed may be limited by a maximum transform size. For example, the width or height of the block unit on which transform is performed may be limited by the maximum transform size. Specifically, the width or height of the block unit on which the transform is performed may be less than or equal to the maximum transform size. In addition, the maximum transform size may vary depending on a chrominance component of the transform block, that is, a luma component and a chroma component. In this case, the block unit on which the transform is performed may be expressed as a transform unit (TU). If the coding unit or prediction unit (PU) is greater than the maximum transform size, the coding unit or the prediction unit may be partitioned to generate a plurality of transform units. A transform unit greater than the maximum transform size among the plurality of transform units may be split, and a plurality of transform units may be generated. The sizes of the plurality of transform units generated through this process may all be less than or equal to the maximum transform size. In the present invention, the fact that the size of the unit (block) is greater than the maximum transform size, it may mean that the width or height of the unit (block) is greater than the maximum transform size. Meanwhile, the fact that the size of the unit (block) is less than or equal to the maximum transform size, it may mean that both the width and height of the unit (block) are less than or equal to the maximum transform size. According to an embodiment of the present invention, the operation of partitioning the transform unit on the basis of the maximum transform size may be performed in situations such as when intra prediction is performed, when processing a residual signal, etc. The operation of partitioning the transform unit on the basis of the maximum transform size may be performed recursively, and may be performed until the size of the transform unit becomes less than or equal to the maximum transform size.

Referring to FIG. 10(a), the width and height of the coding unit may be expressed as cbWidth and cbHeight, respectively. Referring to FIG. 10(b), the width and height of the transform unit may be expressed as tbWidth and tbHeight, respectively. The maximum transform size may be expressed as MaxTbSizeY. Specifically, MaxTbSizeY may be a maximum transform size for the luma component. When the size of the transform unit is greater than the maximum transform size and thus the transform unit needs to be split, tbWidth and tbHeight of the transform unit before partitioning may be cbWidth and cbHeight, respectively. That is, the transform unit may be partitioned according to whether or not the width or height of the transform unit is greater than the maximum transform size, and tbWidth or tbHeight may be updated. For example, referring to FIG. 10(a), cbWidth is greater than MaxTbSizeY. In this case, the transform unit may be split. Before the transform unit is split, tbWidth and tbHeight of the transform unit may be cbWidth and cbHeight, respectively. Referring to FIG. 10(b), since tbWidth is greater than MaxTbSizeY, the TU may be partitioned into transform unit 1 and transform unit 2. In this case, newTbWidth, which is a width of a new transform unit (a width of a transform unit after partitioning), may be tbWidth/2.

The transform unit (TU) partitioning described in this specification may mean partitioning of a transform block (TB) included in the TU.

In this specification, the unit and the block are used interchangeably. In addition, the unit may be a concept including one or more blocks according to the color difference component. For example, the unit may be a concept including a block for luma and one or more blocks for chroma.

FIG. 11 is a diagram illustrating transform tree syntax according to an embodiment of the present invention.

The syntax of FIG. 11 may be syntax for performing the partitioning of TU described with reference to FIG. 10.

The transform tree syntax illustrated in FIG. 11 may be called from a coding unit syntax or a prediction unit syntax. In this case, tbWidth and tbHeight, which are input values of the transform tree syntax, may be cbWidth and cbHeight described with reference to FIG. 10. In addition, the decoder may check whether or not tbWidth is greater than the maximum transform size MaxTbSizeY or tbHeight is greater than MaxTbSizeY. As a result of the check, when tbwidth or tbHeight is greater than MaxTbSizeY, TU partitioning may be performed and the transform tree syntax may be invoked again. Otherwise, the transform unit syntax may be invoked. In this case, when the transform tree syntax is invoked again, the input values may be updated. For example, when tbWidth or tbHeight is greater than MaxTbSizeY, the input values may be respectively updated to tbWidth/2 and tbHeight/2. The updated tbWidth and tbHeight in FIG. 11 may be expressed as trafoWidth and trafoHeight. In addition, in a syntax element transform_tree (x0, y0, tbWidth, tbHeight, treeType), x0 and y0 may be horizontal and vertical coordinate values indicating the position of a block to which the transform tree syntax is applied. The decoder may parse a syntax element transform_tree(x0, y0, trafoWidth, trafoHeight, treeType) using values of trafoWidth and trafoHeight. When tbWidth is greater than MaxTbSizeY, the decoder may parse a syntax element transform_tree(x0+trafoWidth, y0, trafoWidth, trafoHeight, treeType). When tbheight is greater than MaxTbSizeY, the decoder may parse a syntax element transform_tree(x0, y0+trafoHeight, trafoWidth, trafoHeight, treeType). When tbWidth is greater than MaxTbSizeY and tbHeight is greater than MaxTbSizeY, the decoder may parse a syntax element transform_tree(x0+trafoWidth, y0+trafoHeight, trafoWidth, trafoHeight, treeType). In this case, the order of the process in which transform tree syntax 'transform_tree( )' is invoked multiple times may be important in terms of encoder, decoder match, or coding performance. In this case, the order may follow a preset order, and the preset order may be an order according to the syntax disclosed in FIG. 11.

In addition, when the transform tree syntax of FIG. 11 is invoked for the first time in the coding unit or the prediction unit, tbWidth, tbHeight, x0, and y0 may be values set on the basis of the luma component. For example, when the size of the luma block is 16×16, the size of the chroma block according to the chroma format may be 8×8. In this case, even if the decoder parses the transform tree syntax for the chroma block, tbWidth and tbHeight values may be 16 and 16, respectively.

In addition, the transform tree syntax of FIG. 11 may be parsed regardless of a treeType value. The treeType indicates whether a block structure of the luma component and a block structure of the chroma component are the same or different. For example, when treeType is SINGLE_TREE, the block structure of the luma component and the block structure of the chroma component may be the same. Meanwhile, when treeType is not SINGLE_TREE, the block structure of the luma component and the block structure of the chroma component may be different. When treeType is DUAL_TREE_LUMA, the block structure of the luma component and the block structure of the chroma component may different. In this case, treeType may indicate a tree for the luma component or indicate that the transform tree syntax for the luma component is parsed. On the other hand, when treeType is DUAL_TREE_CHROMA, the block structure of the luma component and the block structure of the chroma component may be different. In this case, treeType may indicate a tree for the chroma component or indicate that the transform tree syntax for the chroma component is parsed.

FIG. 12 is a diagram illustrating a decoding process in the intra block according to an embodiment of the present invention.

FIG. 12 is a diagram illustrating an explanation of transform unit partitioning and an intra prediction process.

In the embodiment described with reference to the drawings of this specification, terms used are defined.

(xTb0, yTb0): Coordinates of the top-left sample position of the current transform block.

nTbW: Width of the current transform block.

nTbH: Height of the current transform block.

Clause 8.4.1 disclosed in FIG. 12 shows a decoding process of a luma block and a decoding process of a chroma block of the coding unit. The decoding process of the chroma block may include a decoding process of a Cb block and a decoding process of a Cr block. Referring to Clause 8.4.1 of FIG. 12, different inputs may be used for the decoding process of the luma block and the decoding process of the chroma block, and the decoder may perform the operation disclosed in Clause 8.4.5.1 of FIG. 12 using different inputs.

cbWidth and cbHeight disclosed in Clause 8.4.1 of FIG. 12 may mean the width and height of the current coding block, and values of cbWidth and cbHeight may be values on the basis of luma samples. For example, if the luma block size is 16×16, the chroma block size may be 8×8 according to the chroma format. In this case, the values of cbWidth and cbHeight for the chroma coding block may be 16 and 16, respectively. In addition, (xCb, yCb) disclosed in FIG. 12 may indicate the coordinates of the current coding block, or may be the coordinate values of the top-left sample of the current coding block. In this case, the coordinate value may be set on the basis of the coordinates of the top-left sample of the current picture. In addition, (xCb, yCb) may be a value expressed on the basis of the luma sample.

Referring to Clause 8.4.1 of FIG. 12, when treeType is SINGLE_TREE or DUAL_TREE_LUMA, the decoder may perform a decoding process on the luma block. In this case, Clause 8.4.5.1 disclosed in FIG. 12 may be invoked, a sample position input at that time may be (xCb, yCb), and the width and height of the block may be cbWidth and cbHeight, respectively. In addition, a value of cIdx indicating the color component may be 0.

When treeType is SINGLE_TREE or DUAL_TREE_CHROMA, the decoder may perform a decoding process on the chroma block. In this case, Clause 8.4.5.1 disclosed in FIG. 12 may be invoked, and may be invoked for each of the Cb block and the Cr block. In this case, the sample position input may be (xCb/SubWidthC, yCb/SubHeightC), and the width and height of the block may be cbWidth/SubWidthC and cbHeight/SubHeightC, respectively. In this case, the value of cIdx may not be 0, and the value of cIdx may be set to 1 for the Cb block and 2 for the Cr block. SubWidthC and SubHeightC may be preset values on the basis of the chroma format. The values of SubWidthC and SubHeightC may be 1 or 2, and may be values for the relationship between the luma component and the chroma component. SubWidthC and SubHeightC will be described later with reference to FIGS. 14 to 15.

When the decoder performs the decoding process disclosed in Clause 8.4.5.1 of FIG. 12, inputs may be in a converted state to correspond to the luma block and the chroma block. For example, the block width nTbW, block height nTbH, and sample position coordinates (xTb0, yTb0) disclosed in Clause 8.4.5.1 of FIG. 12 may be determined based on the number of chroma samples when the decoding process for the chroma block is performed, and may be determined on the basis of the number of luma samples when the decoding process for the luma block is performed.

The TU partitioning described above may be performed through Clause 8.4.5.1 of FIG. 12. The maxTbWidth and maxTbHeight disclosed in FIG. 12 are values indicating maximum transform sizes corresponding to the color component, and may be values corresponding to a width and a height, respectively. As described above, MaxTbSizeY may be the maximum transform size for the luma block. Therefore, for the chroma block (i.e., when cIdx is not 0), maxTbWidth may be MaxTbSizeY/SubWidthC, and maxTbHeight may be MaxTbSizeY/SubHeightC. For the luma block, maxTbWidth and maxTbHeight may both be MaxTbSizeY.

In addition, referring to 8-43 of FIG. 12, the coordinates (xTbY, yTbY) may be converted on the basis of luma, and in this case, the coordinates may be calculated on the basis of cIdx, SubWidthC, and SubHeightC.

The decoding process described in FIG. 12 should match the syntax structure. That is, the decoding process of FIG. 12 should match the syntax structure of FIG. 11.

When nTbW is greater than maxTbWidth or nTbH is greater than maxTbHeight in Clause 8.4.5.1 of FIG. 12, steps 1 to 5 disclosed in Clause 8.4.5.1 of FIG. 12 may be performed. Referring to step 1 of FIG. 12, the width nTbW and height nTbH of a block may be updated with newTbW and newTbH. Specifically, if nTbW is greater than maxTbWidth, the width of the block is updated to nTbW/2, otherwise, the width of the block remains nTbW. If nTbH is greater than maxTbHeight, the height of the block is updated to nTbH/2, otherwise, the block height remains nTbH. Referring to step 2 of FIG. 12, by using coordinates (xTb0, yTb0), newTbW, and newTbH as inputs, Clause 8.4.5.1 of FIG. 12 may be invoked again. Referring to step 3 of FIG. 12, if nTbW is greater than maxTbWidth, Clause 8.4.5.1 of FIG. 12 may be invoked again by using coordinates (xTb0+newTbW, yTb0), newTbW, and newTbH as inputs. Referring to process 4 of FIG. 12, if nTbH is greater than maxTbHeight, section 8.4.5.1 of FIG. 12 may be invoked again by using coordinates (xTb0, yTb0+newTbH), newTbW, and newTbH as inputs. Referring to step 5 of FIG. 12, if nTbW is greater than maxTbWidth and nTbH is greater than maxTbHeight, Clause 8.4.5. of FIG. 12 may be invoked again by using coordinates (xTb0+newTbW, yTb0+newTbH), newTbW, and newTbH as inputs. Steps 2 to 5 of FIG. 12 may be the same as the process of invoking the transform tree syntax again in FIG. 11.

Meanwhile, if nTbW is less than or equal to maxTbWidth and nTbH is less than or equal to maxTbHeight, a process other than steps 1 to 5 of FIG. 12 may be performed. In this case, the process other than steps 1 to 5 of FIG. 12 may be a process related to actual intra prediction, residual signal decoding, transform, and reconstruction.

FIG. 13 is a diagram illustrating a decoding process of a residual signal according to an embodiment of the present invention.

Among the contents disclosed in FIG. 13, the contents redundant to the contents described above will be omitted.

The decoding process disclosed in FIG. 13 may be performed when inter prediction, intra block copy (IBC) prediction, etc. are applied. In addition, FIG. 13 may disclose the TU partitioning described above.

Referring to S1301 of FIG. 13, the step of invoking section 8.5.8 of FIG. 13 may be performed for each color component. In this case, as described with reference to FIG. 12, the decoding process of Clause 8.5.8 of FIG. 13 may be performed using the inputs corresponding to each color component. The coordinates (xTb0, yTb0), the block width nTbW, and the block height nTbH of the sample position, which are inputs of the decoding process of Clause 8.5.8 of FIG. 13, may be (xCb, yCb), cbWidth, cbHeight for the luma block, and may be (xCb/SubWidthC, yCb/SubHeightC), cbWidth/SubWidthC, and cbHeight/SubHeightC for the chroma block. In addition, the cIdx value indicating the color component may be set to 0 when the block is the luma component, and set to a value other than 0 when the block is the chroma component. For example, when the block is a Cb component, the cIdx value may be set to 1, and when the block is a Cr component, the cIdx value may be set to 2.

When the decoding process of Clause 8.5.8 of FIG. 13 is performed, (xTb0, yTb0), nTbW, and nTbH may be values corresponding to each color component. That is, (xTb0, yTb0), nTbW, and nTbH may be values corresponding to the number of samples of each color component.

Referring to 8-849 and 8-850 of FIG. 13, the maximum transform size may be adaptively calculated for each color component. In addition, referring to 8-852 and 8-853 of FIG. 13, the width of the block or the height of the block is updated on the basis of whether or not nTbW or nTbH is greater than the maximum transform size, and may be described as newTbW and newTbH. Steps 2 to 5 of Clause 8.5.8 of FIG. 13 disclose a process of invoking Clause 8.5.8 again, which may be the same as the contents described above with reference to FIG. 12.

Meanwhile, if nTbW is less than or equal to maxTbWidth and nTbH is less than or equal to and maxTbHeight, a process other than steps 1 to 5 of FIG. 13 may be performed. In this case, the process other than steps 1 to 5 of FIG. 13 may be the process related to actual residual signal decoding, transform, etc.

FIG. 14 is a diagram illustrating a relationship between color components according to an embodiment of the present invention.

Referring to FIG. 14, elements related to the color components may include chroma_format_idc, Chroma format, separate_colour_plane_flag, etc.

For example, when Chroma format is Monochrome, only one sample array may exist, and SubWidthC and SubHeightC may both be 1. When Chroma format is 4:2:0 sampling, two chroma arrays may exist. In this case, the chroma array may have a half width and a half height of a luma array, and SubWidthC and SubHeightC may both be 2. When Chroma format is 4:2:2 sampling, two chroma arrays may exist. In this case, the chroma array may have a half width of the luma array and the same height as the luma array, and SubWidthC and SubHeightC may be 2 and 1, respectively. When Chroma format is 4:4:4 sampling, two chroma arrays may exist. In this case, the chroma array may have the same width and the same height as the luma array, and SubWidthC and SubHeightC may both be 1.

Meanwhile, when Chroma format is 4:4:4 sampling, a process performed on the basis of separate_colour_plane_flag may be different. When separate_colour_plane_flag is 0, the chroma array may have the same width and the same height as the luma array. When separate_colour_plane_flag is 1, processes for three color planes, i.e., luma, Cb, and Cr, may be performed, respectively. When separate_colour_plane_flag is 1, only one color component may exist in one slice. Meanwhile, when separate_colour_plane_flag is 0, a plurality of color components may exist in one slice. As illustrated in FIG. 14, when Chroma format is 4:4:4 sampling, SubWidthC and SubHeightC may both be 1 regardless of separate_colour_plane_flag.

SubWidthC and SubHeightC may indicate how large the chroma array is compared to the luma array, when the chroma array width or chroma array height is half of the luma array, SubWidthC or SubHeightC may be 2, and when the chroma array width or height is the same size as the luma array, SubWidthC or SubHeightC may be 1.

Referring to FIG. 14, SubWidthC and SubHeightC may have different values only when Chroma format is 4:2:2 sampling. Therefore, when Chroma format is 4:2:2 sampling, a relationship between a width and a height on the basis of the luma component may be different from the relationship between the width and the height on the basis of the chroma component.

FIG. 15 is a diagram illustrating a relationship between the color components according to an embodiment of the present invention.

FIG. 15(*a*) illustrates a case where Chroma format is 4:2:0 sampling, FIG. 15(*b*) illustrates a case where Chroma format is 4:2:2 sampling, and FIG. 15(*c*) illustrates a case where Chroma format is 4:4:4 sampling.

Referring to FIG. 15(*a*), when Chroma format is 4:2:0 sampling, one chroma sample (one Cb, one Cr) per two luma samples may be positioned in the horizontal direction. In addition, one chroma sample (one Cb, one Cr) may be positioned per two luma samples in a vertical direction.

Referring to FIG. 15(*b*), when Chroma format is 4:2:2 sampling, one chroma sample (one Cb, one Cr) may be positioned per two luma samples in the horizontal direction. In addition, one chroma sample (one Cb, one Cr) may be positioned per a luma sample in the vertical direction.

Referring to FIG. 15(*c*), when Chroma format is 4:4:4 sampling, one chroma sample (one Cb, one Cr) may be positioned per a luma sample in the horizontal direction. In addition, one chroma sample (one Cb, one Cr) may be positioned per a luma sample in the vertical direction.

SubWidthC and SubHeightC described above may be determined according to the relationship between the luma sample and the chroma sample illustrated in FIG. 15, and transformation based on the luma sample and the transform based on the chroma sample may be performed on the basis of SubWidthC and SubHeightC.

FIG. 16 is a diagram illustrating a maximum transform size according to an embodiment of the present invention.

The maximum transform size may be variable, and the complexity of the encoder or decoder may be adjusted by changing the maximum transform size. For example, when the maximum transform size is small, the complexity of the encoder or decoder may be reduced.

In an embodiment of the present invention, a value that may be the maximum transform size may be limited. For example, the maximum transform size may be limited to either of two values. In this case, the two values may be 32 or 64, and may be the size based on luma.

The maximum transform size may be signaled at a higher level. In this case, the higher level may be a level including the current block. For example, a unit such as a sequence, a sequence parameter, a slice, a tile, a tile group, a picture, and a coding tree unit (CTU) may be the higher level.

Referring to FIG. 16, sps_max_luma_transform_size_64_flag may be a flag indicating the maximum transform size. For example, when the value of sps_max_luma_transform_size_64_flag is 1, the maximum transform size may be 64, and when the value of sps_max_luma_transform_size_64_flag is 0, the maximum transform size may be 32. In this case, the maximum transform size may be a size based on the luma sample.

In addition, MaxTbLog2SizeY may be a value obtained by taking log2 of the maximum transform size. Therefore, MaxTbLog2SizeY may be (sps_max_luma_transform_size_64_flag ? 6: 5). That is, when the value of sps_max_luma_transform_size_64_flag is 1, the MaxTbLog2SizeY value is 6, and when the value of sps_max_luma_transform_size_64_flag is 0, the MaxTbLog2SizeY value is 5.

In addition, MaxTbSizeY indicating the maximum transform size may be (1<<MaxTbLog2SizeY). That is, if the value of MaxTbLog2SizeY is 6, the bit is shifted 6 spaces to the left, and the value of MaxTbSizeY becomes 64. If the value of MaxTbLog2SizeY is 5, the bit is shifted 5 spaces to the left, and the value of MaxTbSizeY becomes 32.

MinTbSizeY disclosed in FIG. 16 may be a value indicating minimum transform size.

The size of the luma coding tree block CtbSizeY or the size of the coding tree unit CTU size may be variable. For example, when CtbSizeY is less than 64, the minimum transform size may be less than 64. Therefore, when Ctb-SizeY is less than 64, the value of sps_max_luma_transform_size_64_flag may be 0.

CtbsizeY described in the present invention below means the size of the luma coding tree block, specifically, indicates the width and height of the luma coding tree block.

FIG. 17 is a diagram illustrating syntax at a higher level according to an embodiment of the present invention.

Referring to FIG. 17, the syntax structure illustrated in FIG. 17 may be higher level syntax and may include sps_max_luma_transform_size_64_flag.

In addition, the syntax structure of FIG. 17 may include log2_ctu_size_minus5. On the basis of log2_ctu_size_minus5, the CTU size and the size CtbSizeY of the luma coding tree block may be determined. For example, log2_ctu_size_minus5+5 is CtbLog2SizeY, and CtbLog2SizeY represents log2 (CtbSizeY). In addition, Ctb-SizeY may be determined as (1<<CtbLog2SizeY).

In addition, the syntax structure of FIG. 17 may include sps_sbt_enabled_flag and sps_sbt_max_size_64_flag. sps_sbt_enabled_flag may be a flag indicating whether or not subblock transform (SBT) may be used. SBT may be to transform only some samples of the CU or PU. sps_sbt_max_size_64_flag may be a flag indicating the maximum size that the SBT may be used. Referring to FIG. 17, when sps_sbt_enabled_flag indicates that SBT may be used (e.g., when the value of sps_sbtenabled_flag is 1), sps_sbt_max_size_64_flag may be signaled. On the other hand, when sps_sbt_enabled_flag indicates that SBT may not be used (e.g., when the value of sps_sbt_enabled_flag is 0), sps_sbt_max_size_64_flag may not be signaled. In addition, SBT may be used when both the width and height of the block are less than the maximum size that the SBT may be used.

The maximum size that the SBT indicated by sps_sbt_max_size_64_flag may be used may include 32. In addition, the maximum size that the SBT indicated by sps_sbt_max_size_64_flag may be used may be 32 or 64. When the maximum transform size is less than the maximum size that the SBT indicated by sps_sbt_max_size_64_flag may be used, the maximum size that the SBT may be used may be set as the maximum transform size. Referring to 7-31 of FIG. 17, the smaller of the maximum transform size MaxTbSizeY and the maximum size that the SBT indicated by sps_sbt_max_size_64_flag may be used may be set as the maximum size MaxSbtSize that the SBT may be used.

The syntax structure of FIG. 17 may include sps_transform_skip_enabled_flag. sps_transform_skip_enabled_flag may be a flag indicating whether or not transform skip is usable. In this case, the transform skip may indicate that transform is not performed.

FIG. 18 is a diagram illustrating transform tree syntax according to an embodiment of the present invention.

The transform tree syntax of FIG. 18 may be syntax for supporting the variable maximum transform size described with reference to FIGS. 16 to 17.

When the maximum size of the CU or PU is twice the maximum transform size, and a fixed maximum transform size is used, the syntax and decoding process described in FIGS. 11 to 13 may be used. Specifically, when the maximum size of the CU or PU is 128 and the maximum transform size is 64, the embodiments of FIGS. 11 to 13 may be used. In this case, if the CU or PU is greater than the maximum transform size and thus the TU is split, the TU may be partitioned into two or four. In the partitioning, the TU may be partitioned into up to two TUs in each of the horizontal direction and the vertical direction.

However, when the variable maximum transform size is used, or when the maximum transform size less than the conventional maximum transform size is supported, or when the maximum size of the CU or PU is greater than twice the maximum transform size, the TU should be partitioned into two or more in the horizontal and vertical directions, respectively. However, there is a problem in that the syntax and process described with reference to FIGS. 11 to 13 do not support such partitioning.

Therefore, in order to solve this problem, syntax for recursively performing an operation of partitioning the TU into two only in the horizontal or vertical direction will be described with reference to FIG. 18. Referring to FIG. 18, when tbWdith is greater than MaxTbSizeY or tbHeight is greater than MaxTbSizeY, the transform_tree( ) syntax 'transform_tree( )' of FIG. 18 may be invoked again. In this case, 'transform_tree( )' may be invoked twice ((6) and (8) of FIG. 18 or (6) and (10) of FIG. 18). Whether the two invokes are (6) and (8) of FIG. 18 or (6) and (10) of FIG. 18 may be determined according to a first partitioning direction of the TU. The first partitioning direction of the TU may be determined on the basis of verSplitFirst. The input in 'transform_tree( )', which is invoked on the basis of verSplitFirst, may be different. In addition, it may be determined whether the two invokes are (6) and (8) of FIG. 18 or (6) and (10) of FIG. 18, on the basis of verSplitFirst. tbWidth and tbHeight are the width and height of the block, and MaxTbSizeY is the maximum transform size.

Referring to (3) of FIG. 18, the verSplitFirst value may be determined on the basis of tbWidth, tbHeight, and MaxTbSizeY.

In an embodiment of the present invention, when tbWidth is greater than MaxTbSizeY and tbWidth is greater than tbHeight, the verSplitFirst value may be set to 1, otherwise, the verSplitFirst value may be set to 0.

The width and height of a block that are inputs of 'transform_tree( )' of FIG. 18 may be trafoWidth and trafoHeight in (6), (8), and (10) of FIG. 18. trafoWidth and trafoHeight may be determined on the basis of verSplitFirst. For example, when verSplitFirst is 1, trafoWidth may be set to tbWidth/2, and when verSplitFirst is 0, trafoWidth may be set to tbWidth. In addition, when verSplitFirst is 0, trafoHeight may be set to tbHeight/2, and when verSplitFirst is 1, trafoHeight may be set to tbHeight. That is, trafoWidth and trafoHeight, which are inputs of (6), (8), and (10) of FIG. 18, may be the same as any one of the existing block width and height, and the other may be half of the existing value. In other words, trafoWidth and trafoHeight may be tbWidth/2, tbHeight, or may be tbWidth, tbHeight/2.

In an embodiment of the present invention, when tbWidth is greater than or equal to MaxTbSizeY and tbWidth is greater than or equal to tbHeight, verSplitFirst may be set to 1, otherwise verSplitFirst may be set to 0.

The width and height of a block may be updated through (4) and (5) of FIG. 18. In this case, the width and height of the updated block may be trafoWidth and trafoHeight. As inputs of (6) of FIG. 18, that is, 'transform_tree( )' that is invoked again, trafoWidth and trafoHeight may be used. (6)

of FIG. 18 may be a process of invoking 'transform_tree( )' with coordinates (x0, y0), trafoWidth, and trafoHeight as inputs. That is, (6) of FIG. 18 may be a process of invoking 'transform_tree( )' with the same coordinates as the coordinates, which are the inputs of the existing 'transform_tree( )', and the width of the updated lock (i.e., trafoWidth) or the height of the updated block (i.e., trafoHeight), as inputs.

On the basis of verSplitFirst, (8) or (10) of FIG. 18 may be performed. When (8) of FIG. 18 is performed, 'transform_tree( )' with coordinates (x0+trafoWidth, y0), trafoWidth, and trafoHeight as inputs may be invoked. When (10) of FIG. 18 is performed, 'transform_tree( )' with coordinates (x0, y0+trafoHeight), trafoWidth, and trafoHeight as inputs may be invoked. That is, invoking 'transform_tree( )' corresponding to the remaining blocks (since the coordinates are different from each other) except for the block corresponding to (6) of FIG. 18 in the existing 'transform_tree( )' may be (8) and (10) of FIG. 18.

The step of invoking 'transform_tree( )' may be performed recursively.

When tbWidth is less than or equal to MaxTbSizeY and tbHeight is less than or equal to MaxTbSizeY, 'transform_unit( )' may be invoked.

x0, y0, tbWidth, and tbHeight in FIG. 18 may be values based on the luma sample, and may be the same as those described in FIG. 11. Therefore, size comparisons for determining verSplitFirst may be performed with the values based on the luma sample. This is because, when the size comparisons are based on the chroma sample, a case where the tbWidth of the chroma block is greater than tbHeight may occur even when the width and height of the transform block (unit) are the same. For example, when Chroma format is 4:2:2 sampling, a situation in which tbWidth is greater than tbHeight and tbWidth/SubWidthC is equal to tbHeight/SubHeightC may occur.

FIG. 19 is a diagram illustrating TU partitioning according to an embodiment of the present invention.

The partitioning of the TU illustrated in FIG. 19 may indicate partitioning according to the syntax of FIG. 18. For example, when the block width tbWidth is greater than the maximum transform size MaxTbSizeY and the block width tbWidth is greater than the block height tbHeight, as illustrated in FIG. 19, a vertical partitioning in which the TU is partitioned into a TU of left (1) and a TU of right (2) may be applied. If the value of verSplitFirst is 1 as described in FIG. 18, the TU may be partitioned into two TUs of left and right TUs, as illustrated in FIG. 19. In this case, the TU may be partitioned again by the 'transform_tree( )' invoked again. FIG. 19 illustrates a case where tbHeight is also larger than the maximum transform size MaxTbSizeY. Splitting may be made inside the left TU((1)) of FIG. 19, and partitioning may be made inside the right TU((2)) of FIG. 19. According to the syntax of FIG. 18, since 'transform_tree( )' is invoked recursively, all operations related to the partitioning made in the left TU((2)) may be parsed or performed after all operations related to the partitioning made in the left TU((1)) are parsed or performed. Meanwhile, when the width of the block is less than the maximum transform size or the width of the block is less than the height of the block, the value of verSplit may be determined as 0. In this case, the TU may be partitioned into an upper TU and a lower TU by applying the horizontal partitioning.

FIG. 20 is a diagram illustrating TU partitioning according to an embodiment of the present invention.

The TU partitioning of FIG. 20 may be TU partitioning according to the embodiment described with reference to FIGS. 11 to 13. For example, when the width tbWidth of the block is greater than the maximum transform size MaxTbSizeY and the height tbHeight of the block is greater than MaxTbSizeY, one TU may be partitioned into four TUs at a time as illustrated in FIG. 20. In addition, referring to the embodiment of FIGS. 11 to 13, there may be a preset order of performing a decoding process for a partitioned TU. As an example of the preset order, the decoding process may be performed in the order of (a), (b), (c), and (d) of FIG. 20.

However, since the area corresponding to (1) of FIG. 19 is (a) and (c) of FIG. 20, and the area corresponding to (2) of FIG. 19 is (b) and (d) of FIG. 20, there may be a problem in that the orders of performing the decoding process for the partitioned TUs of FIGS. 19 and 20 are different from each other. In addition, when the syntax order and the decoding process order are different from each other, when the block order in the syntax and the block order in the decoding process are different from each other, there is a problem in that implementation complexity increases. This is because, in the decoding process of a certain block, the syntax corresponding to the decoding process applied to each block should be applied.

As in the embodiments of FIGS. 19 and 20, the case where the decoding process orders for blocks are different from each other may be a case where tbWidth may be greater than MaxTbSizeY and tbWidth may be greater than tbHeight. Specifically, it may be a case where tbWidth is greater than MaxTbSizeY, tbWidth is greater than tbHeight, and tbHeight is greater than MaxTbSizeY. For example, when MaxTbSize is 32, tbWidth is 128, and tbHeight is 64, the decoding process order of blocks may be different.

FIG. 21 is a diagram illustrating a decoding process according to an embodiment of the present invention.

The contents disclosed in FIG. 21 are related to the intra block, but is not limited thereto, and is applicable to other embodiments of TU partitioning, such as the residual signal decoding process.

The decoding process disclosed in FIG. 21 is a decoding process corresponding to the syntax of FIG. 18.

In order to solve the above problem described in the embodiment of FIG. 20, etc., the decoding process related to TU partitioning needs to be changed. As described above, the TU partitioning described herein may have the same meaning as TB partitioning. The decoding process disclosed in FIG. 21 can be defined as a form in which a TB is partitioned into two and operates recursively. For example, a TB may be partitioned into two on the basis of verSplitFirst. Referring to 8-41 and 8-42 of FIG. 21, maxTbWidth and maxTbHeight may be determined in the same manner as in the embodiment of FIG. 12. In addition, nTbW and nTbH of FIG. 21 may be values set based on each color component. maxTbWidth and maxTbHeight indicate the width and height of the maximum transform block, and nTbW and nTbH indicate the width and height of the block.

For example, when nTbW is greater than maxTbWidth and nTbW is greater than nTbH, verSplitFirst may be set to 1, otherwise verSplitFirst may be set to 0. In addition, when verSplitFirst is 1, newTbW may be set to nTbW/2, otherwise may be set to nTbW (8-44 in FIG. 21). In addition, when verSplitFirst is 0, newTbH may be set to nTbH/2, otherwise may be set to nTbH (8-45 in FIG. 21).

Meanwhile, if verSplitFirst is defined differently in the syntax disclosed in FIG. 18, verSplitFirst of FIG. 21 may be defined differently. For example, in FIG. 18, when tbWidth is greater than MaxTbSizeY and tbWidth is greater than or equal to tbHeight, verSplitFirst is set to 1, otherwise, if verSplitFirst is set to 0, verSplitFirst of FIG. 21 may be set to 1, otherwise, verSplitFirst may be set to 0 when nTbW is greater than maxTbWidth and nTbW is greater than or equal to nTbH.

In step 2 of FIG. 21, Clause 8.4.5.1 disclosed in FIG. 21 may be invoked again. In this case, coordinates of the sample position (xTb0, yTb0), newTbH, and newTbH may be used as inputs. These inputs may be for the first (left or upper) TU when the TU is partitioned like the left TU(1) of FIG. 19.

In addition, in step 3 or 4 of FIG. 21, section 8.4.5.1 of FIG. 21 may be invoked again on the basis of verSplitFirst. These inputs may be for the second (right or bottom) TU when the TU is partitioned like the right TU(2) part of FIG. 19. In step 3 of FIG. 21, when Clause 8.4.5.1 of FIG. 21 is invoked, coordinates (xTb0+newTbW, yTb0), newTbH, and newTbH may be used as inputs. In step 4 of FIG. 21, when Clause 8.4.5.1 of FIG. 21 is invoked, coordinates (xTb0, yTb0+newTbH), newTbH, and newTbH may be used as inputs.

As described above, in FIG. 18, tbWidth and tbHeight may be values based on luma, and in FIG. 21, nTbW and nTbH may be values based on each color component. Therefore, when the decoding process disclosed in FIG. 21 is performed on a block of chroma component, a mismatch may occur between the syntax of FIG. 18 and the decoding process of FIG. 21. For example, the relationship between tbWdith and nTbW may be as follows. In the case of a block having the luma component, tbWidth may be equal to nTbW and tbHeight may be equal to nTbH. In the case of a block of the chroma component, tbWidth/SubWidthC may be equal to nTbW, and tbHeight/SubHeightC may be equal to nTbH. Therefore, the result of a part of comparing the width and height of the block to determine verSplit illustrated in FIG. 18 and the result of a part of comparing the width and height of a block to determine verSplit illustrated in step 1 of FIG. 21 may be different from each other. For example, there is a problem that the result of tbWidth>tbHeight of FIG. 18 and the result of nTbW>nTbH of FIG. 21 may be different, and accordingly, the verSplitFirst values of FIGS. 18 and 21 are different.

FIG. 22 is a diagram illustrating a decoding process according to an embodiment of the present invention.

The contents disclosed in FIG. 22 are related to the intra block, but is not limited thereto, and is applicable to other embodiments of TB partitioning, such as the residual signal decoding process. Among the contents disclosed in FIG. 22, the same contents as those described above will be omitted.

The contents disclosed in FIG. 22 may be the decoding process corresponding to the syntax disclosed in FIG. 18. In addition, a decoding process for solving the problems described with reference to FIGS. 20 to 21, in particular, a decoding process related to TB partitioning will be described with reference to FIG. 22.

Referring to FIG. 22, as inputs of an intra block decoding process or a residual signal decoding process, coordinates (xTb0, yTb0) indicating the position of the block, nTbW indicating the width of the block, nTbH indicating the height of the block, cIdx indicating the color component, treeType indicating the tree structure, etc. may be included. In this case, nTbW and nTbH may be the width and height of a transform block. That is, nTbW and nTbH may be the width and height based on the color component of the current block. For example, when chroma subsampling is 4:2:0, if the width and height of the luma block are 16 and 16, respectively, nTbW and nTbH of the decoding process disclosed in FIG. 22 may be 8 and 8, respectively, for the chroma block (when cIdx is not 0).

Referring to 8-41 of FIG. 22, maxTbWidth may be determined on the basis of cIdx and SubWidthC. For example, when cIdx is 0, maxTbWidth is MaxTbSizeY, and when cIdx is not 0, maxTbWidth may be determined on the basis of MaxTbSizeY and SubWidthC. When cIdx is not 0, maxTbWidth may be set to MaxTbSizeY/SubWidthC.

Referring to 8-42 of FIG. 22, maxTbHeight may be determined on the basis of cIdx and SubHeightC. For example, when cIdx is 0, maxTbHeight is MaxTbSizeY, and when cIdx is not 0, maxTbHeight may be determined on the basis of MaxTbSizeY and SubHeightC. When cIdx is not 0, maxTbHeight may be set to MaxTbSizeY/SubHeightC.

When nTbW is greater than maxTbWidth or nTbH is greater than maxTbHeight, the decoding process disclosed in FIG. 22 may be invoked again using other inputs. For example, the decoding process may be invoked twice. In addition, a case of being invoked recursively may occur. When the decoding process disclosed in FIG. 22 is invoked again, the TB may be split.

According to an embodiment of the present invention, when a TB is split, the TB may be partitioned on the basis of nTbW, nTbH, MaxTbSizeY, cIdx, SubWidthC, and Sub-HeightC. Alternatively, when the TB is split, the TB may be partitioned on the basis of nTbW, nTbH, maxTbWidth, cIdx, SubWidthC, and SubHeightC. Alternatively, the TB may be partitioned on the basis of the verSplitFirst value.

The verSplitFirst value may be determined on the basis of cIdx. For example, when cIdx is 0, the verSplitFirst value may be determined on the basis of nTbW, nTbH, and maxTbWidth. When cIdx is 0, the verSplitFirst value may be determined irrespective of SubWidthC and SubHeightC. Meanwhile, when cIdx is not 0, that is, when cIdx is 1 or 2, the verSplitFirst value may be determined on the basis of nTbW, nTbH, maxTbWidth, SubWidthC, and SubHeightC.

In addition, the verSplitFirst value may be determined on the basis of one or more conditions. For example, verSplit-First may be determined on the basis of whether or not the width of the block is greater than the maximum transform size. verSplitFirst may be determined on the basis of whether or not the height of the block is greater than the maximum transform size. In this case, the result of whether or not the width of the block and the height of the block are greater than the maximum transform size is irrelevant whether the result is based on the luma block or the chroma block. In other words, no matter what color component is based on, it does not affect the result. Therefore, referring to FIG. 22, the condition described above is checked using the inputs based on each color component. This may be to avoid calculation that transforms to a value based on luma.

In addition, one or more of the conditions for determining the verSplitFirst value may be conditions based on the width and height of the block. For example, the verSplitFirst value may be determined depending on whether or not the width of the block is greater than the height of the block. In this case, the width and height of the block may be values of the block having the luma component. In other words, the decoder may determine the verSplitFirst value by comparing the width of the block and the height of the block on the basis of the values based on the luma pixel and the luma component. That is, when cIdx is 0 (in the case of the luma block), nTbW and nTbH may be used for the one or more conditions described above, and when cIdx is not 0 (in the case of the chroma block), nTbW*SubWidthC and nTbH*SubHeightC may be used. Referring to FIG. 22, when cIdx is 0, it may be checked whether or not nTbW is greater than nTbH, and when cIdx is not 0, it may be checked whether or not nTbW*SubWidthC is greater than nTbH*SubHeightC.

In this case, when one or more conditions described above are satisfied, the verSplitFirst value may be set to 1, and otherwise (when at least one of the one or more conditions is not satisfied), the verSplitFirst value may be set to 0.

In other words, the decoder may use a value that considers the color component and Chroma format when comparing the width of the block and the maximum transform size, and may use a value based on the luma component when comparing the width of the block with the height of the block.

If the condition for determining the verSplitFirst value described above with reference to FIG. 22 is expressed through an equation, it may be expressed as Equation 2 below.

$$\text{verSplitFirst} = (nTbW > \max TbWidth \&\& \\ (cIdx == 0?nTbW:nTbW*SubWidthC) > \\ (cIdx == 0?nTbH:nTbH*SubHeightC))?1:0 \quad \text{[Equation 2]}$$

Referring to Equation 2 again, when cIdx is 0, verSplitFirst may be determined as in Equation 3 below.

$$\text{verSplitFirst} = (nTbW > \max TbWidth \&\& nTbW > nTbH) \\ ?1:0 \quad \text{[Equation 3]}$$

Referring to Equation 2 again, when cIdx is not 0 (e.g., when cIdx is 1 or 2), verSplitFirst may be determined as in Equation 4 below.

$$\text{verSplitFirst} = \\ (nTbW > \max TbWidth \&\& nTbW*SubWidthC > \\ nTbH*SubHeightC)?1:0 \quad \text{[Equation 4]}$$

When comparing sizes in Equations 2 to 4, an equal sign (=) may be included. In other words, it may be checked whether nTbW is greater than or equal to maxTbWidth. When cIdx is 0, it may be checked whether nTbW is greater than or equal to nTbH, and when cIdx is not 0, it may be checked whether nTbW*SubWidthC is greater than nTbH*SubHeightC. In this case, an equal sign (=) may be included in the syntax of FIG. 18 as well when comparing sizes.

Referring to 8-44 and 8-45 of FIG. 22, newTbW and newTbH may be determined on the basis of the verSplitFirst value. For example, when verSplitFirst is 1, newTbW may be determined as nTbW/2, and newTbH may be determined as nTbH. When verSplitFirst is 0, newTbW may be determined as nTbW, and newTbH may be determined as nTbH/2.

Referring to FIG. 22, on the basis of verSplitFirst, the decoding process may be invoked again in steps 2 and 3 of FIG. 22 or the decoding process may be invoked again in steps 2 and 4.

In step 2 of FIG. 22, the decoding process may be invoked again using the position of block (xTb0, yTb0), newTbW, and newTbH. This may be for the first (left or upper) TU of the partitioned TUs like the left TU(1) part of FIG. 19.

In step 3 of FIG. 22, the decoding process may be invoked again using the position of block (xTb0+newTbW, yTb0), newTbW, and newTbH. This may be for the second (right) TU of the partitioned TUs like the right TU(2) part of FIG. 19.

In step 4 of FIG. 22, the decoding process may be invoked again using the position of block (xTb0, yTb0+newTbH), newTbW, and newTbH. This may be for the second (lower) TU of the partitioned TUs like the right TU(2) part of FIG. 19.

FIG. 23 is a diagram illustrating higher level syntax according to an embodiment of the present invention.

A syntax element indicating the maximum transform size may be based on a CTU size, CtbSizeY, or a syntax element indicating CtbSizeY. For example, the maximum transform size greater than the CTU size, CtbSizeY, and a size indicated by the syntax element indicating CtbSizeY may be excluded from the candidates. When the CTU size, CtbSizeY, and the size indicated by the syntax element indicating CtbSizeY is less than 64, values greater than or equal to 64 may be excluded from the maximum transform size candidates. When there are two possible values for the maximum transform size, the maximum transform size may be determined on the basis of the CTU size, CtbSizeY, and the size indicated by the syntax element indicating CtbSizeY without signaling indicating the maximum transform size, and the value of the maximum transform size may be determined. The CTU size means the width and height of the coding tree unit, and CtbSizeY indicates the size of the luma coding tree block and means the width and height of the chroma coding tree block.

Referring to FIG. 23, the syntax element indicating the maximum transform size may be sps_max_luma_transform_size_64_flag. The syntax element representing the maximum transform size may represent the maximum transform size as 64 and a value less than 64. If CtbSizeY is less than 64, sps_max_luma_transform_size_64_flag may be inferred without being signaled. For example, if the maximum transform size indicates 64 when the value of sps_max_luma_transform_size_64_flag is 1, the value of sps_max_luma_transform_size_64_flag may be inferred to be equal to 0 when CtbSizeY is less than 64. Alternatively, the value of MaxTbLog2SizeY may be determined as 5, or the value of MaxTbSizeY may be determined as 32.

If the minimum CtbSizeY is 32, the case where CtbSizeY is less than 64 may be the same as the case where CtbSizeY is 32. For example, if CtbsizeY is 32, the value of sps_max_luma_transform_size_64_flag may be inferred to be equal to 0, and thus the maximum transform size (MaxTbSizeY) value may be determined as 32.

FIG. 24 is a diagram illustrating higher level syntax according to an embodiment of the present invention.

If the maximum transform size is limited, the maximum size for which a subblock transform (SBT) may be used may also be limited accordingly. For example, the maximum size for which the SBT may be used may be less than or equal to the maximum transform size. Therefore, the syntax element indicating the maximum size for which the SBT may be used may vary. For example, the syntax element indicating the maximum size for which the SBT may be used may be signaled on the basis of the syntax element indicating the maximum transform size or the maximum transform size.

Referring to FIG. 24, when the maximum transform size is less than 64, a syntax element indicating whether the maximum size for which the SBT may be used is 64 is not signaled, and the maximum size for which the SBT may be used may be inferred. The syntax element indicating that the maximum size for which SBT may be used is 64 may be sps_sbt_max_size_64_flag. Referring to FIG. 24, when the value of sps_sbt_enabled_flag is 1 and the value of sps_max_luma_tranform_size_64_flag is 1 (that is, sps_sbt_enabled_flag && sps_max_luma_tranform_size_64_flag), sps_sbt_max_size_64_flag is signaled, otherwise sps_sbt_max_size_64_flag is not signaled. In addition, when sps_sbt_max_size_64_flag does not exist, the value of sps_sbt_max_size_64_flag may be inferred to be equal to 0. Alternatively, when sps_sbt_max_size_64_flag does not exist, its value may be inferred as a value of sps_max_luma_tranform_size_64_flag. In this case, as disclosed in 7-31 of FIG. 24, MaxSbtSize may be set to 64 when sps_sbt_max_size_64_flag is 1 and may be set to 32 when sps_sbt_max_size_64_flag is 0.

FIG. 25 is a diagram illustrating a transform tree syntax according to an embodiment of the present invention.

In FIG. 25, the condition for determining the verSplitFirst value described with reference to the syntax of FIG. 18 is changed, and the remaining same description will be omitted.

The TU partitioning method may be different on the basis of a tree type treeType. For example, when the tree type is DUAL_TREE_CHROMA, TU partitioning may be performed on the basis of the width and height based on a block having each color component, that is, the chroma component. In the embodiment of FIG. 18, verSplitFirst is determined using the condition disclosed in (3) of FIG. 18, but in the case of DUAL_TREE_CHROMA, verSplitFirst may be determined using the condition disclosed in (2) of FIG. 25.

When determining the width of the block and the maximum transform size, it is irrelevant whether the determination is based on luma or each color component, and thus values based on luma may be used for the inputs of the transform tree syntax 'transform_tree( )'. However, when comparing the width and height of the block, values based on the chroma component may be used. That is, it is possible to compare tbWidth/SubWidthC and tbHeight/SubHeightC. Specifically, it is possible to check whether tbWidth/SubWidthC is greater than tbHeight/SubHeightC.

Therefore, when the tree type is a dual tree, TU partitioning for the chroma component may be performed on the same basis as when the luma component is used for TU partitioning.

Referring to FIG. 25, when the tree type is SINGLE_TREE or DUAL_TREE_LUMA, the decoder may determine verSplitFirst by performing step (1) of FIG. 25. That is, the partitioning may be determined using the value based on the luma component. When the tree type is DUAL_TREE_CHROMA, the decoder may determine verSplitFirst by performing step (2) of FIG. 25. That is, the partitioning may be determined using the value based on the chroma component.

FIG. 26 is a diagram illustrating a decoding process according to an embodiment of the present invention.

An embodiment of the decoding process disclosed in FIG. 26 may be a decoding process corresponding to the syntax disclosed in FIG. 25. As described above, the TU partitioning described herein may have the same meaning as the TB partitioning.

A method in which TB partitioning or verSplitFirst is determined) may be determined on the basis of cIdx, treeType, etc. For example, when cIdx is 0, verSplitFirst may be determined by using the width of the block and the height of the block based on each color component. When the tree type is DUAL_TREE_CHROMA, verSplitFirst may be determined by using the width of the block and the height of the block based on each color component. When cIdx is not 0 and the tree type is not DUAL_TREE_CHROMA (i.e., cIdx is not 0 and the tree type is SINGLE_TREE), verSplitFirst may be determined by using the width of the block and the height of the block based on the luma component.

That is, when cIdx is 0 or the tree type is DUAL_TREE_CHROMA (cIdx==0||treeType==DUAL_TREE_CHROMA), verSplit- First may be determined by comparing whether nTbW is greater than nTbH. That is, verSplitFirst may be determined without using SubWidthC and SubHeightC. When cIdx is not 0 and the tree type is not DUAL_TREE_CHROMA (when cIdx !=0 && treeType !=DUAL_TREE_CHROMA), verSplitFirst may be determined by comparing whether nTbW/SubWidthC is greater than nTbH/SubHeightC.

A maximum transform skip size may be less than the maximum transform size. For example, if the maximum transform size is variable, the maximum transform skip size may vary accordingly. Therefore, when the maximum transform size is variable, a method of signaling the maximum transform skip size may vary accordingly.

The max transform size and max transform skip size may be the same. In this case, when the size of the CU or PU is greater than the maximum transform size, whether or not transform skip is used for the partitioned TUs may be shared. In other words, when the size of the CU or PU is greater than the maximum transform size, signaling of a syntax element indicating whether or not transform skip is used for the partitioned TUs may be partially omitted. This is because, when the size of the CU or PU is greater than the maximum transform size, the residual signal shapes of the partitioned TUs may be similar. Whether or not transform skip is used in the partitioned TUs is shared or omitting of signaling of a related syntax element may be limited to a case where the maximum transform size and the maximum transform skip size are the same when a variable maximum transform size and a variable maximum transform skip size are used. Whether or not transform skip is used is shared among additionally partitioned TUs may be limited to a case where transform skip is used for a TU serving as a reference, e.g., the first TU. That is, when transform skip is not used for the TU serving as the reference, whether or not transform skip is used may be signaled to other partitioned TUs. In addition, if whether or not transform skip is used is signaled to the TUs partitioned in a preset order and it is signaled that transform skip is used to a specific TU, a syntax element indicating whether or not transform skip is used is not signaled to subsequent TUs, it may be determined that the transform skip is used.

When it is shared whether or not transform skip is used for the partitioned TUs or signaling of a related syntax element is omitted, signaling of a syntax element about whether or not transform skip is used at the CU or PU level is possible.

FIG. 27 is a diagram illustrating a method of performing BDPCM according to an embodiment of the present invention.

Block-based delta pulse code modulation (BDPCM) may be an (intra) prediction method or a coding method. In addition, BDPCM may have unique characteristics in a prediction method and a residual signal generation method. That is, BDPCM may be a method of coding and signaling a value based on the difference of a specific value (e.g., a residual signal or a prediction signal, a picture sample, or a reconstructed sample). For example, the encoder may signal a value based on the difference of the specific value, and the decoder may reconstruct the specific value on the basis of the signaling. In this case, in the reconstructing process of the decoder, since a process of calculating the difference of the specific value should be performed in reverse, the specific value may be reconstructed by performing an addition process on the basis of the signaled value. BDPCM may be described as quantized residual differential pulse coded modulation (RDPCM).

A syntax element indicating whether or not BDPCM is used may exist. For example, the syntax element may be BdpcmFlag or intra_bdpcm_flag. Signaling of the syntax element indicating whether or not BDPCM is used may be performed at the CU level. In addition, a syntax element at a higher level indicating whether or not BDPCM may be used may exist. For example, the syntax element at the higher level indicating whether or not BDPCM is used may be sps_bdpcm_enabled_flag. In addition, the higher level at which the syntax element is signaled may be an SPS level, a slice level, a tile level, or a tile group level. When signaling of the syntax element at a higher level indicating whether or not BDPCM is used is possible, signaling of the syntax element indicating whether or not BDCPM is used may not be performed. In addition, when signaling of the syntax element at a higher level indicating whether or not BDPCM is used is not possible, signaling of the syntax element indicating whether or not BDCPM is used may not be performed.

A prediction mode of BDPCM may be limited. A syntax element indicating the prediction mode of BDPCM may be BdpcmDir or intra_bdpcm_dir_flag. When BDPCM is used, the prediction mode may be an angular mode. Specifically, when BDPCM is used, the prediction mode may be a horizontal mode (mode 18; INTRA_ANGULAR18) or a vertical mode (mode 50; INTRA_ANGULAR50). Therefore, when BDPCM is used, a value of a prediction sample at a certain position may be the same value as a reference sample corresponding to the left of the certain position in the horizontal mode. In addition, when BDPCM is used and in the horizontal mode, prediction samples corresponding to the same row (i.e., prediction samples having the same y-coordinate) may have the same value. In addition, when BDPCM is used, a value of a prediction sample at a certain location may be the same value as a reference sample corresponding to the upper part of the certain location in the vertical mode. In addition, when BDPCM is used and in the vertical mode, prediction samples corresponding to the same column (i.e., prediction samples having the same x-coordinate) may have the same value.

FIG. 27(a) is a diagram for prediction mode derivation of BDPCM. Referring to FIG. 27(a), prediction mode derivation of BDPCM may be based on BdpcmDir. When the value of BdpcmFlag is 1 in FIG. 27(a), it may mean that BDPCM is used. IntraPredModeY may be a value indicating a prediction mode. Specifically, IntraPredModeY may be a value indicating the prediction mode for the luma component. For example, IntraPredModeY may be set to INTRA_ANGULAR50 or INTRA_ANGULAR18 on the basis of BdpcmDir. When the value of BdpcmDir is 1, IntraPredModeY is set to INTRA_ANGULAR50, and may be a vertical mode. In addition, when the value of BdpcmDir is 0, IntraPredModeY is set to INTRA_ANGULAR18, and may be a horizontal mode. A prediction operation may be performed on the basis of IntraPredModeY.

A residual signal generation method or a scaling and transform method for BDPCM may exist. As described above, when BDPCM is used, a value based on a difference between specific values may be coded and signaled. For example, when BDPCM is used, a value on the basis of a difference between a residual signal and a value based on the residual signal may be coded and signaled. The signaled value corresponding to a sample of a first position may be a difference between a value of a second position based on the first position and a value of the first position. Specifically, the signaled value corresponding to the sample of the first position may be a difference between the value of the first position and the value of the second position, which is a position adjacent to the first position. A signaled value corresponding to a sample of a first position (x, y) may be a difference between a value of a second position (x−1, y) and the value of the first position in the horizontal mode. In addition, the signaled value corresponding to the sample of the first position (x, y) may be a difference between a value of a second position (x, y−1) and the value of the first position in the vertical mode. In this case, the value of the second position and the value of the first position may be the residual signal or the value based on the residual signal FIG. 27(b) is a diagram illustrating an operation in the decoder when BDPCM is used. Referring to FIG. 27(b), dz may be an array created on the basis of values signaled through a syntax element. In addition, in the horizontal mode, a dz[x][y] value may be set on the basis of dz[x][y] and dz[x−1][y]. For example, in the horizontal mode, the dz[x][y] value may be set on the basis of (dz[x−1][y]+dz[x][y]) (see 8-961 in FIG. 27(b)). This setting may be performed when x is greater than 0 (not tangent to the left boundary of the block). When x is 0, dz[x][y] may remain as dz[x][y]. In the vertical mode, the dz[x][y] value may be set on the basis of dz[x][y] and dz[x][y−1]. In the vertical mode, the dz[x][y] value may be set on the basis of (dz[x][y−1]+dz[x][y]) (8-962 in FIG. 27(b)). This setting may be performed when y is greater than 0 (not tangent to the top boundary of the block). When y is 0, dz[x][y] may remain as dz[x][y]. The reason dz is calculated on the basis of a sum (+) operation is because the signaled signal is performed on the basis a difference (−) operation. For example, the signaled signal dz[x][y] may have been a value set to (dz[x][y]−dz[x−1][y]) in the horizontal mode, and may have been a value set to (dz[x][y]−dz[x][y−1]) in the vertical mode. Therefore, in order to reconstruct this, the decoder may perform a calculation based on the sum operation. In addition, on the basis of the dz[x][y] value, dnc[x][y] may be derived, and d[x][y] may be derived (8-963 and 8-964 in FIG. 27(b)).

In an embodiment of the present invention, transform may be performed on the basis of d[x][y]. In this case, performing the transform may include performing a transform skip mode. That is, performing the transform may include not performing an operation based on a transform matrix. When BDPCM is used, the transform skip mode may always be used. When BDPCM is used, the value of transform_skip_flag, which is a syntax element indicating whether or not the transform skip mode is used, may always be 1. When the transform skip mode is used, the residual signal may be determined without a step of multiplying d[x][y] by a vector or a matrix. When the transform skip mode is used, the residual signal may be determined without performing an operation on d[x][y] except for a bit shift or rounding. For example, when the transform skip mode is used, the (d[x][y]<<tsShift) value may be r[x][y] which is a residual sample array value. Here, tsShift may be a value determined on the basis of the width and height of the transform block. In addition, an intermediate residual sample and a residual sample may be determined on the basis of r[x][y]. In addition, BDPCM may be usable only when the transform skip mode is applied. This is because the transform skip mode is usable when BDPCM is used. For example, only when the syntax element signaled at the higher level indicates that the transform skip mode is usable, signaling of the syntax element at the higher level indicating that the BDPCM is usable may be performed.

FIG. 28 is a diagram illustrating syntax related to BDPCM according to an embodiment of the present invention.

When a syntax element signaled at a higher level indicating whether or not BDPCM is usable indicates that BDPCM is usable, BDPCM may be used. Referring to FIG. 28, whether or not to parse intra_bdpcm_flag may be determined on the basis of sps_bdpcm_enabled_flag.

In addition, the block size for which transform skip may be used may be limited. For example, the maximum value of the width or height of a block that transform skip may be used may be MaxTsSize. Therefore, when the width of the block is less than or equal to MaxTsSize and the height of the block is less than or equal to MaxTsSize, the transform skip may be used. On the other hand, if the width of the block is greater than MaxTsSize or the height of the block is greater than MaxTsSize, skip transform may not be used. Since transform is performed at the TU level, the width and height of the block may be the width and height of the transform block. In this case, the width of the transform block may be described as tbWidth, and the height of the transform block may be described as tbHeight. Since BDPCM uses a transform skip, whether or not BDPCM is usable may be determined on the basis of MaxTsSize. In addition, whether or not BDPCM is usable may be signaled at the CU level. Therefore, whether or not to use BDPCM may be determined on the basis of the width and height (which may be described as cbWidth and cbHeight) of the coding block (CB) and MaxTsSize. For example, when cbWidth is less than or equal to MaxTsSize and cbHeight is less than or equal to MaxTsSize, BDPCM may be used. When cbWidth is greater than MaxTsSize or cbHeight is greater than MaxTsSize, BDPCM may not be usable. Referring to FIG. 28, when cbWidth MaxTsSize and cbHeight<=MaxTsSize, intra_bdpcm_flag may be parsed, and when cbWidth>MaxTsSize or cbHeight>MaxTsSize, intra_bdpcm_flag may not be parsed. In this case, when intra_bdpcm_flag does not exist, its value may be inferred to be equal to 0.

According to an embodiment of the present invention, MaxTsSize may be selected and used as any one of a plurality of values. For example, MaxTsSize may be a value of 32 or less. Alternatively, MaxTsSize may be a value less than or equal to MaxTbSizeY. Alternatively, MaxTsSize may be one of 32, 16, 8, or 4. In addition, a syntax element for determining MaxTsSize may exist. For example, a value based on Log2 (MaxTsSize) may be signaled. log2_transform_skip_max_size_minusN may be signaled, and MaxTsSize may be (1<< (log2_transform_skip_max_size_minusN)). Specifically, N may be 2, in this case, log2_transform_skip_max_size_minus2 is signaled, and MaxTsSize may be (1<< (log2_transform_skip_max_size_minus2+2)). In this case, log2_transform_skip_max_size_minus2 may be a value ranging from 0 to 3, and in this case, MaxTsSize may be one of 4, 8, 16, and 32. The syntax element for determining MaxTsSize may be signaled at a higher level. For example, the syntax element may be signaled at a picture parameter set or slice level.

FIG. 29 is a diagram illustrating a BDPCM usable condition according to an embodiment of the present invention.

Referring to FIG. 28, when the width cbWidth and height cbHeight of the coding block are less than or equal to MaxTsSize, BDPCM may be used. If MaxTbSizeY is greater than MaxTsSize and the width and height of the coding block are less than or equal to MaxTsSize, the width and height of the coding block may be the same as the width and height of the transform block. This is because TU partitioning does not occur in this case. Specifically, when MaxTbSizeY is 64 and MaxTsSize is 32 or less, if cbWidth is MaxTsSize or less and cbHeight is MaxTsSize or less, cbWidth may be equal to tbWidth and cbHeight may be equal to tbHeight. Therefore, the fact that BDPCM is usable when cbWidth and cbHeight are MaxTsSize or less may mean that BDPCM is usable when tbWidth and tbHeight are MaxTsSize or less.

However, according to an embodiment of the present invention, MaxTbSizeY may be less than or equal to MaxTsSize. In this case, if cbWidth is greater than MaxTsSize or cbHeight is greater than MaxTsSize, BDPCM may be used. This is because, in this case, TU partitioning may occur, and the width and height of a transform block after TU partitioning are less than or equal to MaxTsSize. When MaxTbSizeY is equal to MaxTsSize, if cbWidth is greater than MaxTsSize or cbHeight is greater than MaxTsSize, TU partitioning may occur, and the width and height of the transform block after TU partitioning may be equal to MaxTbSizeY. Therefore, it may be possible to perform the transform skip mode, which is a mode used in the case of BDPCM. This is because the transform skip mode is performed at the TU level. When BDPCM is usable, intra_bdpcm_flag may be parsed.

Therefore, BDPCM may be used even when MaxTbSizeY and MaxTsSize are the same. Alternatively, when the syntax element signaled at a higher level indicating whether or not BDPCM is usable indicates that BDPCM is usable and MaxTbSizeY and MaxTsSize are the same, BDPCM may be used. Alternatively, even when MaxTbSizeY and MaxTsSize are different, BDPCM may be used when cbWidth is less than or equal to MaxTsSize and cbHeight is less than or equal to MaxTsSize. Alternatively, when the syntax element signaled at a higher level indicating whether or not BDPCM is usable indicates that BDPCM is usable and MaxTbSizeY and MaxTsSize are different, BDPCM may be used when cbWidth is less than or equal to MaxTsSize and cbHeight is less than or equal to MaxTsSize. On the other hand, when MaxTbSizeY and MaxTsSize are different, BDPCM may not be used when cbWidth is greater than MaxTsSize or cbHeight is greater than MaxTsSize.

When BDPCM is usable, intra_bdpcm_flag, which is a syntax element indicating whether or not BDPCM is used, may be parsed.

As described above, MaxTbSizeY may have a value of 32 or more. Specifically, MaxTbSizeY may have a value of 32 or 64. In addition, MaxTsSize may have a value of 32 or less. Specifically, MaxTsSize may have a value of 4 or 8 or 16 or 32. Therefore, when MaxTbSizeY and MaxTsSize are the same, MaxTbSizeY may be 32 and MaxTsSize may be 32.

FIGS. 29(a) and (b) are diagrams illustrating a syntax structure related to the embodiment described above.

Referring to FIG. 29(a), when the value of sps_bdpcm_enabled_flag is 1 and at least one of the following two conditions is satisfied, intra_bdpcm_flag may be parsed.

Condition a-1) cbWidth<=MaxTsSize && cbHeight<=MaxTsSize

Condition a-2) MaxTbSizeY==32 && MaxTsSize==32

On the other hand, if both conditions a-1 and a-2 are not satisfied, intra_bdpcm_flag may not be parsed. Meanwhile, when intra_bdpcm_flag does not exist, the value of intra_bdpcm_flag may be inferred to be equal to 0.

Referring to FIG. 29(b), when the value of sps_bdpcm_enabled_flag is 1 and at least one of the following two conditions is satisfied, intra_bdpcm_flag may be parsed.

Condition b-1) cbWidth<=MaxTsSize && cbHeight<=MaxTsSize

Condition b-2) MaxTbSizeY==MaxTsSize

Meanwhile, if both conditions b-1 and b-2 are not satisfied, intra_bdpcm_flag may not be parsed. Meanwhile, when intra_bdpcm_flag does not exist, the value of intra_bdpcm-_flag may be inferred to be equal to 0.

FIG. 30 is a diagram illustrating CIIP and intra prediction according to an embodiment of the present invention.

CIIP is an abbreviation of combined inter- and intra-prediction, or CIIP is an abbreviation of combined inter-picture merge and intra-picture prediction. CIIP means a method of combining an intra prediction signal and an inter prediction signal when a prediction signal is generated. When CIIP is used, the intra prediction method or the inter prediction method may be limited. For example, when CIIP is used, only a planar mode MODE PLANAR or only a merge mode may be used for the intra prediction mode. When CIIP is used for the coding block (CB) or the coding unit (CU), intra prediction may be performed on the entire coding block. That is, when CIIP is used for the CB or CU, intra prediction may be performed on a block having a size of (cbWidth×cbHeight). In other words, when CIIP is used for the CB or CU, intra prediction may be performed without TU partitioning. Even if the CB is greater than the maximum transform size, intra prediction may be performed without TU partitioning when CIIP is used.

The block size for which CIIP may be used may be limited. In this case, the limited block size may be a fixed value. The maximum value of the block size for which CIIP may be used may be predetermined. For example, when the width cbWidth or height cbHeight of a block is 128 or more than 128, CIIP may not be used. When cbWidth is less than 128, cbHeight is less than 128, and cbWidth*cbHeight is 64 or more, CIIP may be used.

FIG. 30 illustrates the CIIP mode and the intra prediction mode when the CB or CU is 64×64. When the CIIP mode is used, inter prediction for a block having a size of 64×64 and intra prediction for a block having a size of 64×64 may be performed. In addition, a predicted block having a size of 64×64 ("Combined inter and intra predicted block" of FIG. 30) may be generated on the basis of the inter prediction and the intra prediction.

When the intra prediction mode is not used (that is, when only the current picture is used, or when a reference picture is not used, or when CuPredMode is MODE INTRA), a TB to be partitioned from the CB having a size of 64×64 may be determined on the basis of MaxTbSizeY. For example, when MaxTbSizeY is less than 64 (e.g., 32), the CB having a size of 64×64 may be partitioned into TUs having a size of 32×32, and intra prediction may be performed on each of the partitioned TUs. Therefore, four predicted blocks each having a size of 32×32 may be generated.

In this case, there may be a problem that the intra prediction in the CIIP mode and the intra prediction in the intra prediction mode are not aligned with each other. In other words, the intra prediction may be performed on a block having a size greater than 32×32 when the CIIP mode is used, and the intra prediction in the intra prediction mode may be performed on a block having a size less than or equal to 32×32. Therefore, in the case of intra prediction mode, hardware and software having the capability capable of processing intra prediction for blocks having a size less than or equal 32×32 are required, but in the case of CIIP mode, hardware and software having the capability capable of processing intra prediction for blocks having a size greater than the size of 32×32 are required. This may be a huge burden in terms of implementation. For example, some encoders intend to limit the maximum transform size to 32 instead of 64 to perform intra prediction on small-sized blocks, and to reduce the hardware and software burdens, but may need to prepare intra prediction for blocks having the size greater than 32 in order to use the CIIP mode.

FIG. 31 is a diagram illustrating merge data syntax according to an embodiment of the present invention.

According to an embodiment of the present invention, a grouping method may be used as a merge mode signaling method. For example, group_1_flag may be signaled, and the decoder may determine whether or not a selected mode belongs to group 1 on the basis of group_1_flag. When group_1_flag indicates that it does not belong to group 1, group_2_flag may be signaled. In addition, the decoder may determine whether or not the selected mode belongs to group 2, on the basis of group_2_flag. Such an operation may be performed even when a plurality of groups exist. In addition, signaling indicating a mode within a group may exist. In the grouping method, the signaling depth may be reduced compared to a sequential signaling method. In addition, the maximum length of signaling (e.g., the maximum length of a codeword) may be reduced.

The grouping method will be described in detail below.

First, it is assumed that three groups exist. A particular group may contain more than one mode. For example, there may be one mode included in Group 1. Group 1 may include a subblock merge mode, Group2 may include a regular merge mode and merge with motion vector difference (MMVD), and Group3 may include CIIP and a triangle merge mode. group_1_flag may be merge_subblock_flag, and group_2_flag may be regular_merge_flag. In addition, ciip_flag and mmvd_merge_flag may exist as syntax elements indicating a mode within the group. In an embodiment, merge_subblock_flag is signaled, and it may be determined, on the basis of merge_subblock_flag, whether or not the current mode is the subblock merge mode. In this case, when the current mode is not the subblock merge mode, regular_merge_flag may be signaled. The decoder may determine, on the basis of regular_merge_flag, whether the mode is included in Group 2 (regular merge mode or MMVD) or Group 3 (CIIP or triangular merge mode). In this case, when regular_merge_flag indicates Group 2, it may be determined, on the basis of mmvd_merge_flag, whether the current mode is the regular merge mode or MMVD. Meanwhile, when regular_merge_flag indicates Group 3, it may be determined, on the basis of ciip_flag, whether the current mode is CIIP or triangular merge mode.

Referring to FIG. 31, when the merge mode is used, merge_subblock_flag may be signaled. An embodiment in which the merge mode is used may be the same as described above, and may be a case where general_merge_flag is 1. In addition, the present invention may be applied to a case where CuPredMode is not MODE_IBC or to a case where CuPredMode is MODE_INTER. The decoder may determine whether to parse merge_subblock_flag on the basis of MaxNumSubblockMergeCand or a block size. When the value of merge_subblock_flag is 1, the decoder may determine to use the subblock merge mode, and may additionally determine a candidate index on the basis of merge_sub-block_idx. When the value of merge_subblock_flag is 0, the decoder may parse regular_merge_flag. In this case, a condition for allowing regular_merge_flag to be parsed may exist. For example, there may be a condition based on the block size. In addition, there may be a condition based on a syntax element signaled at a higher level indicating whether or not a mode is usable. In this case, syntax elements signaled at a higher level indicating whether or not the mode usable may include sps_ciip_enabled_flag and sps_triangle_enabled_flag. In this case, sps_triangle_enabled_flag may be a syntax element signaled at a higher level indicating whether the decoder may use a triangle mode, and may be signaled from a sequence parameter set. There may also be a condition based on a slice_type. In addition, there may be a condition based on cu_skip_flag. In this case, cu_skip_flag may be a syntax element indicating whether or not a skip mode may be used. When the skip mode is used, the residual signal may not be signaled. Therefore, when the skip mode is used, the decoder may reconstruct the block from the prediction signal without the residual signal (or a transform coefficient).

The conditions related to the block size for which CIIP may be used may be that the width of the block*the height of the block is 64 or more, the width of the block is less than 128, and the height of the block is less than 128. In addition, a block size condition that the triangular merge mode may be used may be that the block width*block height is 64 or more. Referring to FIG. 31, when the condition that the block width*block height is 64 or more is not satisfied, the decoder may not parse regular_merge_flag. In addition, when the width of the block is equal to (or greater than or equal to) 128 or the height of the block is equal to (or greater than or equal to) 128, the decoder may parse regular_merge_flag.

Specifically i) when the value of sps_ciip_enabled_flag is 1, the value of cu_skip_flag is 0, the width of the block is less than 128, and the height of the block is less than 128, if the condition that the block width*block height is 64 or more is satisfied, the decoder may parse regular_merge_flag. Or ii) when the value of sps_triangle_enabled_flag is 1, the value of MaxNumTriangleMergeCand is greater than 1, and slice_type is B, if the condition that the block width*block height is 64 or more is satisfied, the decoder may parse regular_merge_flag.

Meanwhile, when the condition for allowing regular_merge_flag to be parsed is not satisfied, that is, i) when the value of sps_ciip_enabled_flag is 1, the value of cu_skip_flag is 0, the width of the block is less than 128, and the height of the block is less than 128 is not satisfied, and ii) when the value of sps_triangle_enabled_flag is 1, the value of MaxNumTriangleMergeCand is greater than 1, and slice_type is B is not satisfied, the decoder may not parse regular_merge_flag. In this case, MaxNumTriangleMergeCand may be the maximum number of candidates that may be used in the triangle (merge) mode. In addition, slice_type may be signaling indicating a slice_type. slice_type of B indicates that bi-prediction may be used. slice_type of P indicates that bi-prediction may not be used and uni-prediction may be used. slice_type of P or B indicates that inter prediction may be used. slice_type of I indicates that inter prediction may not be used.

In addition, referring to FIG. 31, a condition based on the block size may be used when the decoder determines whether to parse ciip_flag. For example, when the width of the block is less than 128 and the height of the block is less than 128, the decoder may parse ciip_flag. On the other hand, when the width of the block is 128 (or 128 or more) or the height of the block is 128 (or 128 or more), the decoder may not parse ciip_flag. This is because only one of CIIP and triangle merge mode may be used when the width of block or height of block is 128 (or 128 or more). For example, CIIP may not be used, but only triangular merge mode may be used.

In the present invention, the fact that ciip_flag may be parsed may mean that CIIP may be used. Alternatively, the fact that ciip_flag may be parsed may mean that CIIP or triangular merge mode may be used.

The condition that CIIP may be used may include a case where the value of sps_ciip_enabled_flag is 1 and the value of cu_skip_flag is 0. In addition, the conditions related to the block size for which CIIP may be used may include a case where the width of the block*the height of the block is 64 or more, the width of the block is less than 128, and the height of the block is less than 128.

The condition that the triangle merge mode may be used may include a case where a value of sps_triangle_enabled_flag is 1, a value of MaxNumTriangleMergeCand is greater than 1, and slice_type is B. In addition, the condition related to the block size for which the triangular merge mode may be used may include a case where the width of the block*the height of the block is 64 or more.

When the condition that CIIP may be used described above or the condition that the triangular merge mode may be used described above is satisfied, the decoder may parse regular_merge_flag. On the other hand, when both the condition that CIIP may be used and the condition that the triangular merge mode may be used are not satisfied, the decoder may not parse regular_merge_flag.

When regular_merge_flag does not exist, the value of regular_merge_flag may be inferred to be equal to 1. In the present invention, when the value of regular_merge_flag is 1, the regular merge mode or MMVD may be used. Therefore, when both the condition related to the block size for which CIIP may be used described above and the condition related to the block size for which the triangular merge mode may be used described above are not satisfied, usable modes may be the regular merge mode and MMVD. In this case, regular_merge_flag may be determined as 1 without being parsed.

In addition, when both the condition that CIIP may be used described above and the condition that the triangular merge mode may be used described above are not satisfied, the usable mode may be the regular merge mode or MMVD, and thus regular_merge_flag may be inferred to be equal to 1 without being parsed.

Referring to FIG. 31, when the value of regular_merge_flag is 1, syntax elements may be parsed on the basis of the value of sps_mmvd_enabled_flag. sps_mmvd_enabled_flag may be a syntax element signaled at a higher level indicating whether MMVD is usable. When the value of sps_mmvd_enabled_flag is 0, MMVD may not be used. Referring to FIG. 31, when the value of sps_mmvd_enabled_flag is 0, mmvd_merge_flag, mmvd_cand_flag, mmvd_distance_idx, and mmvd_direction_idx may not be parsed. When mmvd_merge_flag does not exist, the value of mmvd_merge_flag may be inferred to be equal to 0.

In addition, referring to FIG. 31, if the value of regular_merge_flag is 0, the decoder may parse ciip_flag when both the condition that CIIP may be used described above and the condition that the triangular merge mode may be used described above are satisfied. In this case, when the value of ciip_flag is 1, CIIP may be used, and when the value of ciip_flag is 0, the triangular merge mode may be used. When the value of ciip_flag is 0, it may mean that CIIP is not used. On the other hand, when the condition that CIIP may be used described above or the condition that the triangular merge mode may be used described above is not satisfied, the decoder may not parse ciip_flag.

When ciip_flag does not exist, the value of ciip_flag may be inferred to be equal to 1 when all of the following conditions are satisfied. Meanwhile, if any one of the following conditions is not satisfied, the value of ciip_flag may be inferred to be equal to 0.

Condition c-1) sps_ciip_enabled_flag==1
    Condition c-2) general_merge_flag==1
    Condition c-3) merge_subblock_flag==0
    Condition c-4) regular_merge_flag==0
    Condition c-5) cbWidth<128
    Condition c-6) cbHeight<128
    Condition c-7) cbWidth*cbHeight>=64
    Condition c-8) cu_skip_flag==0

The sps_ciip_enabled_flag may be a syntax element signaled at a higher level indicating whether or not CIIP is used. The sps_ciip_enabled_flag may be signaled from the sequence parameter set. general_merge_flag may be a syntax element indicating whether or not a merge mode is used. merge_subblock_flag may be a syntax element indicating whether or not a subblock merge mode is used. In this case, the subblock merge mode may be an affine merge mode or subblock-based temporal motion vector prediction (SbTMVP). regular_merge_flag may be a syntax element indicating whether or not an existing merge mode (e.g., regular merge mode) or MMVD is used.

FIG. 32 is a diagram illustrating merge data syntax according to an embodiment of the present invention.

As described above, the block size for which CIIP may be used is limited, and in this case, the block size may be a fixed value. In addition, when the maximum transform size is variable, there is a problem that intra prediction in the CIIP mode and intra prediction in the intra prediction mode are not aligned with each other.

Hereinafter, a method for solving this problem will be described with reference to FIG. 32. Referring to FIG. 32, a block size for which the CIIP mode may be used may be variable. Specifically, the block size for which the CIIP mode may be used may be based on MaxTbSizeY. For example, when the width of the block is less than or equal to MaxTbSizeY and the height of the block is less than or equal to MaxTbSizeY, the CIIP mode may be used. In addition, when the width of the block is greater than MaxTbSizeY or the height of the block is greater than MaxTbSizeY, the CIIP may not be used. In this case, the width and height of the block may be the width and height of the coding block (unit). Because the width and height of the block are determined on the basis of MaxTbSizeY, the intra prediction size in the CIIP mode is limited to less than or equal to MaxTbSizeY, and the existing intra prediction size is also limited to less than or equal to MaxTbSizeY, and thus intra prediction may be performed using a unified method, hardware, and software. This has the effect of reducing the resources required for hardware and software. Even when MaxTbSizeY is 32, both intra prediction in the CIIP mode and conventional intra prediction may be performed on a block having a size of 32×32 or less.

Referring to FIG. 32, the condition for allowing the CIIP mode to be used may include a case where the value of sps_ciip_enabled_flag is 1, cbWidth is less than or equal to MaxTbSizeY, cbHeight is less than or equal to MaxTbSizeY, cbWidth*cbHeight is 64 or more, and the value of cu_skip_flag is 0. Therefore, when the value of sps_ciip_enabled_flag is 0, cbWidth is greater than MaxTbSizeY, cbHeight is greater than MaxTbSizeY, cbWidth*cbHeight is less than 64, or the value of cu_skip_flag is not 0, the CIIP mode is not used. The decoder may parse ciip_flag when the condition for using the CIIP mode is satisfied. In addition, when the condition for using the CIIP mode is satisfied, the decoder may parse regular_merge_flag. In addition, the decoder may consider additional conditions when parsing ciip_flag or regular_merge_flag. In addition, when the CIIP mode may not be used, the decoder may not parse ciip_flag.

The conditions for allowing the triangle (merge) mode to be used may include a case where the value of sps_triangle_enabled_flag is 1, the value of MaxNumTriangleMergeCand is greater than 1, slice_type is B, and cbWidth*cbHeight is 64 or more.

In this case, when both the condition for allowing the CIIP mode to be used and the condition for allowing the triangular (merge) mode to be used are satisfied, the decoder may parse ciip_flag. When either the condition for allowing the CIIP mode to be used and the condition for allowing the triangular (merge) mode to be used is not satisfied, the decoder may not parse the ciip_flag. In addition, when ciip_flag does not exist and the condition for allowing the CIIP mode to be used is not satisfied, the ciip_flag value may be inferred to be equal to 0. In addition, when ciip_flag does not exist, the condition for allowing the CIIP mode to be used is satisfied, the value of general_merge_flag is 1, the value of merge_subblock_flag is 0, and the value of regular_merge_flag is 0, the ciip_flag value may be inferred to be equal to 1.

When any one of the condition for allowing the CIIP mode to be used and the condition for allowing the triangular (merge) mode to be used is satisfied, the decoder may parse regular_merge_flag. When both the condition for allowing the CIIP mode to be used and the condition for allowing the triangular (merge) mode to be used are not satisfied, the decoder may not parse regular_merge_flag. In this case, if regular_merge_flag does not exist, the value of regular_merge_flag may be inferred as (general_merge_flag && !merge_subblock_flag).

Referring to FIG. 32, when cbWidth is less than or equal to MaxTbSizeY and cbHeight is less than or equal to MaxTbSizeY, the decoder may parse ciip_flag. On the other hand, when cbWidth is greater than MaxTbSizeY or cbHeight is greater than MaxTbSizeY, the decoder may not parse ciip_flag. When cbWidth is greater than MaxTbSizeY or cbHeight is greater than MaxTbSizeY, the value of ciip_flag may be inferred to be equal to 0.

When cbWidth is less than or equal to MaxTbSizeY and cbHeight is less than or equal to MaxTbSizeY, the decoder may parse regular_merge_flag. On the other hand, when i) cbWidth is greater than MaxTbSizeY or cbHeight is greater than MaxTbSizeY, and ii) the condition for allowing the triangular (merge) mode to be used is not satisfied, regular_merge_flag may not be parsed.

When the condition of Equation 5 below is satisfied, the decoder may parse ciip_flag.

$$\begin{aligned}&(\text{sps\_ciip\_enabled\_flag} \ \&\& \\ &\quad \text{sps\_triangle\_enabled\_flag} \ \&\& \\ &\quad \text{MaxNumTriangleMergeCand} >1 \ \&\& \\ &\quad \text{slice\_type} ==B \ \&\& \ \text{cu\_skip\_flag}_{[x0]} \\ &\quad _{[y0]}==0 \ \&\& (\ \text{cbWidth} * \\ &\quad \text{cbHeight} )>=64 \ \&\& \ \text{cbWidth} <= \\ &\quad \text{MaxTbSizeY} \ \&\& \ \text{cbHeight} <=\text{MaxTb-} \\ &\quad \text{SizeY})\end{aligned}$$
      [Equation 5]

In a case where ciip_flag does not exist, when all of the following conditions are satisfied, the value of ciip_flag may be inferred to be equal to 1. On the other hand, when any one of the following conditions is not satisfied, the value of ciip_flag may be inferred to be equal to 0.

Condition d-1) sps_ciip_enabled_flag==1
    Condition d-2) general_merge_flag==1
    Condition d-3) merge_subblock_flag==0
    Condition d-4) regular_merge_flag==0
    Condition d-5) cbWidth<=MaxTbSizeY Condition d-6) cbHeight<=MaxTbSizeY
Condition d-7) cbWidth*cbHeight>=64
Condition d-8) cu_skip_flag==0

When the condition of Equation 6 below is satisfied, the decoder may parse regular_merge_flag.

$$((\text{cbWidth} * \text{cbHeight})\text{>=64\&\&((}$$
$$(\text{sps\_ciip\_enabled\_flag \&\&}$$
$$\text{cu\_skip\_flag}_{[x0][y0]}\text{==0\&\&}$$
$$\text{sps\_triangle}\text{<=\_enabled\_flag \&\&}$$
$$\text{slice\_type}\text{<=cbWidth})||($$
$$\text{MaxTbSizeY cbHeight \&\&}$$
$$\text{MaxTbSizeY MaxNumTriangle}\text{>1\&\&}$$
$$\text{MergeCand}\text{==}_{B})))\qquad\text{[Equation 6]}$$

When regular_merge_flag does not exist, the value of regular_merge_flag may be inferred as (general_merge_flag && !merge_subblock_flag). That is, when the value of general_merge_flag is 1 and the value of merge_subblock_flag is 0, the value of regular_merge_flag may be inferred to be equal to 1. On the other hand, when the value of general_merge_flag is 0 or the value of merge_subblock_flag is 1, regular_merge_flag may be inferred to be equal to 0.

FIG. 33 is a diagram illustrating a method of performing the CIIP mode according to an embodiment of the present invention.

FIG. 33 may be a diagram illustrating an embodiment for solving the problem described in FIG. 30.

In an embodiment of the present invention, intra prediction in the CIIP mode may be performed in units of transform blocks (units). That is, when the CIIP mode is used, TU partitioning may be performed. For example, when cbWidth is greater than MaxTbSizeY or cbHeight is greater than MaxTbSizeY, the CIIP mode may be used, in which case TU partitioning is performed, and intra prediction may be performed on a block of (tbWidth×tbHeight) in units of (MaxTbSizeY×MaxTbSizeY) blocks. Therefore, intra prediction in the CIIP mode may be performed with the same resources as the existing intra prediction.

FIG. 33 illustrates a prediction method when the CIIP mode is used for a CU having a size of 64×64 and MaxTb-SizeY is 32. Since the CIIP mode is used, a prediction signal may be generated on the basis of a prediction signal for which inter prediction is used and a prediction signal for which intra prediction is used. In this case, inter prediction may be performed on the CU having a size of 64×64. In addition, since a block having a size of 64×64 exceeds MaxTbSizeY, TU partitioning may be performed before intra prediction is performed. Blocks after TU partitioning may be blocks having a size of MaxTbSizeY×MaxTbSizeY. That is, after TU partitioning, a plurality of blocks having a size of 32×32 may be generated. In addition, intra prediction may be performed on blocks generated after TU partitioning, respectively.

Hereinafter, an intra prediction method for a case where CIIP mode is used and TU partitioning is performed will be described.

For intra prediction after TU partitioning, a reference sample at a location adjacent to each TU may be used after partitioning. Since the reference sample close to the block is used, there is an advantage in terms of prediction performance and also in terms of coding efficiency. For example, the reference sample may be a reconstructed sample. However, in this case, in order to perform intra prediction on a specific TU, it is necessary to wait for an adjacent TU (i.e., the TU corresponding to the position of the reference sample) to be reconstructed, and thus unnecessary latency may occur. In addition, the reference sample may be a predicted sample. In this case, the prediction performance may be lower than that of using the reconstructed sample, but even if the adjacent TU is not completely reconstructed, if the prediction is completed, prediction of the current TU may start. Therefore, latency may be reduced compared to the case of using the reconstructed sample as the reference sample. However, even if the predicted sample is used as the reference sample, there may be a problem with respect to latency.

For intra prediction after TU partitioning, a reference sample at a position adjacent to the CU before TU partitioning may be used. In this case, the latency problem described above may be solved. However, since non-adjacent samples are used, prediction performance may be deteriorated. In addition, since intra prediction is performed on some of the partitioned TUs using reference samples that are not adjacent to the TU, reference samples at different positions from the conventional intra prediction are required, and a process different from the conventional intra prediction is required.

In a case where TU partitioning is performed when the CIIP mode is used, prediction in the CIIP mode may be performed even if the size of a CU is large. This is because intra prediction included in the CIIP mode may be performed on a CU having a large size, and intra prediction included in the CIIP mode may be performed on a partitioned and smaller block after TU partitioning. Therefore, the condition related to the block size for which the CIIP mode may be used may not have an upper limit. That is, the condition that cbWidth is less than 128 and cbHeight is less than 128 described in FIGS. 31 to 32 may not exist. Therefore, when the condition that (cbWidth*cbHeight) is 64 or more for the block size is satisfied, the decoder may parse ciip_flag or regular_merge_flag. In other words, even if cbWidth is greater than 64, cbHeight is greater than 64 (see FIG. 31), cbWidth is greater than MaxTbSizeY, or cbHeight is greater than MaxTbSizeY (see FIG. 32), the decoder may parse ciip_flag or regular_merge_flag.

Specifically, when the following conditions are satisfied, ciip_flag may be parsed. On the other hand, when any one of the following conditions is not satisfied, ciip_flag may not be parsed.

Condition e-1) sps_ciip_enabled_flag==1
Condition e-2) sps_triangle_enabled_flag==1
Condition e-3) MaxNumTriangleMergeCand>1
Condition e-4) slice_type==B
Condition e-5) cu_skip_flag==0
Condition e-6) cbWidth*cbHeight>=64

In a case where ciip_flag does not exist, when all of the following conditions are satisfied, ciip_flag is inferred to be equal to 1, and when any one of the following conditions is not satisfied, ciip_flag may be inferred to be equal to 0.

Condition f-1) sps_ciip_enabled_flag==1
Condition f-2) general_merge_flag==1
Condition f-3) merge_subblock_flag==0
Condition f-4) regular_merge_flag==0
Condition f-5) cbWidth*cbHeight>=64
Condition f-6) cu_skip_flag==0

When all of the following conditions are satisfied, regular_merge_flag may be parsed. On the other hand, when any one of the following conditions is not satisfied, regular_merge_flag may not be parsed.

Condition g-1) cbWidth*cbHeight>=64
Condition g-2)

(sps_ciip_enabled_flag && cu_skip_flag==0) (sps_trian-gle_enabled_flag && MaxNumTriangleMergeCand>1 && slice_type==B)

When regular_merge_flag does not exist, the value of regular_merge_flag may be inferred, which is the same as described with reference to FIGS. 31 and 32, and thus the description thereof will be omitted.

FIG. 34 is a diagram illustrating a chroma BDPCM syntax structure according to an embodiment of the present invention.

The BDPCM described in FIGS. 27 to 29 may be performed on the chroma component. By performing BDPCM on the chroma component, compression performance for specific video contents may be improved. In the present invention, the application of BDPCM to the chroma block will be described as chroma BDPCM.

In order to perform BDPCM on the chroma component, a separate signaling method is required and will be described with reference to FIG. 34. In addition, the syntax disclosed in FIG. 34 may be present in a coding unit syntax.

When the treeType value is SINGLE_TREE or DUAL_TREE_CHROMA, the syntax elements disclosed in FIG. 34 may be parsed. In addition, when ChromaArrayType is not 0, the syntax elements disclosed in FIG. 34 may be parsed. When the value of separate_colour_plane_flag is 0, ChromaArrayType may be set to the value of chroma_format_idc. When the value of separate_colour_plane_flag is 1, ChromaArrayType may be set to 0. In this case, separate_colour_plane_flag may indicate whether or not color components of the 4:4:4 chroma format are separately coded. For example, when the value of separate_colour_plane_flag is 0, it may indicate that color components are not separately coded. When the value of separate_colour_plane_flag is 0 and is not Monochrome, ChromaArrayType may not be 0.

When the value of pred_mode_plt_flag is 1 and the tree type treeType is DUAL_TREE_CHROMA, 'palette_cod-ing( )' may be performed. pred_mode_plt_flag is a syntax element indicating whether or not to use the palette mode, and 'palette_coding( )' may be a part that parses a syntax element related to the palette mode. When the value of pred_mode_plt_flag is 0 or the treeType value is not DUAL_TREE_CHROMA, the decoder may perform step (1) and subsequent steps in FIG. 34.

In addition, on the basis of cu_act_enabled_flag, step (1) and subsequent steps in FIG. 34 may be performed. cu_act_enabled_flag may be a syntax element indicating whether or not adaptive color transform is applied. When the value of cu_act_enabled_flag is 1, the residual signal may be coded in another color space, and when the value of cu_act_enabled_flag is 0, the residual signal may be coded in an original color space. The original color space may be a YUV color space or a YCbCr color space. The other color space may be a YCgCo color space or an RGB color space. Referring to FIG. 34, when the value of cu_act_enabled_flag is 0, step (1) and subsequent steps in FIG. 34 may be performed. Meanwhile, when the value of cu_act_enabled_flag is 1, step (1) and subsequent steps in FIG. 34 may not be performed. That is, when the value of cu_act_en-abled_flag is 0, the decoder may parse syntax elements related to chroma intra prediction, and when the value of cu_act_enabled_flag is not 0, the decoder may not parse syntax elements related to chroma intra prediction.

Referring to FIG. 34, when the condition of Equation 7 below is satisfied, the decoder may parse intra_bdpcm_chro-ma_flag.

$$( cbWidth <= MaxTsSize \text{ \&\&}$$
$$cbHeight <= MaxTsSize \text{ \&\&}$$
$$sps\_bdpcm\_chroma\_enabled\_flag )$$

[Equation 7]

intra_bdpcm_chroma_flag may be a syntax element indicating whether BDPCM is applied to a current chroma coding block. For example, when the value of intra_bdpcm_chroma_flag is 1, it may indicate that BDPCM is applied to the current chroma coding block, and when the value of intra_bdpcm_chroma_flag is 0, it may indicate that BDPCM is not applied to the current chroma coding block. Referring to FIG. 34, a condition for parsing intra_bdpcm_chroma_flag may exist. Alternatively, there may be a condition that chroma BDPCM may be used. The condition that chroma BDPCM may be used may be the same as the condition for parsing intra_bdpcm_chroma_flag. A condition for allowing intra_bdpcm_chroma_flag to be parsed is the same as Equation 7 described above, which will be described in detail as follows.

Condition h-1) cbWidth<=MaxTsSize
Condition h-2) cbHeight<=MaxTsSize
Condition h-3) sps_bdpcm_chroma_enable_flag==1

When any of the conditions described above is not satisfied, the decoder may not parse intra_bdpcm_chroma_flag. When intra_bdpcm_chroma_flag does not exist, the value of intra_bdpcm_chroma_flag may be inferred to be equal to 0. When the value of intra_bdpcm_chroma_flag is 1, the decoder may parse syntax related to chroma BDPCM. In this case, the syntax related to chroma BDPCM may include intra_bdpcm_chro-ma_dir_flag. intra_bdpcm_chroma_dir_flag may be a flag indicating a prediction direction of chroma BDPCM. For example, intra_bdpcm_chroma_dir_flag may indicate whether the prediction direction of chroma BDPCM is horizontal or vertical. sps_bdpcm_chroma_enable_flag may be a syntax element signaled at a higher level indicating whether chroma BDPCM is usable. For example, sps_bdpcm_chroma_enable_flag may be signaled at a range including the current coding unit (e.g., a level of a sequence, a picture, a slice, etc.). When the value of sps_bdpcm_chro-ma_enable_flag is 1, chroma BDPCM may be used, and an additional syntax element indicating whether chroma BDPCM is used may exist. When the value of sps_bdpcm_chroma_enable_flag is 0, chroma BDPCM is not used.

Referring to FIG. 34, when the decoder parses intra_bdpcm_chroma_flag and the value of intra_bdpcm_chroma_flag is 0 as a result of parsing, the decoder does not parse syntaxes related to chroma intra prediction. In this case, the syntaxes related to chroma intra prediction may include cclm_mode_flag, cclm_mode_idx, intra_chro-ma_pred_mode, etc. In this case, cclm_mode_flag may be a syntax element indicating whether or not cross component linear model (CCLM) is used as a chroma intra prediction mode. The cclm_mode_flag may be a syntax element indi-cating whether the chroma intra prediction mode is one of INTRA_LT_CCLM, INTRA_L_CCLM, and INTRA_T_C-CLM. CcLMEnabled may be a value indicating whether CCLM is usable. Alternatively, CclmEnabled may be a value indicating whether or not a syntax element indicating whether CCLM is usable is parsed. CCLM is a chroma prediction method based on a luma sample. cclm_mode_idx may be parsed when CCLM is used. cclm_mode_idx may be a syntax element indicating which method among a plurality of CCLM methods is used. When CCLM is not used, the decoder may parse intra_chroma_pred_mode. In this case, intra_chroma_pred_mode may be a syntax element indicating the intra prediction mode of a chroma sample. Specifically, intra_chroma_pred_mode may be a syntax element indicating which mode among a planar mode (mode index 0), a DC mode (mode index 1), a vertical mode (mode index 50), a horizontal mode (mode index 18), a diagonal mode (mode index 66), a DM mode (the same mode as luma mode) is used as the prediction mode for the chroma component.

Referring to FIG. 34, even if the condition for allowing intra_bdpcm_chroma_flag to be parsed or the condition that chroma BDPCM may be used is satisfied, when a syntax element is signaled that chroma BDPCM is not used, since the syntax related to the chroma intra prediction described above is not parsed, a problem in that the chroma prediction mode is not determined may occur.

FIG. 35 is a diagram illustrating a chroma BDPCM syntax structure according to an embodiment of the present invention.

The embodiment of FIG. 35 is an embodiment for solving the problem described with reference to FIG. 34, and redundant contents will be omitted.

Referring to FIG. 35, when a condition that intra_bdpcm_chroma_flag may be parsed or a condition that chroma BDPCM may be used is satisfied, the decoder may parse intra_bdpcm_chroma_flag. A condition that intra_bdpcm_chroma_flag may be parsed is the same as (1) of FIG. 35, which is the same as Equation 7 described above. That is, when all of the following conditions are satisfied, chroma BDPCM may be used, and when any one of the following conditions is not satisfied, chroma BDPCM may not be used. In addition, when any one of the following conditions is not satisfied, intra_bdpcm_chroma_flag may not exist. In this case, when intra_bdpcm_chroma_flag does not exist, the value of intra_bdpcm_chroma_flag may be inferred to be equal to 0.

Condition i-1) cbWidth<=MaxTsSize
Condition i-2) cbHeight<=MaxTsSize
Condition i-3) sps_bdpcm_chroma_enable_flag==1

The BDPCM application method described in FIG. 29 may also be applied to chroma BDPCM. That is, even if the coding block size cbWidth or cbHeight is greater than MaxTsSize, when the size of the partitioned TU or TB is less than or equal to MaxTsSize, chroma BDPCM may be used. Accordingly, when all of the following conditions are satisfied, chroma BDPCM may be used, and when any one of the following conditions is not satisfied, chroma BDPCM may not be used.

Condition j-1)
(cbWidth<=MaxTsSize && cbHeight<=MaxTsSize)||
(MaxTbSizeY==MaxTsSize)
Condition j-2) sps_bdpcm_chroma_enable_flag==1

When the value of intra_bdpcm_chroma_flag is 1, the decoder may parse syntaxes related to chroma BDPCM. In this case, the syntaxes related to chroma BDPCM may include intra_bdpcm_chroma_dir_flag, sps_bdpcm_chroma_enable_flag, etc. intra_bdpcm_chroma_dir_flag, sps_bdpcm_chroma_enable_flag, etc. may be the same as those described with reference to FIG. 34.

Referring to FIG. 35, when the decoder parses intra_bdpcm_chroma_flag and the value of intra_bdpcm_chroma_flag is 0 (when chroma BDPCM is not used) as a result of the parsing, the decoder may perform step (2) and subsequent steps in FIG. 35. That is, the decoder may parse a syntax related to other chroma intra prediction. The syntax related to other chroma intra prediction may be the same as that described with reference to FIG. 34. The syntax related to other chroma intra prediction may include cclm_mode_flag, cclm_mode_idx, intra_chroma_pred_mode, etc.

When the value of intra_bdpcm_chroma_flag is 0 and the value of CclmEnabled is 1, the decoder may parse cclm_mode_flag. In addition, when the value of cclm_mode_flag is 1, the decoder may parse cclm_mode_idx, and when the value of cclm_mode_flag is not 1, the decoder may parse intra_chroma_pred_mode.

Referring to FIG. 35, even when the condition that intra_bdpcm_chroma_flag may be parsed is satisfied and the syntax element is signaled that chroma BDPCM is not used as a result of parsing intra_bdpcm_chroma_flag, since syntax elements for determining other chroma prediction modes may be parsed, the decoder may determine the chroma prediction mode. Specifically, if the width and height of the block are less than or equal to the maximum transform skip size and a syntax element signaled at a higher level indicating whether or not chroma BDPCM may be used is used, the decoder may parse the syntax element indicating whether or not chroma BDPCM may be used. In this case, when it is indicated, as a result of parsing, that chroma BDPCM is not used, the decoder may determine the chroma intra prediction mode on the basis of a syntax element (e.g., cclm_mode_flag, intra_chroma_pred_mode) indicating which chroma intra prediction mode is to be used.

FIG. 36 is a diagram illustrating a higher level syntax related to BDPCM according to an embodiment of the present invention.

As described above, a higher level syntax including the syntax element indicating whether or not BDPCM is usable may exist. For example, syntax elements signaled at a higher level indicating whether or not BDPCM is usable may include sps_bdpcm_enabled_flag, sps_bdpcm_chroma_enabled_flag, etc. described above. Specifically, sps_bdpcm_enabled_flag is a syntax element signaled at a higher level indicating whether or not BDPCM for the luma component is usable. In addition, sps_bdpcm_chroma_enabled_flag is a syntax element signaled at a higher level indicating whether or not BDPCM for the chroma component is usable. In this case, the higher levels at which the syntax element indicating whether or not BDPCM is usable is signaled may include a sequence level, a sequence parameter set level (SPS level), a slice level, a picture level, and a picture parameter set level (PPS level). When the syntax element signaled at a higher level indicating whether or not BDPCM is usable indicates that BDPCM is usable (e.g., when its value is 1), an additional syntax element as to whether or not BDPCM is used may exist. For example, the syntax element as to whether or not BDPCM is used may exist at a block level and a coding unit (block) level. Meanwhile, when the syntax element signaled at a higher level indicating whether or not BDPCM is usable indicates that BDPCM is not usable (e.g., when its value is 0), the additional syntax element as to whether or not BDPCM is used may not exist. In addition, when the syntax element signaled at a higher level indicating whether or not BDPCM is usable does not exist, the value of the syntax element signaled at the higher level may be inferred to be equal to 0. In addition, the syntax element related to whether or not sps_bdpcm_enabled_flag is used may be intra_bdpcm_flag described with reference to FIGS. 28 and 29. intra_bdpcm_flag may be the same as intra_bdpcm_luma_flag. In addition, the syntax element related to whether or not sps_bdpcm_chroma_enabled_flag is used may be intra_bdpcm_chroma_flag described with reference to FIGS. 34 and 35.

A syntax element signaled at a higher level indicating whether or not transform skip is usable may exist. Referring to FIG. 36, the syntax element signaled at a higher level indicating or not whether transform skip is usable may be sps_transform_skip_enabled_flag. In this case, the higher levels at which the syntax element indicating whether or not transform skip is usable is signaled may include a sequence level, a sequence parameter set level (SPS level), a slice level, a picture level, and a picture parameter set level (PPS level). When the syntax element signaled at a higher level indicating whether or not transform skip is usable indicates that transform skip is usable (e.g., when its value is 1), an additional syntax element as to whether or not transform skip is used may exist. For example, the syntax element as to whether transform skip is used may exist at a block level and a coding unit (block) level. Meanwhile, when the syntax element signaled at a higher level indicating whether or not transform skip is usable indicates that transform skip is not usable (e.g., when its value is 0), the additional syntax element as to whether or not transform skip is used does not exist. When the syntax element signaled at the higher level indicating whether or not transform skip is usable does not exist, the value of the syntax element signaled at the higher level may be inferred to be equal to 0. A syntax element related to whether or not sps_transform_skip_enabled_flag is used may be transform_skip_flag described with reference to FIGS. 27 and 28.

As described above, in order for BDPCM to be used, the transform skip should be able to be used. Referring to FIG. 36, when the syntax element signaled at a higher level indicating whether or not transform skip is usable indicates that transform skip is usable, the decoder may parse the syntax element signaled at the higher level indicating whether or not BDPCM is usable. Meanwhile, when the syntax element signaled at a higher level indicating whether or not transform skip is usable indicates that transform skip is not usable, the decoder may not parse the syntax element signaled at the higher level indicating whether or not BDPCM is usable. In this case, the syntax element signaled at the higher level indicating whether or not BDPCM is usable may include both information on the luma component and information on the chroma component.

When the value of sps_bdpcm_enabled_flag is 1, the decoder may parse sps_bdpcm_chroma_enabled_flag. Meanwhile, when the value of sps_bdpcm_enabled_flag is 0, the decoder may not parse sps_bdpcm_chroma_enabled_flag. That is, only when the BDPCM for the luma component is usable, the BDPCM for the chroma component may be used.

Referring to FIG. 36, when the decoder parses sps_transform_skip_enabled_flag and a value of sps_transform_skip_enabled_flag is 1 as a result of parsing, the decoder may parse sps_bdpcm_enabled_flag. When the value of sps_bdpcm_enabled_flag is 1, the decoder may parse sps_bdpcm_chroma_enabled_flag.

FIG. 37 is a diagram illustrating syntax elements signaled at a higher level regarding BDPCM according to an embodiment of the present invention.

In the embodiment of FIG. 37, contents redundant to those of FIG. 36 will be omitted.

Referring to FIG. 37, whether or not chroma BDPCM is usable may be determined on the basis of the chroma format. Information related to the color format may include chroma_format_idc, separate_colour_plane_flag, Chroma format, SubWidthC, SubHeightC, etc. Specifically, when the color format is 4:4:4, chroma BDPCM may be used. Meanwhile, when the color format is not 4:4:4, chroma BDPCM may not be usable. Therefore, whether or not chroma BDPCM may be used may be based on chroma_format_idc. For example, when the value of chroma_format_idc is 3, the decoder may parse a syntax element sps_bdpcm_chroma_enabled_flag indicating whether or not chroma BDPCM is usable enabled, otherwise, the decoder may not parse the syntax element sps_bdpcm_chroma_enabled_flag indicating whether or not chroma BDPCM is usable. In the present invention, the color format may be used in the same meaning as the chroma format.

FIG. 38 is a diagram illustrating syntax related to chroma BDPCM according to an embodiment of the present invention.

The syntax element signaled at a higher level indicating whether or not BDPCM for the luma component is usable and the syntax element signaled at a higher level indicating whether or not BDPCM for the chroma component is usable may not exist separately. That is, whether or not BDPCM for both the luma component and the chroma component is usable may be indicated by one syntax element. For example, when the syntax element signaled at the higher level indicating whether or not BDPCM is usable indicates that BDPCM is usable, BDPCM for the luma component or BDPCM for the chroma component may be usable. In addition, in this case, an additional syntax element indicating whether or not BDPCM is used may exist. For example, the additional syntax element may be intra_bdpcm_flag and intra_bdpcm_chroma_flag described above. Meanwhile, when the syntax element signaled at the higher level indicating whether or not BDPCM is usable indicates that BDPCM is not usable, BDPCM may not be used for both the luma component and the chroma component.

The syntax element indicating whether or not BDPCM for the luma component is used and the syntax element indicating whether or not BDPCM for the chroma component is used may be parsed on the basis of the syntax element signaled at a higher level indicating whether or not the same BDPCM is usable for both the luma component and the chroma component. For example, when the syntax element indicating whether the same BDPCM is usable is sps_intra_bdpcm_flag, as described with reference to FIGS. 28 to 29, the decoder may parse the syntax element indicating whether or not BDPCM for the luma component is used. That is, when the value of sps_bdpcm_enabled_flag is 1, the decoder may parse intra_bdpcm_flag (in this case, an additional condition may be considered), and when the value of sps_bdpcm_enabled_flag is not 1, the decoder may not parse intra_bdpcm_flag.

Referring to FIG. 38, the syntax element indicating whether or not BDPCM for the chroma component is used may be performed according to the value of sps_bdpcm_enabled_flag. For example, when the value of sps_bdpcm_enabled_flag is 1, the decoder may parse intra_bdpcm_chroma_flag (in this case, an additional condition may be considered), and when the value of sps_bdpcm_enabled_flag is not 1, the decoder may not parse intra_bdpcm_chroma_flag.

A syntax element indicating whether or not BDPCM at a coding unit (block) level is used may not be separated for the luma component and the chroma component. That is, when the syntax element indicating whether or not BDPCM is used indicates that BDPCM is used, BDPCM may be used for both the luma component and the chroma component. Meanwhile, when the syntax element indicating whether or not BDPCM is used indicates that BDPCM is not used, BDPCM may not be used for both the luma component and the chroma component.

FIG. 39 is a diagram illustrating syntax related to intra prediction according to an embodiment of the present invention.

Referring to FIG. 39, syntax elements related to a plurality of intra predictions may be signaled according to a preset order.

Syntax elements may be grouped and signaled for each color component. For example, syntax elements related to the luma component may be grouped and signaled. Syntax elements related to the chroma component may be grouped and signaled. In addition, a syntax element group related to the luma component and a syntax element group related to the chroma component may be signaled in order. In contrast, the syntax element group related to the chroma component and the syntax element group related to the luma component may be signaled in order.

Referring to FIG. 39, a structure in which the syntax element group related to the luma component and the syntax element group related to the chroma component are signaled in order will be described.

The syntax element group related to the luma component may include the following syntax elements.

i) Syntax Elements Related to BDPCM for Luma Component:

The syntax elements may include a syntax element indicating whether or not BDPCM may be used and a syntax element indicating a prediction direction. For example, intra_bdpcm_luma_flag and intra_bdpcm_luma_dir_flag disclosed in FIG. 39 may be corresponded to the syntax elements.

ii) Matrix-Based Intra Prediction (MIP) Related Syntax Elements:

The syntax elements mean a syntax element indicating whether MIP prediction is used, a syntax element indicating whether a MIP input vector is transposed, and a syntax element indicating a MIP mode. For example, intra_mip_flag, intra_mip_transposed, and intra_mip_mode disclosed in FIG. 39 may be corresponded to the syntax elements.

iii) Syntax Element Indicating Reference Line Used for Prediction:

The syntax element may be a syntax element indicating the position of a reference line used for intra prediction. For example, intra_luma_ref_idx disclosed in FIG. 39 may be corresponded to the syntax element.

iv) Intra Sub-Partition (ISP) Related Syntax Elements:

The syntax elements may include a syntax element indicating whether or not ISP is used and a syntax element indicating an ISP partitioned direction. For example, intra_subpartitions_mode_flag and intra_subpartitions_split_flag disclosed in FIG. 39 may be corresponded to the syntax elements. In this case, the ISP is an intra sub-partition mode or a method of predicting by partitioning a block into sub-partitions.

v) Syntax Elements Indicating Intra Prediction Mode:

The syntax elements may include a syntax element indicating whether or not to use an MPM list (candidate list), a syntax element indicating whether or not to use planar mode, a syntax element indicating an MPM index, and a syntax element indicating a mode not included in the MPM list. For example, intra_luma_mpm_flag, intra_luma_notplanar_flag, intra_luma_mpm_idx, and intra_luma_mpm_remainder disclosed in FIG. 39 may be corresponded to the syntax elements.

The syntax element group related to the chroma component may include the following syntax elements.

i) Chroma Component Syntax Elements Related to BDPCM:

The chroma component syntax elements may include a syntax element indicating whether or not BDPCM is used and a syntax element indicating the prediction direction. For example, intra_bdpcm_chroma_flag and intra_bdpcm_chroma_dir_flag disclosed in FIG. 39 may be corresponded to the chroma component syntax elements.

ii) Cross Component Linear Model (CCLM) Related Syntax Elements:

The CCLM related syntax elements may include a syntax element indicating whether or not CCLM is used and a syntax element indicating a CCLM mode used for prediction. For example, cclm_mode_flag and cclm_mode_idx disclosed in FIG. 39 may be corresponded to the CCLM related syntax element. CCLM may be a method of predicting based on another color component value. Specifically, CCLM may be a method of predicting the chroma component on the basis of a luma component value.

iii) Syntax Element Related to Chroma Intra Prediction Mode:

The syntax element may be a syntax element used to determine an intra prediction mode index for the chroma component. For example, intra_chroma_pred_mode disclosed in FIG. 39 may be corresponded to the syntax element.

Referring to FIG. 39, when the treeType is SINGLE_TREE or DUAL_TREE_LUMA, the decoder may parse the syntax elements related to the luma component, and when the tree type is SINGLE_TREE or DUAL_TREE_CHROMA, the decoder may parse syntax elements related to the chroma component. Therefore, the decoder may consecutively parse the syntax element group related to the luma component and may consecutively parse the syntax group related to the chroma component.

Referring to FIG. 39, the syntax elements intra_bdpcm_chroma_flag and intra_bdpcm_chroma_dir_flag related to the chroma component may be positioned after the syntax element group related to the luma component. Therefore, when the tree type is SINGLE_TREE, intra_bdpcm_chroma_flag and intra_bdpcm_chroma_dir_flag positioned after the syntax element group related to the luma component may be parsed.

Through parsing in this way, the syntax elements related to the luma component and the syntax elements related to the chroma component are consecutively positioned (parsed), respectively, and thus there is an advantage in terms of memory management. That is, it may be efficient in terms of implementation.

FIG. 40 is a diagram illustrating syntax related to intra prediction according to an embodiment of the present invention.

Referring to FIG. 39, the syntax element group related to the luma component and the syntax element group related to the chroma component may not be parsed in order. For example, the order of some of syntax elements of the syntax element group related to the luma component and the syntax element group related to the chroma component described with reference to FIG. 39 may be reversed and parsed. Specifically, the syntax element related to the BDPCM for the luma component and the syntax element related to the BDPCM for the chroma component may be consecutively parsed. A syntax element group excluding syntax elements related to the BDPCM for the luma component among the syntax elements included in the syntax element group related to the luma component and a syntax element group excluding syntax elements related to BDPCM for the chroma component among the syntax elements included in the syntax element group related to the chroma component may be parsed consecutively. In addition, syntax elements related to BDPCM may be parsed before other groups of syntax elements.

An embodiment of the order in which the syntax elements are parsed is as follows.

First, the syntax element related to BDPCM for the luma component may be parsed, and the syntax element related to BDPCM for the chroma component may be parsed. Then, among the syntax elements included in the syntax element group related to the luma component, a syntax element group excluding the syntax elements related to the BDPCM for the luma component may be parsed. Then, among the syntax elements included in the syntax element group related to the chroma component, a syntax element group excluding the syntax elements related to BDPCM for the chroma component may be parsed.

Referring to FIG. 40, intra_bdpcm_luma_flag, intra_bdpcm_luma_dir_flag, intra_bdpcm_chroma_flag, and intra_bdpcm_chroma_dir_flag may be positioned before intra_mip_flag, intra_mip_transposed, intra_mip_mode, intra_luma_ref_idx, intra_subpartitions_mode_flag, intra_subpartitions_split_flag, intra_luma_mpm_flag, intra_luma_notplanar_flag, intra_luma_mpm_idx, intra_luma_mpm_remainder, cclm_mode_flag, cclm_mode_idx, and intra_chroma_pred_mode.

Alternatively, intra_bdpcm_luma_flag, intra_bdpcm_luma_dir_flag, intra_bdpcm_chroma_flag, and intra_bdpcm_chroma_dir_flag may be positioned before at least one of intra_mip_flag, intra_mip_transposed, intra_mip_mode, intra_luma_ref_idx, intra_subpartitions_mode_flag, intra_subpartitions_split_flag, intra_luma_mpm_flag, intra_luma_notplanar_flag, intra_luma_mpm_idx, intra_luma_mpm_remainder, cclm_mode_flag, cclm_mode_idx, and intra_chroma_pred_mode.

Referring to FIG. 40, the syntax element related to BDPCM for the chroma component may be positioned before the syntax element related to the luma component. Through positioning in this way, when the chroma BDPCM is used a lot, there is an effect that the action/operation for determining whether or not to parse the syntax element is reduced.

Luma BDPCM and Chroma BDPCM may share the prediction direction. Therefore, as illustrated in FIG. 40, intra_bdpcm_luma_dir_flag and intra_bdpcm_chroma_dir_flag do not exist separately, and the prediction direction of the luma BDPCM and the prediction direction of the chroma BDPCM may be indicated through one syntax element. In this case, whether or not to use luma BDPCM and whether or not to use) chroma BDPCM may not be independent. For example, in order for chroma BDPCM to be used, luma BDPCM may need to be used. Therefore, the syntax element indicating whether or not to use the luma BDPCM and the syntax element indicating whether or not to use the chroma BDPCM may be dependent. Only when the syntax element indicating whether or not to use the luma BDPCM indicates that the luma BDPCM is used, the syntax element indicating whether or not to use the chroma BDPCM may be parsed.

FIG. 41 is a diagram illustrating sequence parameter set syntax according to an embodiment of the present invention.

The sequence parameter set (SPS) syntax may be syntax applied to a coded video sequence (CVS). Whether or not the SPS syntax is applied to the CVS may be determined by a syntax element value of a picture parameter set (PPS) referenced by a syntax element of a slice header.

The syntax elements disclosed in FIG. 41 may be some of the SPS syntax elements. Referring to FIG. 41, the SPS syntax may include syntax elements such as pic_width_max_in_luma_samples, pic_height_max_in_luma_samples, sps_log2_ctu_size_minus5, subpics_present_flag, sps_num_subpics_minus1, subpic_ctu_top_left_x, subpic_ctu_top_left_y, subpic_width_minus1, subpic_height_minus1, subpic_treated_as_pic_flag, loop_filter_across_subpic_enabled_flag, sps_subpic_id_present_flag, sps_subpic_id_signalling_present_flag, sps_subpic_id_len_minus1, and sps_subpic_id. In addition, some of the syntax elements included in the SPS syntax may exist as many as the number of subpictures. For example, the syntax elements subpic_ctu_top_left_x, subpic_ctu_top_left_y, subpic_width_minus1, subpic_height_minus1, subpic_treated_as_pic_flag, loop_filter_across_subpic_enabled_flag, and sps_subpic_id may exist as many as the number of subpictures. Specifically, these syntax elements may be represented syntaxElement[I], where i may be 0 to (the number of subpictures−1). In this case, syntaxElements may be syntax elements that exist as many as the number of subpictures.

A subpicture may be a lower unit than a picture or a frame. For example, the picture or frame may include one or more subpictures. In this case, the subpicture may be a rectangular region. Specifically, the subpicture may mean the rectangular region composed of one or more slices in the picture. In addition, the subpictures may be independently decoded. Therefore, even if the decoder receives only information about a certain subpicture in the picture, the decoder may decode and reconstruct the received subpicture. In addition, a plurality of subpictures in the picture may not overlap each other.

Referring to FIG. 41, when the value of subpics_present_flag is 1, the decoder may parse sps_num_subpics_minus1, subpic_ctu_top_left_x, subpic_ctu_top_left_y, subpic_width_minus_1, subpic_height_minus_1, subpic_treated_as_pic_flag, and loop_filter_across_subpic_enabled_flag. In addition, subpic_ctu_top_left_x, subpic_ctu_top_left_y, subpic_height_minus_1, subpic_treated_as_pic_flag, and loop_filter_across_subpic_enabled_flag may be parsed as many as (sps_num_subpics_minus1+1), respectively.

The syntax elements of SPS syntax described above and a subpicture signaling method will be described with reference to FIG. 42.

FIG. 42 is a diagram illustrating syntax elements related to the subpicture according to an embodiment of the present invention.

pic_width_max_in_luma_samples disclosed in FIG. 42 is a syntax element indicating a maximum width of a picture, and in this case, the maximum width of the picture may be expressed in units of luma samples. The value of pic_width_max_in_luma_samples may not be 0, and may be an integer multiple of a preset value. The preset value may be a larger value of 8 and a minimum coding block size. In this case, the minimum coding block size may be determined on the basis of the luma sample and may be described as MinCbSizeY.

In addition, pic_height_max_in_luma_samples is a syntax element indicating a maximum height of a picture, and in this case, the maximum height of the picture may be expressed in units of luma samples. In addition, the value of pic_height_max_in_luma_samples may not be 0, and may be an integer multiple of a preset value. The preset value may be a larger value of 8 and the minimum coding block size. In this case, the minimum coding block size may be determined on the basis of the luma sample and may be described as MinCbSizeY.

When the picture uses the subpicture, pic_width_max_in_luma_samples and pic_height_max_in_luma_samples indicate the width and height of the picture, respectively. In this case, the maximum width and maximum height of the picture may be the same as the width and height of the picture, respectively.

sps_log2_ctu_size_minus5 may be a syntax element indicating the size of the coding tree block (CTB) of the coding tree unit (CTU). Specifically, sps_log2_ctu_size_minus5 may indicate the size of the luma coding tree block. In addition, sps_log2_ctu_size_minus5 may have a value obtained by taking log2 of the CTB size in units of luma samples and then subtracting a preset value therefrom. If the size of the luma coding tree block is CtbSizeY, CtbSizeY may be (1<<(sps_log2_ctu_size_minus5+preset value)). The preset value may be 5. That is, when sps_log2_ctu_size_minus5 is 0, 1, and 2, CtbSizeY values may be 32, 64, and 128, respectively. In addition, the sps_log2_ctu_size_minus5 value may be 2 or less.

subpics_present_flag is a syntax element indicating whether or not subpicture parameters exist. subpics_present_flag indicates whether subpictures may be used or whether the number of subpictures may be signaled as a value greater than 1. In this case, the subpicture parameters may include sps_num_subpics_minus1, subpic_ctu_top_left_x, subpic_ctu_top_left_y, subpic_width_minus1, subpic_height_minus1, subpic_treated_as_pic_flag, loop_filter_across_subpic_enabled_flag, etc.

sps_num_subpics_minus1 may be a syntax element indicating the number of subpictures. For example, a value obtained by adding a preset value to a value of sps_num_subpics_minus1 may be the number of subpictures. In this case, the preset value may be 1. In this case, the number of subpictures may be signaled as a value of 1 or more. In addition, the preset value may be 2. In this case, the number of subpictures may be signaled as a value of 2 or more. The sps_num_subpics_minus1 value is 0 or more and 254 or less, and may be expressed in 8-bit. Meanwhile, when the sps_num_subpics_minus1 value does not exist, the value of sps_num_subpics_minus1 may be inferred to be equal to 0.

subpic_ctu_top_left_x, subpic_ctu_top_left_y, subpic_width_minus1, and subpic_height_minus1 disclosed in FIG. 42 are syntax elements indicating the position and size of each subpicture. The subpic_ctu_top_left_x[i], subpic_ctu_top_left_y[i], subpic_width_minus1[i], and subpic_height_minus1[I] indicate values corresponding to an i-th subpicture. In this case, the value of i may be equal to or greater than 0 and less than or equal to the value of sps_num_subpics_minus1.

subpic_ctu_top_left_x may indicate the x-coordinate (horizontal position) of the top-left position of the subpicture. Specifically, subpic_ctu_top_left_x may indicate the x-coordinate of the top-left CTU of the subpicture. In this case, the coordinates may be expressed in units of CTU or CTB. For example, the coordinates may be expressed in units of CtbSizeY. In addition, subpic_ctu_top_left_x may be signaled as an unsigned integer value, and in this case, the number of bits may be Ceil(Log2 (pic_width_max_in_luma_samples/CtbSizeY)). Meanwhile, when the value of subpic_ctu_top_left_x does not exist, the value of subpic_ctu_top_left_x may be inferred to be equal to 0.

subpic_ctu_top_left_y may indicate the y-coordinate (vertical position) of the top-left position of the subpicture.

Specifically, subpic_ctu_top_left_y may indicate the y-coordinate of the top-left CTU of the subpicture. In this case, the coordinates may be expressed in units of CTU or CTB. For example, the coordinates may be expressed in units of CtbSizeY. In addition, subpic_ctu_top_left_y may be signaled as an unsigned integer value. In this case, the number of bits may be Ceil(Log2 (pic_height_max_in_luma_samples/CtbSizeY)). Meanwhile, when the value of subpic_ctu_top_left_y does not exist, the value of subpic_ctu_top_left_y may be inferred to be equal to 0.

subpic_width_minus1 may indicate the width of the subpicture. For example, a value obtained by adding a preset value to a value of subpic_width_minus1 may be the width of the subpicture. In this case, the preset value may be 1. In addition, the width of the subpicture may be expressed in units of CTU or units of CTB. For example, the width of the subpicture may be expressed in units of CtbSizeY. In addition, subpic_width_minus1 may be signaled as an unsigned integer value, and in this case, the number of bits may be Ceil(Log2 (pic_width_max_in_luma_samples/CtbSizeY)). Meanwhile, when the value of subpic_width_minus1 does not exist, the value of subpic_width_minus1 may be inferred to be equal to (Ceil(pic_width_max_in_luma_samples/CtbSizeY)−1).

subpic_height_minus1 may indicate the height of the subpicture. For example, a value obtained by adding a preset value to a value of subpic_height_minus1 may be the height of the subpicture. In this case, the preset value may be 1. In addition, the height of the subpicture may be expressed in units of CTU or units of CTB. For example, the height of the subpicture may be expressed in units of CtbSizeY. In addition, subpic_height_minus1 may be signaled as an unsigned integer value, and in this case, the number of bits may be Ceil(Log2 (pic_height_max_in_luma_samples/CtbSizeY)). Meanwhile, when the subpic_height_minus1 value does not exist, the subpic_height_minus1 value may be inferred to be equal to (Ceil(pic_height_max_in_luma_samples/CtbSizeY)−1).

The Ceil(x) value described in the present invention may be the smallest integer greater than or equal to x. The same operation as Ceil(Log2(x)) was performed in the calculation of the number of bits described above, which is an operation for calculating the number of bits required to represent the value of x, which is an integer greater than or equal to 0, in binary format.

In addition, as the position and size of the subpicture are determined, the subpicture boundary position may be calculated. Through this, it is possible to determine a position present in the subpicture.

FIG. 43 is a diagram illustrating operators according to an embodiment of the present invention.

Referring to FIG. 43, a plurality of division operations may be defined.

"/" may represent integer division. That is, the result value of "/" may be an integer. Specifically, when the result value of the "/" operation is made into an integer, it may be truncated toward zero. For example, the values of 7/4 and (−7)/(−4) are 1. In addition, the values of (−7)/4 and 7/(−4) are −1. Integer division may be used in an operation on the number of bits described in FIG. 42 or an operation of inferring the number of bits.

"÷" is a division operation where no truncation or rounding is performed. Therefore, the result value of the "÷" operation may or may not be an integer. For example, the values of 7÷4 and (−7)÷(−4) may be greater than 1. In addition, the values of (−7)÷4 and 7÷(−4) may be less than −1.

The "-" operation of x/y of FIG. 43 is the same operation as "÷" described above FIG. 44 is a diagram illustrating a picture and a subpicture according to an embodiment of the present invention.

As described above, the picture may be divided into a plurality of sub pictures. In this case, how the subpictures are divided or how they are configured may be determined by signaling disclosed in FIG. 42. However, according to the embodiment described with reference to FIGS. 42 to 43, a range that may not be expressed by signaling may exist. For example, when the width of the picture is not divisible by CtbSizeY or the height of the picture is not divisible by CtbSizeY, there may be a subpicture structure that may not be represented. Specifically, when the width of the picture is not divisible by CtbSizeY, the pic_width_max_in_luma_samples/CtbSizeY value is truncated toward 0, and thus the position of the rightmost CTB of the picture may not be expressed. In addition, when the height of the picture is not divisible by CtbSizeY, the pic_height_max_in_luma_samples/CtbSizeY value is truncated toward 0, and thus the position of the lowest CTB of the picture may not be expressed. Therefore, when the width of the picture is not divisible by CtbSizeY and the width of the subpicture is the same as the width of the picture, the signaling described above may not express the width of the subpicture. In addition, when the width of the picture is not divisible by CtbSizeY and the horizontal position of the subpicture is the rightmost CTB, the signaling described above may not express the top-left x-coordinate of the subpicture.

Specifically, referring to FIG. 44, the width of the picture may be 1032 luma samples. In addition, CtbSizeY may be 128 luma samples. As in Subpicture 0 of FIG. 44, the width of the subpicture may be the same as the width of the picture. In this case, since the width of Subpicture 0 is 9 in units of CtbSizeY, the value of subpic_width_minus1 should represent 8. However, since the pic_width_max_in_luma_samples/CtbSizeY (1032/128) value is 8, the Ceil(Log2 (pic_width_max_in_luma_samples/CtbSizeY)) value is 3. Therefore, subpic_width_minus1 has a problem that only values 0 to 7 may be expressed using 3 bits and 8 may not be expressed. In addition, there may be a case where the value of subpic_width_minus1 does not exist and thus is inferred. In this case, as the picture is composed of one subpicture, the width of the subpicture should be inferred to be equal to the picture width, but as described above, when the width of the picture is not divisible by CtbSizeY, the subpicture width may not be inferred.

Referring to FIG. 44, as in Subpicture 2, the top-left x-coordinate of the subpicture may be the rightmost CTB. In this case, the top-left x-coordinate of the subpicture should represent a 9th value in units of CtbSizeY, and a value of 8 when the coordinate starts with 0. However, since the pic_width_max_in_luma_samples/CtbSizeY value is 8, the Ceil(Log2 (pic_width_max_in_luma_samples/CtbSizeY)) value is 3. Therefore, subpic_ctu_top_left_x has a problem that only values 0 to 7 may be expressed using 3 bits and 8 may not be expressed.

FIG. 45 is a diagram illustrating syntax elements related to the subpicture according to an embodiment of the present invention.

As described with reference to FIG. 44, when pic_width_max_in_luma_samples is not divisible by CtbSizeY, there is a problem in that pic_width_max_in_luma_samples/CtbSizeY is subjected to truncation (flooring) and the expression range is reduced. Similarly, when pic_height_max_in_luma_samples is not divisible by CtbSizeY, pic_height_max_in_luma_samples/CtbSizeY is subjected to truncation (flooring)) and the expression range is reduced. Therefore, the present invention proposes an operation method in which truncation does not occur.

For example, since the x-coordinate and y-coordinate of the top-left of the subpicture, the width of the subpicture, and the height of the subpicture are expressed in units of CtbSizeY, they should be divisible by CtbSizeY. In this case, the "÷" operation described in FIG. 43 may be used.

subpic_ctu_top_left_x may represent the x-coordinate (horizontal position) of the top-left position of the subpicture. Specifically, subpic_ctu_top_left_x may represent the x-coordinate of the top-left CTU of the subpicture. In this case, the coordinates may be represented in units of CTU or units of CTB. For example, it may be represented in units of CtbSizeY. subpic_ctu_top_left_x may be signaled as a value of an unsigned integer, and the number of bits of subpic_ctu_top_left_x may be Ceil(Log2 (pic_width_max_in_luma_samples÷CtbSizeY)). Meanwhile, when the value of subpic_ctu_top_left_x does not exist, the value of subpic_ctu_top_left_x may be inferred to be equal to 0. In this case, the number of bits of subpic_ctu_top_left_x may be determined as Ceil(Log2(Ceil (pic_width_max_in_luma_samples CtbSizeY))).

subpic_ctu_top_left_y may represent the y-coordinate (vertical position) of the top-left position of the subpicture. Specifically, subpic_ctu_top_left_y may represent the y-coordinate of the top-left CTU of the subpicture. In this case, the coordinates may be represented in units of CTU or units of CTB. For example, it may be represented in units of CtbSizeY. subpic_ctu_top_left_y may be signaled as a value of an unsigned integer, and the number of bits of subpic_ctu_top_left_y may be Ceil(Log2 (pic_height_max_in_luma_samples÷CtbSizeY)). Meanwhile, when the value of subpic_ctu_top_left_y does not exist the value of subpic_ctu_top_left_y may be inferred to be equal to 0. In this case, the number of bits of subpic_ctu_top_left_y may be determined as Ceil(Log2 (Ceil (pic_height_max_in_luma_samples CtbSizeY))).

subpic_width_minus1 may indicate the width of the subpicture. For example, a value obtained by adding a preset value to a value of subpic_width_minus1 may indicate the width of the subpicture. In this case, the preset value may be 1. In addition, the width of the subpicture may be represented in units of CTU or units of CTB. For example, the width of the subpicture may be represented in units of CtbSizeY. subpic_width_minus1 may be signaled as an unsigned integer value, and the number of bits of subpic_width_minus1 may be Ceil(Log2 (pic_width_max_in_luma_samples÷CtbSizeY)). Meanwhile, when the value of subpic_width_minus1 does not exist, the value of subpic_width_minus1 may be inferred to be equal to (Ceil (pic_width_max_in_luma_samples÷CtbSizeY)−1). In this case, the number of bits of subpic_width_minus1 may be determined as Ceil(Log2(Ceil (pic_width_max_in_luma_samples÷CtbSizeY))).

subpic_height_minus1 may indicate the height of the subpicture. For example, a value obtained by adding a preset value to a value of subpic_height_minus1 may represent the height of the subpicture. In this case, the preset value may be 1. In addition, the height of the subpicture may be represented in units of CTU or units of CTB. For example, the height of the subpicture may be represented in units of CtbSizeY. subpic_height_minus1 may be signaled as an unsigned integer value, and the number of bits of subpic_height_minus1 may be Ceil(Log2 (pic_height_max_in_luma_samples÷CtbSizeY)). Meanwhile, when the value of subpic_height_minus1 does not exist, the value of subpic_height_minus1 may be inferred to be equal to (Ceil (pic_height_max_in_luma_samples÷CtbSizeY)−1). In this case, the number of bits of subpic_height_minus1 may be determined as Ceil(Log2(Ceil (pic_height_max_in_luma_samples÷CtbSizeY))).

An expression range for the position and size of the subpicture may be extended by using the syntax elements disclosed in FIG. 45. As described above, when the syntax element does not exist and thus the value of the syntax element is inferred, the calculation of the number of bits may be as Ceil(Log2(Ceil(x))). This may be advantageous in terms of implementing a device (decoder/encoder) that may only receive y of Log2(y) as an integer. The values of (pic_width_max_in_luma_samples÷CtbSizeY) and (pic_height_max_in_luma_samples÷CtbSizeY) described above represent how many CtbSizeY units the width of the picture and the height of the picture are composed of, respectively. When the syntax elements illustrated in FIG. 45 are used, the width of Subpicture 0 and the x-coordinate of Subpicture 2 illustrated in FIG. 44 may be expressed.

FIG. 46 is a flowchart illustrating a method of partitioning a transform block according to an embodiment of the present invention.

Hereinafter, a method and apparatus for partitioning the transform block on the basis of the embodiments described with reference to FIGS. 1 to 45 will be described.

The video signal decoding device may include a processor that performs the method of partitioning the transform block. First, the video signal decoding device may receive a bitstream including information (e.g., a syntax element) on the transform block. The processor may determine a result value indicating a partitioning direction of a current trans-form block (TB) on the basis of preset conditions (S4601). The processor may partitioned the current transform block into a plurality of transform blocks on the basis of the result value (S4602). The processor may decode the video signal using the plurality of transform blocks (S4603).

In addition, the video signal encoding device may include a processor that determines a result value indicating a partitioning direction of a current transform block (TB) on the basis of preset conditions, splits the current transform block into a plurality of transform blocks on the basis of the result value, and generates a bitstream including information on the plurality of transform blocks.

In this case, the preset conditions may include a condition related to a color component of the current transform block.

In this case, the preset conditions described above additionally include a condition related to a result of comparing a width of the current transform block and a maximum transform block width, and the maximum transform block width may be determined on the basis of a chroma format related to the current transform block, the color component of the current transform block, and the maximum transform size.

In this case, the preset conditions additionally includes a condition related to a result of comparing a first width value that is a value obtained by multiplying the width of the current transform block by a first value, and a first height value that is a value obtained by multiplying a height of the current transform block by a second value, the first value and the second value are values related to the width of the current transform block and the height of the current trans-form block, respectively, and the first value and the second value are respectively set to 1 if the color component of the current transform block is luma, and are respectively determined on the basis of the chroma format related to the current transform block if the color component of the current transform block is chroma.

When the width of the current transform block is greater than the maximum transform block width and the first width value is greater than the first height value, the result value may be determined as 1, which is a value indicating that the partitioning direction is a vertical direction. In this case, a width of each of the plurality of transform blocks may be a value obtained by dividing the width of the transform block by 2, and a height of each of the plurality of transform blocks may be the same value as the height of the transform block.

When the width of the current transform block is less than or equal to the maximum transform block width or the first width value is less than or equal to the first height value, the result value may be determined as 0, which is a value indicating that the partitioning direction is a horizontal direction. In this case, a width of each of the plurality of transform blocks may be the same value as the width of the transform block, and a height of each of the plurality of transform blocks may be a value obtained by dividing a height of the transform block by 2.

In this case, the preset conditions may be the conditions described through Equations 2 to 4 described above.

The maximum transform size may be determined on the basis of a size of a coding tree block (CTB) having a luma component included in a coding tree unit (CTU) related to the current transform block. When the size of the coding tree block is 32, the maximum transform size may be 32.

If the color component of the current transform block is chroma, the processor may parse a syntax element indicating whether or not a prediction method of a coding block related to the current transform block is block-based delta pulse code modulation (BDPCM). Thereafter, the processor addi-tionally may parse a syntax element related to the prediction method of the coding block when the prediction method of the coding block is not BDPCM as a result of the parsing, and determine the prediction method of the coding block on the basis of the parsing result. In this case, the syntax element related to the prediction method of the coding block is a syntax element indicating at least one of a cross component linear model (CCLM), a planar mode, a DC mode, a vertical mode, a horizontal mode, a diagonal mode, and a DM mode.

The above-described embodiments of the present inven-tion may be implemented through various means. For example, embodiments of the present invention may be implemented by hardware, firmware, software, or a combi-nation thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), proces-sors, controllers, microcontrollers, microprocessors, and the like.

In the case of implementation by firmware or software, the method according to embodiments of the present inven-tion may be implemented in the form of a module, proce-dure, or function that performs the functions or operations described above. The software code may be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

What is claimed is:

1. A video signal decoding device comprising a processor, wherein the processor is configured to:

determine a result value that indicates a partitioning direction of a current transform block is a vertical direction or a horizontal direction, split the current transform block into a plurality of transform blocks on the basis of the result value, and decode the current transform block based on the plurality of transform blocks, wherein when a condition is satisfied, the result value is a value indicating that the partitioning direction is the vertical direction, wherein when the condition is not satisfied, the result value is a value indicating that the partitioning direction is the horizontal direction, wherein when the result value indicates that the partitioning direction is the vertical direction, a width of each of the plurality of transform blocks is the width of the current transform block divided by 2 and a height of each of the plurality of transform blocks is the same as the height of the current transform block, wherein when the result value indicates that the partitioning direction is the horizontal direction, the width of each of the plurality of transform blocks is the same as the width of the current transform block and the height of each of the plurality of transform blocks is the height of the current transform block divided by 2, wherein the condition includes a case where i) a first value related to a width of the current transform block is greater than a second value related to a height of the current transform block and ii) the width of the current transform block is greater than a maximum transform block width,

wherein i) when a color component of the current transform block is a luma component:

the first value is equal to the width of the current transform block, and the second value is equal to the height of the current transform block, and ii) when the color component of the current transform block is a chroma component:

the first value is equal to the width of the current transform block multiplied by SubWidthC, the second value is equal to the height of the current transform block multiplied by SubHeightC, and wherein each of SubWidthC and SubHeightC is a variable determined based on a chroma format related to the current transform block.

2. The video signal decoding device of claim 1, wherein the maximum transform block width is determined on the basis of the chroma format related to the current transform block, the color component of the current transform block, and a maximum transform size.

3. The video signal decoding device of claim 2, wherein the maximum transform size is determined on the basis of a size of a coding tree block (CTB) having a luma component included in a coding tree unit (CTU) related to the current transform block.

4. The video signal decoding device of claim 3, wherein when the size of the coding tree block is 32, the maximum transform size is 32.

5. The video signal decoding device of claim 1, wherein when the color component of the current transform block is the chroma component and the chroma format related to the current transform block is 4:2:0, SubWidthC is 2 and SubHeightC is 2, wherein when the color component of the current transform block is the chroma component and the chroma format related to the current transform block is 4:2:2, SubWidthC is 2 and SubHeightC is 1, wherein when the color component of the current transform block is the chroma component and the chroma format related to the current transform block is 4:4:4, SubWidthC is 1 and SubHeightC is 1.

6. The video signal decoding device of claim 1, wherein when the width of the current transform block is less than or equal to the maximum transform block width or the first value is less than or equal to the second value, the result value is determined to be 0, wherein when the width of the current transform block is greater than the maximum transform block width and the first value is greater than the second value, the result value is determined to be 1.

7. The video signal decoding device of claim 1, wherein the processor is configured to:

when the color component of the current transform block is chroma, parse a syntax element indicating whether or not a prediction method of a coding block related to the current transform block is block-based delta pulse code modulation (BDPCM), when the prediction method of the coding block is not BDPCM as a result of the parsing, additionally parses a syntax element related to the prediction method of the coding block, and determine the prediction method of the coding block on the basis of the parsing result, wherein the syntax element related to the prediction method of the coding block is a syntax element indicating at least one of a cross component linear model (CCLM), a planar mode, a DC mode, a vertical mode, a horizontal mode, a diagonal mode, and a DM mode.

8. A video signal encoding device comprising a processor, wherein the processor is configured to:

obtain a bitstream to be decoded by a decoder using a decoding method, wherein the decoding method comprises:

determining a result value that indicates a partitioning direction of a current transform block is a vertical direction or a horizontal direction;

splitting the current transform block into a plurality of transform blocks on the basis of the result value; and decoding the current transform block based on the plurality of transform blocks, wherein when a condition is satisfied, the result value is a value indicating that the partitioning direction is the vertical direction, wherein when the condition is not satisfied, the result value is a value indicating that the partitioning direction is the horizontal direction, wherein when the result value indicates that the partitioning direction is the vertical direction, a width of each of the plurality of transform blocks is the width of the current transform block divided by 2 and a height of each of the plurality of transform blocks is the same as the height of the current transform block, wherein when the result value indicates that the partitioning direction is the horizontal direction, the width of each of the plurality of transform blocks is the same as the width of the current transform block and the height of each of the plurality of transform blocks is the height of the current transform block divided by 2, wherein the condition includes a case where i) a first value related to a width of the current transform block is greater than a second value related to a height of the current transform block and ii) the width of the current transform block is greater than a maximum transform block width, wherein i) when a color component of the current transform block is a luma component:

the first value is equal to the width of the current transform block, and the second value is equal to the height of the current transform block, and ii) when the color component of the current transform block is a chroma component:

the first value is equal to the width of the current transform block multiplied by SubWidthC, the second value is equal to the height of the current transform block multiplied by SubHeightC, and wherein each of SubWidthC and SubHeightC is a variable determined based on a chroma format related to the current transform block.

9. The video signal encoding device of claim 8, wherein the maximum transform block width is determined on the basis of the chroma format related to the current transform block, the color component of the current transform block, and a maximum transform size.

10. The video signal encoding device of claim 9, wherein the maximum transform size is determined on the basis of a size of a coding tree block (CTB) having a luma component included in a coding tree unit (CTU) related to the current transform block.

11. The video signal encoding device of claim 10, wherein when the size of the coding tree block is 32, the maximum transform size is 32.

12. The video signal encoding device of claim 8, wherein when the color component of the current transform block is the chroma component and the chroma format related to the current transform block is 4:2:0, SubWidthC is 2 and SubHeightC is 2, wherein when the color component of the current transform block is the chroma component and the chroma format related to the current transform block is 4:2:2, SubWidthC is 2 and SubHeightC is 1, wherein when the color component of the current transform block is the chroma component and the chroma format related to the current transform block is 4:4:4, SubWidthC is 1 and SubHeightC is 1.

13. The video signal encoding device of claim 8, wherein when the width of the current transform block is less than or equal to the maximum transform block width or the first value is less than or equal to the second value, the result value is determined to be 0, wherein when the width of the current transform block is greater than the maximum transform block width and the first value is greater than the second value, the result value is determined to be 1.

14. The video signal encoding device of claim 8, wherein the processor is configured to:

when the color component of the current transform block is chroma, parse a syntax element indicating whether or not a prediction method of a coding block related to the current transform block is block-based delta pulse code modulation (BDPCM), when the prediction method of the coding block is not BDPCM as a result of the parsing, additionally parses a syntax element related to the prediction method of the coding block and determine the prediction method of the coding block on the basis of the parsing result, wherein the syntax element related to the prediction method of the coding block is a syntax element indicating at least one of a cross component linear model (CCLM), a planar mode, a DC mode, a vertical mode, a horizontal mode, a diagonal mode, and a DM mode.

15. A non-transitory computer-readable medium storing instructions for operations of decoding a bitstream to be executed by a processor of a video signal processing device, the operations comprising:

determining a result value that indicates a partitioning direction of a current transform block is a vertical direction or a horizontal direction;

splitting the current transform block into a plurality of transform blocks on the basis of the result value; and decoding the current transform block based on the plurality of transform blocks, wherein when a condition is satisfied, the result value is a value indicating that the partitioning direction is the vertical direction, wherein when the condition is not satisfied, the result value is a value indicating that the partitioning direction is the horizontal direction, wherein when the result value indicates that the partitioning direction is the vertical direction, a width of each of the plurality of transform blocks is the width of the current transform block divided by 2 and a height of each of the plurality of transform blocks is the same as the height of the current transform block, wherein when the result value indicates that the partitioning direction is the horizontal direction, the width of each of the plurality of transform blocks is the same as the width of the current transform block and the height of each of the plurality of transform blocks is the height of the current transform block divided by 2, wherein the condition includes a case where i) a first value related to a width of the current transform block is greater than a second value related to a height of the current transform block and ii) the width of the current transform block is greater than a maximum transform block width, wherein i) when a color component of the current transform block is a luma component:

the first value is equal to the width of the current transform block, and the second value is equal to the height of the current transform block, ii) when the color component of the current transform block is a chroma component:

the first value is equal to the width of the current transform block multiplied by SubWidthC, the second value is equal to the height of the current transform block multiplied by SubHeightC, and wherein each of SubWidthC and SubHeightC is a variable determined based on a chroma format related to the current transform block.

16. The non-transitory computer-readable medium of claim 15, wherein the maximum transform block width is determined on the basis of the chroma format related to the current transform block, the color component of the current transform block, and a maximum transform size.

17. The non-transitory computer-readable medium of claim 16, wherein the maximum transform size is determined on the basis of a size of a coding tree block (CTB) having a luma component included in a coding tree unit (CTU) related to the current transform block.

18. The non-transitory computer-readable medium of claim 15, wherein when the color component of the current transform block is a chroma component and the chroma format related to the current transform block is 4:2:0, SubWidthC is 2 and SubHeightC is 2, wherein when the color component of the current transform block is a chroma component and the chroma format related to the current transform block is 4:2:2, SubWidthC is 2 and SubHeightC is 1, wherein when the color component of the current transform block is a chroma component and the chroma format related to the current transform block is 4:4:4, SubWidthC is 1 and SubHeightC is 1.

19. A method for processing a video signal, the method comprising:

determining a result value that indicates a partitioning direction of a current transform block is a vertical direction or a horizontal direction;

splitting the current transform block into a plurality of transform blocks on the basis of the result value; and decoding the current transform block based on the plurality of transform blocks, wherein when a condition is satisfied, the result value is a value indicating that the partitioning direction is the vertical direction, wherein when the condition is not satisfied, the result value is a value indicating that the partitioning direction is the horizontal direction, wherein when the result value indicates that the partitioning direction is the vertical direction, a width of each of the plurality of transform blocks is the width of the current transform block divided by 2 and a height of each of the plurality of transform blocks is the same as the height of the current transform block, wherein when the result value indicates that the partitioning direction is the horizontal direction, the width of each of the plurality of transform blocks is the same as the width of the current transform block and a height of each of the plurality of transform blocks is the height of the current transform block divided by 2, wherein the condition includes a case where i) a first value related to a width of the current transform block is greater than a second value related to a height of the current transform block and ii) the width of the current transform block is greater than a maximum transform block width, wherein i) when a color component of the current transform block is a luma component:

the first value is equal to the width of the current transform block, and the second value is equal to the height of the current transform block, ii) when the color component of the current transform block is a chroma component:

the first value is equal to the width of the current transform block multiplied by SubWidthC, the second value is equal to the height of the current transform block multiplied by SubHeightC, and wherein each of SubWidthC and SubHeightC is a variable determined based on a chroma format related to the current transform block.

* * * * *